(12) United States Patent
Fik

(10) Patent No.: US 6,408,163 B1
(45) Date of Patent: Jun. 18, 2002

(54) METHOD AND APPARATUS FOR REPLICATING OPERATIONS ON DATA

(75) Inventor: Paul Tadeusz Fik, Bodmin (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/010,475

(22) Filed: Jan. 21, 1998

(30) Foreign Application Priority Data

Dec. 31, 1997 (GB) .............................................. 9727452

(51) Int. Cl.[7] .................................................. H04B 7/00
(52) U.S. Cl. ........................ 455/3.01; 455/514; 455/517
(58) Field of Search ................................. 455/3.01, 5.1, 455/422, 445, 432, 434, 435, 458, 450, 455, 62, 517, 418, 419, 509, 514

(56) References Cited

U.S. PATENT DOCUMENTS 5,761,618 A * 6/1998 Lynch et al. ................. 455/419

FOREIGN PATENT DOCUMENTS

| EP | 0092895 A2 | 11/1983 | ............ G11C/9/06 |
| GB | 21369/76 | 5/1976 | ............ H04L/11/16 |
| GB | 2233480 A | 1/1991 | ......... G06F/13/368 |

* cited by examiner

Primary Examiner—Thanh Cong Le
(74) Attorney, Agent, or Firm—Lee, Mann, Smith, McWilliam, Sweeney & Ohlson

(57) ABSTRACT

A data processing system comprising a plurality of processors each storing an instance of replicated data, the system comprising a master processor having a master memory. The master processor maintains a stored data instance in the master memory, updating the stored data instance in response to receive request messages, requesting said master processor to transmit a broadcast message to other processors. The request message contains an update of a data item updated at one of a plurality of local processors. On receipt of the request message, the master processor updates the corresponding data item in the master memory, and broadcasts the updated data item over a communications medium, eg a common bus linking all the processors, so that each local processor may update its own instance of stored data stored on the corresponding respective local memory.

12 Claims, 42 Drawing Sheets

| 2501 | 2502 | 2503 | 2504 |
|---|---|---|---|
| Coherent data item (address) | Coherent data value | Local Tag | Local time-stamp |
| m | 4 | TPM01/03 | A |
| b | 9 | TPM01/04 | B |
| g | 7 | TPM01/05 | C |
| d | 2 | TPM01/06 | D |
| c | 3 | TPM01/07 | E |
| | | | |
| | | | |
| | | | |
| | | | |
| | | | |

| Coherent data item (address) | Coherent data value | Local Tag | Local time-stamp |
|---|---|---|---|
| m | 2 | TPM01/08 | F |
| d | 2 | TPM01/06 | D |
| c | 3 | TPM01/07 | E |
| k | 1 | TPM01/09 | G |
| | | | |
| | | | |
| | | | |
| | | | |
| | | | |
| | | | |

| Coherent data item (address) | Coherent data value | Local Tag | Local time-stamp |
|---|---|---|---|
| b | 8 | TPM05/04 | D |
| k | 3 | TPM05/06 | F |
| | | | |
| | | | |
| | | | |
| | | | |
| | | | |
| | | | |
| | | | |
| | | | |
| | | | |

Fig. 25(C)

| Broadcast tag in message | Coherent data item reference (address) | |
|---|---|---|
| 1001 | b | — 2703 |
| 1002 | c | — 2705 |
| 1003 | e | |
| 1004 | s | |
| 1005 | f | |
| 1006 | u | |
| 1007 | k | |
| 1008 | a | |
| ... | ... | — 2706 |
| 1090 | d | |
| 1091 | m | |
| 1092 | p | |
| 1093 | u | |
| 1094 | b | |
| 1095 | n | |
| 1096 | w | |
| 1097 | o | |
| 1098 | r | |
| 1099 | t | |
| 1100 | h | — 2704 |

Fig. 27(A)

| Broadcast tag in message | Coherent data item reference (address) | |
|---|---|---|
| 1101 | q | ~ 2707 |
| 1102 | e | ~ 2708 |
| 1103 | k | ~ 2709 |
| 1004 | s | |
| 1005 | f | |
| 1006 | u | |
| 1007 | k | |
| 1008 | a | |
| 1090 | d | |
| 1091 | m | |
| 1092 | p | |
| 1093 | u | |
| 1094 | b | |
| 1095 | n | |
| 1096 | w | |
| 1097 | o | |
| 1098 | r | |
| 1099 | t | |
| 1100 | h | |

Fig. 27(B)

| Transeiver Card | Process |
|---|---|
| TPM | Request Coherency Initialization<br><br>Request Coherency Recovery |
| Standby TTM | Request Coherency Initialization<br><br>Request Coherency Recovery<br><br>Request Mirrored TTM Data Initialization<br><br>Respond to Changeover Request from Master TTM Card |
| Master TTM | Perform coherency Initialization<br><br>Perform Coherency Recovery<br><br>Performt Mirrored Data Initialization<br><br>Request Changeover with Standby TTM Card |

Fig. 28

| Broadcast tag in message | Coherent data item reference (address) |
|---|---|
| 1101 | q |
| 1102 | e |
| 1103 | k |
| 1004 | s |
| 1005 | f |
| 1006 | u |
| 1007 | k |
| 1008 | a |
| ... | ... |
| 1090 | d |
| 1091 | m |
| 1092 | p |
| 1093 | u |
| 1094 | b |
| 1095 | n |
| 1096 | b |
| 1097 | o |
| 1098 | b |
| 1099 | t |
| 1100 | h |

Recovery end pointer 3202 → 1093

Recovery start pointer 3201 → 1099

Fig. 32(A)

| Broadcast tag in message | Coherent data item reference (address) |
|---|---|
| 1101 | q |
| 1102 | e |
| 1103 | k |
| 1004 | s |
| 1005 | f |
| 1006 | u |
| 1007 | k |
| 1008 | a |
| ... | ... |
| 1090 | d |
| 1091 | m |
| 1092 | p |
| 1093 | u |
| 1094 | b |
| 1095 | n |
| 1096 | b |
| 1097 | o |
| 1098 | b |
| 1099 | t |
| 1100 | h |

Recovery start pointer 3203 → (at 1102)

Recovery end pointer 3204 → (at 1091)

Fig. 32(B)

| Broadcast tag in message | Coherent data item reference (address) | |
|---|---|---|
| 1101 | q | |
| 1102 | e | |
| 1103 | k | |
| 1004 | s | ~ 3206 |
| 1005 | f | |
| 1006 | u | |
| 1007 | k | |
| 1008 | a | |
| ... | ... | |
| 1090 | d | |
| 1091 | m | |
| 1092 | p | |
| 1093 | u | |
| 1094 | b | |
| 1095 | n | |
| 1096 | b | |
| 1097 | o | |
| 1098 | b | |
| 1099 | t | ← Recovery start pointer |
| 1100 | h | 3205 |

Fig. 32(C)

METHOD AND APPARATUS FOR REPLICATING OPERATIONS ON DATA

FIELD OF THE INVENTION

The present invention relates to the management of data and particularly although not exclusively, to the management of data which is replicated on a plurality of processing devices.

BACKGROUND OF THE INVENTION

Multi-processor computing systems are known wherein each processor has associated local memory and one of said processors has a master memory which is required to be accessed by the other processors. The master memory may contain configuration data required for organization within the plurality of processors. Thus, for example, the master memory may contain configuration data utilized by all processors so that each processor can operate in line with a pre-determined protocol. Known systems of this type may rely on use of a common bus or other suitable communication medium to allow the master processor to communicate with each of a plurality of local processors.

Communication between processors interconnected via a bus is particularly suitable for systems relying on a centralized body of data which is required to maintain accuracy in terms of data content held from the point of view of each of the local processors. These prior art systems may generally be referred to as centralized memory systems and an inherent underlying problem relates to a time delay or latency in respect of operations performed on the data (write or SET operations) or operations relating to retrieval of the data (fetch or GET operations). Thus, a local processor must access the master processor's memory to effect an operation on the data and this will occur via instructions sent over the common bus. Similarly the common bus is used in returning data from the master memory to the requesting local processor. These types of communication exchanges between a master processor and a local processor introduce an inherent delay in local processors updating data in the master processor's memory. Typical applications require local processors to achieve many data retrievals from the master processor as they are running in real time. Thus, in real time applications the number of operations performed by a local processor is considerable. With each data request operation being non instantaneous and extended by the round-trip time from local processor to master processor and back to local processor each required operation is forced to wait whilst the preceding requested operation is completed. The above problem may be referred to as the latency problem and access to centralized memory may be referred to as blocked whilst a given local processor is waiting for a prior data request to complete. Systems requiring a solution to centralized memory latency problems include computer networks, the Internet and world wide web and base stations in telecommunications systems.

A problem with current telecommunications systems relates to connection of customers to a backbone network, eg a public switched telephone network (PSTN). Conventionally, customers are connected to the PSTN via a hardwire transmission line comprising copper cables at considerable expense through the need to lay these cables under roads. An improved solution to this problem has been effected by use of a fixed radio access (FRA) system (otherwise known as fixed wireless access (FWA) or wireless local loop (WLL)) wherein customers are connected to the PSTN via a microwave link effecting communication between a microwave dish located on the customer premises and a radio base station comprising an integrated transceiver system (ITS). The microwave communication link removes the need to lay copper cables and simply requires a remote base station to be connected to the PSTN. In this way a plurality of customers may be connected to the PSTN at much reduced expense. In addition, the disruption associated with laying of copper cables is also reduced from the point of view of the general public. Currently, fixed radio access of the type described is implemented using a remote base station comprising a plurality of transceiver processing modules (TPMs) or processor cards. Typically a fixed radio access base station of the type indicated may comprise 6 TPM cards providing 18 carrier frequencies, this kind of system being suitable for use in covering a densely populated urban area. Each TPM card comprises a processor and local memory. The TPM cards are managed by a master card called a transceiver timing module (TTM) or master processor card which comprises a master processor and local memory. Each TPM card is responsible for effecting connections between a plurality of customers and the PSTN and must access the shared centralized memory on the master TTM card so that each customer is allocated a particular microwave frequency which, for example, is not being used by another nearby customer. This is required to minimize interference in each communication channel which is established. However, as described above such a centralized memory system suffers from inherent problems with respect to the local processors on TPM cards accessing and modifying data held by the centralized master memory located on the TTM card. Connection of customer telephone call requests to a local base station comprising a centralized memory is inefficient in terms of call set up etc. A solution is required wherein the existing physical arrangement of processing elements and memory holding configuration data is preferably maintained and in which the integrity of the data is consistent from the point of view of all local processors.

SUMMARY OF THE INVENTION

One object of the present invention is to replicate configuration data over a plurality of processors such that each individual processor contains local memory holding a copy of the data which is substantially similar or coherent at any given time to that held by any of the other local processors. Attempts to realize replicated data management systems suffer from reliability problems in terms of data integrity. An important problem is to effect updates (that is SET operations) on the data such that a copy of the data associated with a given processor is reliably up to date with respect to operations performed upon the data by both the given processor under consideration and one or more of the other processors.

According to a first aspect of the present invention there is provided in a data processing system comprising a master processor having an associated master memory storing an instance of data, a method of maintaining said stored data instance and broadcasting a status of said stored data instance, said method comprising the steps of:

receiving a message requesting said master processor to transmit a broadcast message, said request message containing a data item;

in response to said request message, updating said stored data instance in said master memory with said data item; and transmitting said broadcast message, wherein said broadcast message contains said data item used to update said stored data instance.

Further advantageous features of the invention are as recited in claims 2 to herein.

According to a second aspect of the present invention there is provided a data processing system comprising a master processor and an associated master memory, said master memory storing an instance of data, said processor operating to:

receive a message requesting said master processor to broadcast a message;

update said data instance according to a content of said request message; and in response to said request message, operating to transmit a broadcast message.

Said broadcast message may comprise a same data content as said quest message.

According to a third aspect of the present invention there is provided in a data processing system comprising a master processor having an associated master memory storing an instance of data, said instance comprising a plurality of data items, a method of generating recovery messages comprising the steps of:

storing a history list of broadcast messages which said master processor has previously transmitted;

receiving a coherency request message requesting transmission of specified data items;

in response to said coherency request message, reading said history list to determine if the data items requested in said coherency request message match data items referred to in said history list; and if said items requested in said coherency request message match data items referred to in said history list, transmitting messages containing said specified data items.

Further advantageous features are as recited in claims 14 to 21 herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIGS. 25(A)–(C) illustrate local tables containing details of messages transmitted in accordance with the message transmission step identified in FIG. 20;

FIG. 27(A) details the history list identified in FIG. 26;

FIG. 27(B) details an update of the history list identified in FIG. 27(A);

FIG. 28 lists processes performed during error conditions detected by the local replicated data manager identified in FIG. 19;

FIGS. 32(A)–(C) illustrates reading of the history list identified in FIG. 27 under various error recovery conditions;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Best mode contemplated by the inventors as described herein utilizes a plurality of communicating processors which communicate over a common bus. However, in the general case, the processors need not be locally connected by a common bus, but may be geographically disparate, communicating over a distributed communications network, eg a broadband communications network, an intercontinental communications network, or the TCP/IP Internet. However the following specific implementation including specific embodiments and methods disclosed hereafter relates to a deployment in a fixed wireless access radio base station, in which a plurality of processors are distributed over a plurality of adjacent cards linked by a common bus, eg a communications bus provided at a back plane of a card holding shelf.

Figure 1:
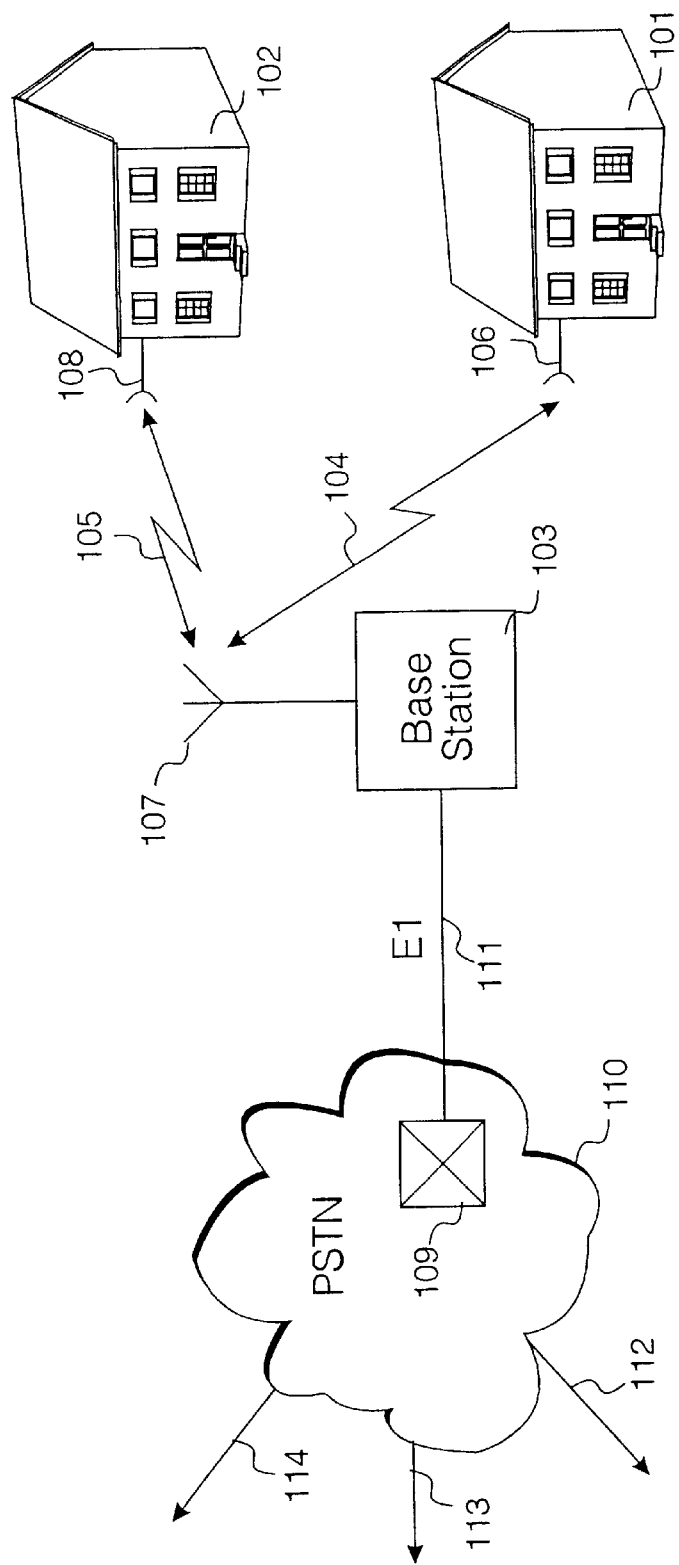
FIG. 1 illustrates schematically a fixed wireless access system for providing communication between customers and a public switched telephone network via a fixed wireless access base station.

FIG. 1 illustrates connection of customers such as customers 101 and 102 to a base station 103 by fixed radio access. Communication between customers 101 and 102 and base station 103 is effected by microwave communication links 104 and 105 respectively. Thus, if for example customer 101 requires to make a telephone call then on dialing the required telephone number on their telephone handset the indicated signal is sent to microwave communication antenna 106 whereafter microwave signal 104 is transmitted to base station antenna 107. Similarly, if customer 102 requires to make a telephone call, then in response to operations performed by customer 102 on a local telephone handset, microwave antenna 108 transmits microwave signal 105 which is received by base station antenna 107. Base station 103 is connected to a switch 109 of the public switched telephone network 110. Connection between the base station 103 and switch 109 is established by an E1 control line 111. On receiving an E1 signal, switch 109 routes the indicated telephone call to the telephone apparatus of the required recipient via telephone distribution lines such as lines 112, 113 or 114.

Fixed radio access of the type illustrated in FIG. 1 is known and a base station such as base station 103 typically serves a cell having a radius approximately between 5 and 15 kilometers. However, in known systems, processing required in base station 103 is limited through delays in processing during call set up on receipt of transmitted signals such as microwave signals 104 and 105 respectively.

Figure 2:
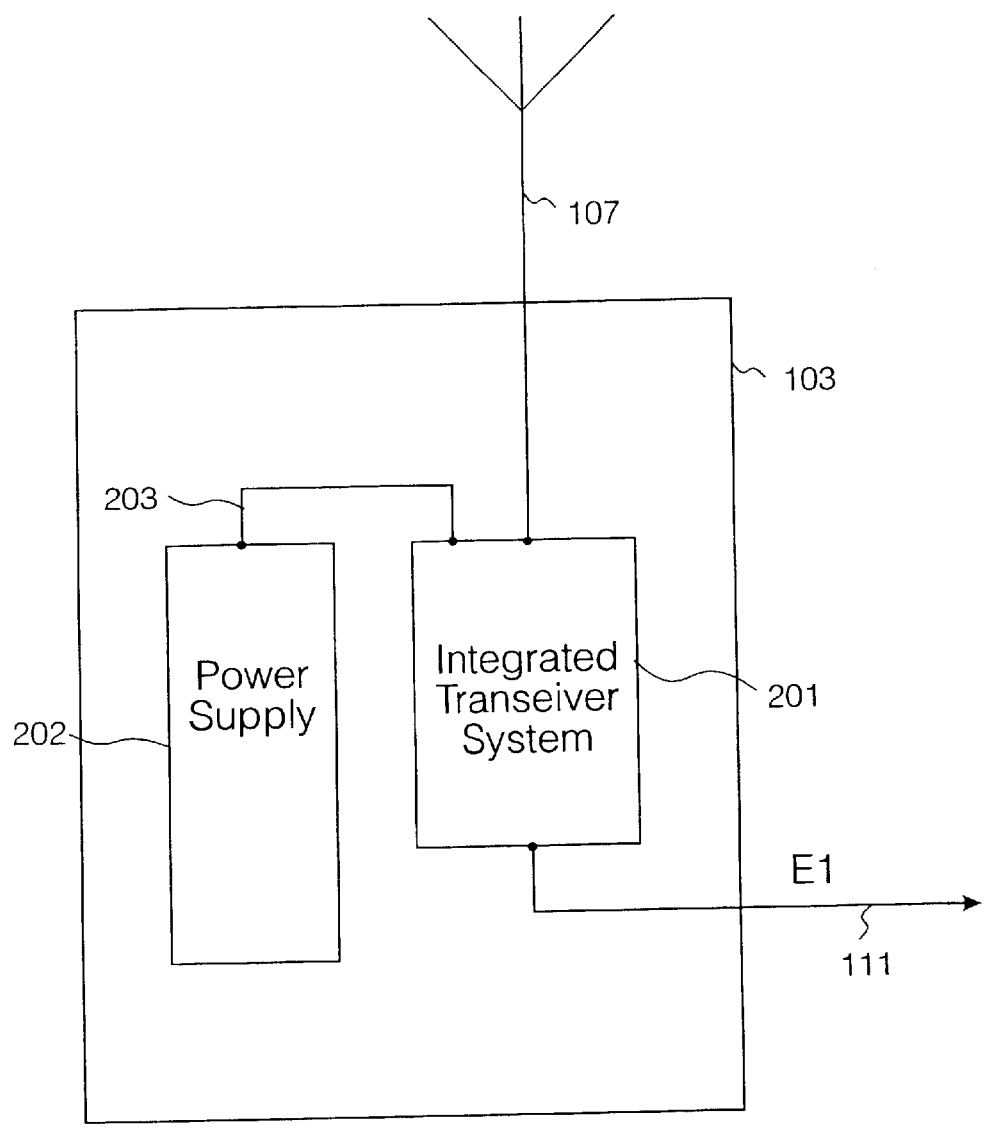
FIG. 2 details units included in the base station identified in FIG. 1.

Base station 103 is further detailed in FIG. 2 and comprises an integrated transceiver system (ITS) 201 and a power supply unit 202. Power supply 202 supplies electric power from the AC grid to integrated transceiver system 201 via power line 203.

Integrated transceiver system 201 is required to route calls received via antenna 107. In general the number of customers served by base station 103 determines the nature of the integrated transceiver system 201 that is incorporated in base station 103. A typical base station constitutes an 18 carrier frequency mechanism wherein a plurality of call set up units operate relative to each other.

Figure 3:
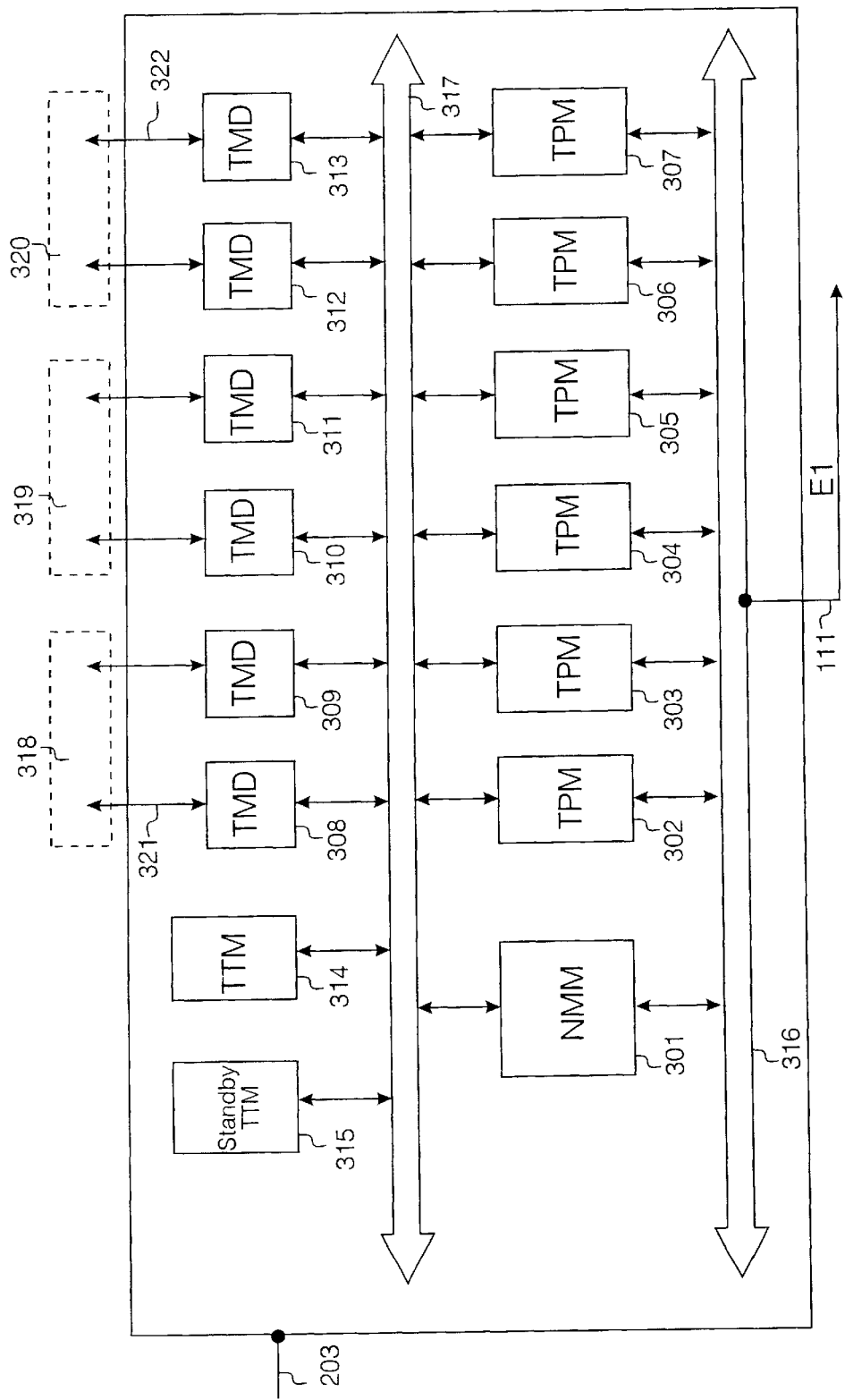
FIG. 3 details components comprising the integrated transceiver system identified in FIG. 2.

FIG. 3 schematically illustrates a known prior art integrated transceiver system 201. As indicated in FIG. 2, ITS unit 201 is powered by power line 203. Power line 203 is connected to the various units shown which comprise ITS unit 201. For the sake of clarity, power line connections are not shown in FIG. 3. Unit 30 201 includes a network management module (NMM) 301, transceiver processing modules 302–307 each respectively associated with a transceiver modulator/demodulator (TMD) unit 308–313 respectively. Additionally unit 201 includes a transceiver timing module (TTM) 314 and a stand-by TTM 315. Bus 316 allows interprocessor communication between NMM 301 and the TPMs and interprocessor communication between the TPM units themselves. Bus 316 is connected to E1 line 111 so as to establish communication links with the PSTN. A second bus, bus 317 allows network management module 301 in conjunction with TTM module 314 to effect communications between a given TPM card and its associated TMD unit, TTM card 314 or standby TTM card 315 effect control timing requirements of the units connected to bus 317. Each TMD unit is connected to a tri-sector antenna 318, 319 or 320 respectively. Thus TMD unit 308 is connected to tri-sector antenna 318 via bi-directional signaling line 321. Similarly, TMD unit 313 is connected to trisector antenna 320 via bi-directional signaling line 322. Tri-sector antennas 318, 319 and 320 are represented schematically as antenna 107 in FIG. 1. Antenna 107 thus represents three tri-sector antennas configured to provide tri-sectorized coverage. Typically TTM card 314 or standby TTM 315 will operate with respect to an external E1 reference source, which for the sake of clarity is not shown. Bus 317 may comprise a plurality of buses, each bus performing a different function such as timing, power/reset or management of the transceiver modulator/demodulator units 308–313 respectively. Bus 316 typically comprises a first bus representing interprocessor communication between the NMM module and the various TPM modules and a second bus allowing pulse code modulation (PCM) signals to be provided to E1 line 111. A TPM unit such as unit 302 is a circuit board of high complexity. A single TPM unit implements the processing necessary to support three uplink downlink carrier frequency pairs and is required to perform processing for 30 timeslots, said 30 timeslots each representing a channel allocation for a call to be established. TTM card 314 provides a timing reference for the complete integrated transceiver system 201. The long-term stability of the E1 reference source used by TTM 314 is acceptable as it is derived from the master clocks of the associated telecommunications network, said clocks typically being rubidium reference clocks with stability better than 1 in $10^{15}$. Network management module 301 performs a variety of functions relating to interfacing of the TPM modules and the tri-sector antennas, alarms, performance measurements and software updates.

Ultimately, operation of integrated transceiver system 201 is dictated by interprocessor communication between TPM cards 302 to 307 respectively, interprocessor communication between said TPM cards is required to effect reliable establishment of a communication channel between an incoming microwave signal received by one of said tri-sector antennas 318–320 and E1 link 111 to the PSTN. A given TPM card cannot effect call set up without reference to the other TPM cards since it is required to ensure that a given microwave communication channel is not currently being used. Furthermore, use of certain microwave communication channels may be undesirable in terms of interference problems created if such a channel is currently being used by another TPM card. Thus, interprocessor communication is required to establish reliable call set up and call disconnect functions.

Figure 4:
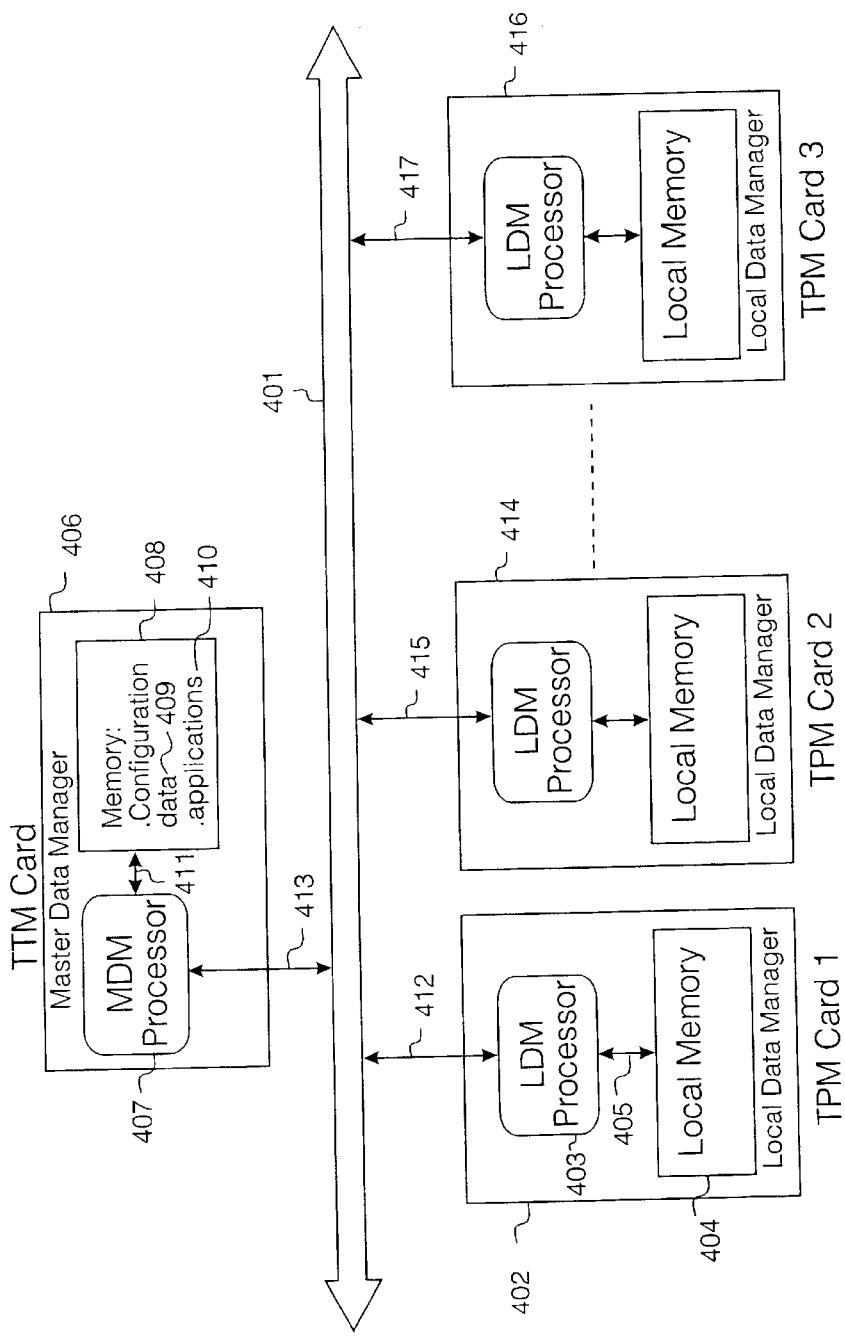
FIG. 4 illustrates schematically a known prior art system providing communication between a plurality of control cards contained in the integrated transceiver system detailed in FIG. 3 and essentially incorporates a shared centralized memory for configuring said control cards.

FIG. 4 illustrates a prior art solution to interprocessor communication within a known integrated transceiver system. A plurality of TPM cards effect call set up and call end procedures, the system constituting a centralized shared memory paradigm. Three TPM cards are shown, TPM card 1, TPM card 2 and TPM card 3. TPM cards 1, 2 and 3 communicate with the TTM card via common bus 401. Each TPM card contains a local data manager (LDM) comprising a local data manager processor and local memory. Thus, TPM card contains LDM 402 comprising LDM processor 403 and local memory 404 said processor and said memory communicating via internal communication bus 405. Similarly, the TTM card comprises a master data manager (MDM) 406 containing MDM processor 407 and local memory 408. Local memory 408 contains shared configuration data 409 known as an internal information base (IIB) which is required to be referenced by each TPM card so as to effect reliable ordering in terms of call set up and closure. Local memory 408 also contains applications programs 410 for structuring the overall operation of the ITS system and processor 407 and memory 408 communicate over internal bus 411. Configuration data stored in local memory 408 is accessible by each of said TPM cards 1, 2 and 3. Each TPM card is required to access said local memory 408 so as to establish which communication channels may be utilized with regards to setting up of a telephone call. Thus, if TPM card 1 sends a signal via control line 412, bus 401 and control line 413 to the master TTM card to get (or fetch) data from TTM local memory 408, TPM card is required to wait for the master (TTM) card to return the requested data. Similarly, if TPM card requires to use a particular call set up parameter held in IIB 408 it is required to access memory 408 via control line 412 and control line 413 bus 401 and thereby set (or write) a value to memory 408. Thus if a local TPM card has to perform a large number of operations on the data in memory 408, as is the case when running in real time, it will therefore be required to carry out a high frequency of operations, with every operation being extended by the round trip time incurred by the message being sent over common bus 401 to the master processor 407 and returned. Thus, before a given local TPM card can proceed with a further fetch or write operation it must wait for the former fetch or write command to complete. Thus, each TPM card is limited in terms of its efficiency with respect to speed of operation in that it is required to wait for an inherent latency period before it can proceed with its next required operation.

Figure 5:
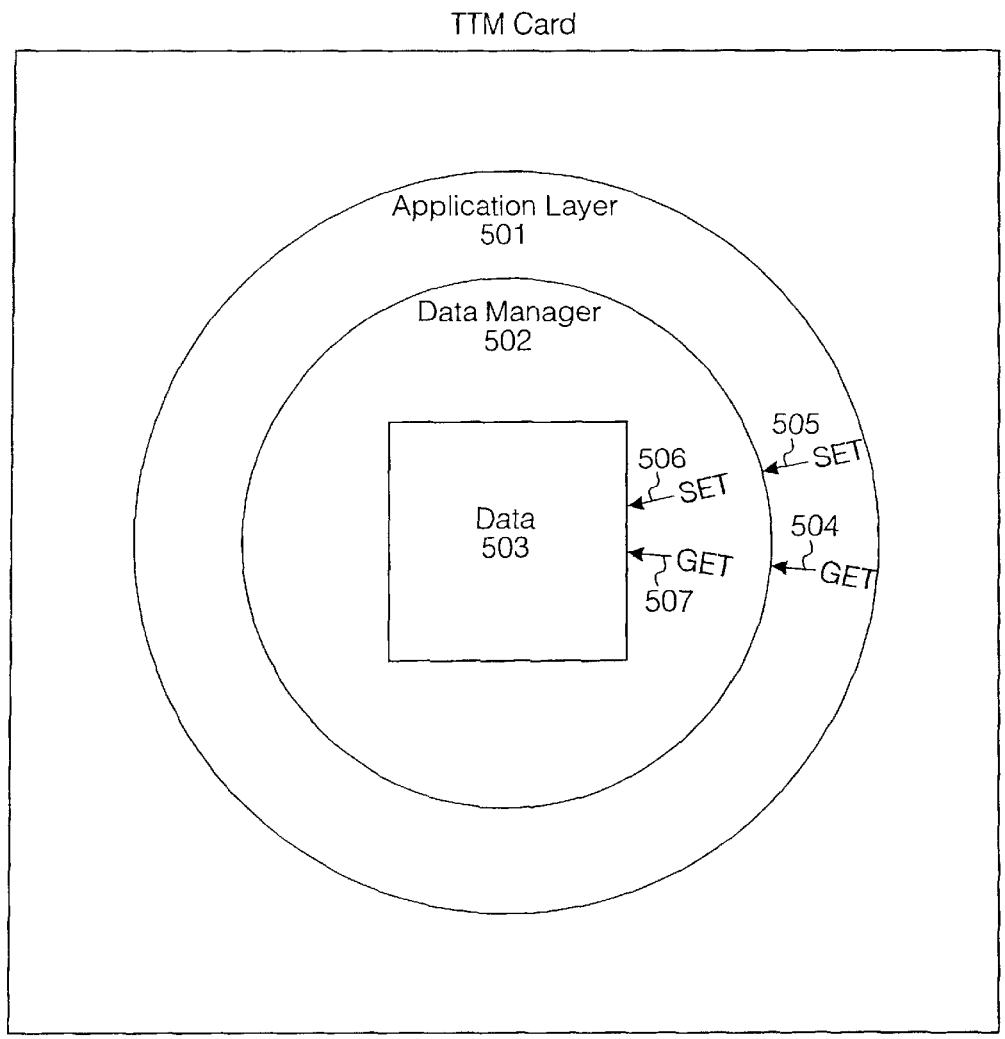
FIG. 5 illustrates schematically network layers associated with the master control card identified in FIG. 4.

In terms of functionality, the prior art system represented in FIG. 4 may be represented schematically by the protocol layers identified in FIG. 5. The TTM card shown in FIG. 4 thus comprises an application layer 501, a data manager layer 502 and physical data 503 which may be configuration data for example. Application layer 501 provides direct support for both application processes and end user programs and also supports management of the interconnection of these programs. Application layer 501 encapsulates data manager layer 502. GET and SET operational instructions 504, 505 respectively are received from application layer 501 and thereafter operate upon data manager layer 502. In turn, GET and SET operations 504 and 505 are passed to data manager layer 502 wherein, as indicated by SET and GET operations 506 and 507 respectively, they operate upon physical data 503 encapsulated within data manager layer 502 in accordance with processes invoked according to protocols in data manager 502.

Figure 6:
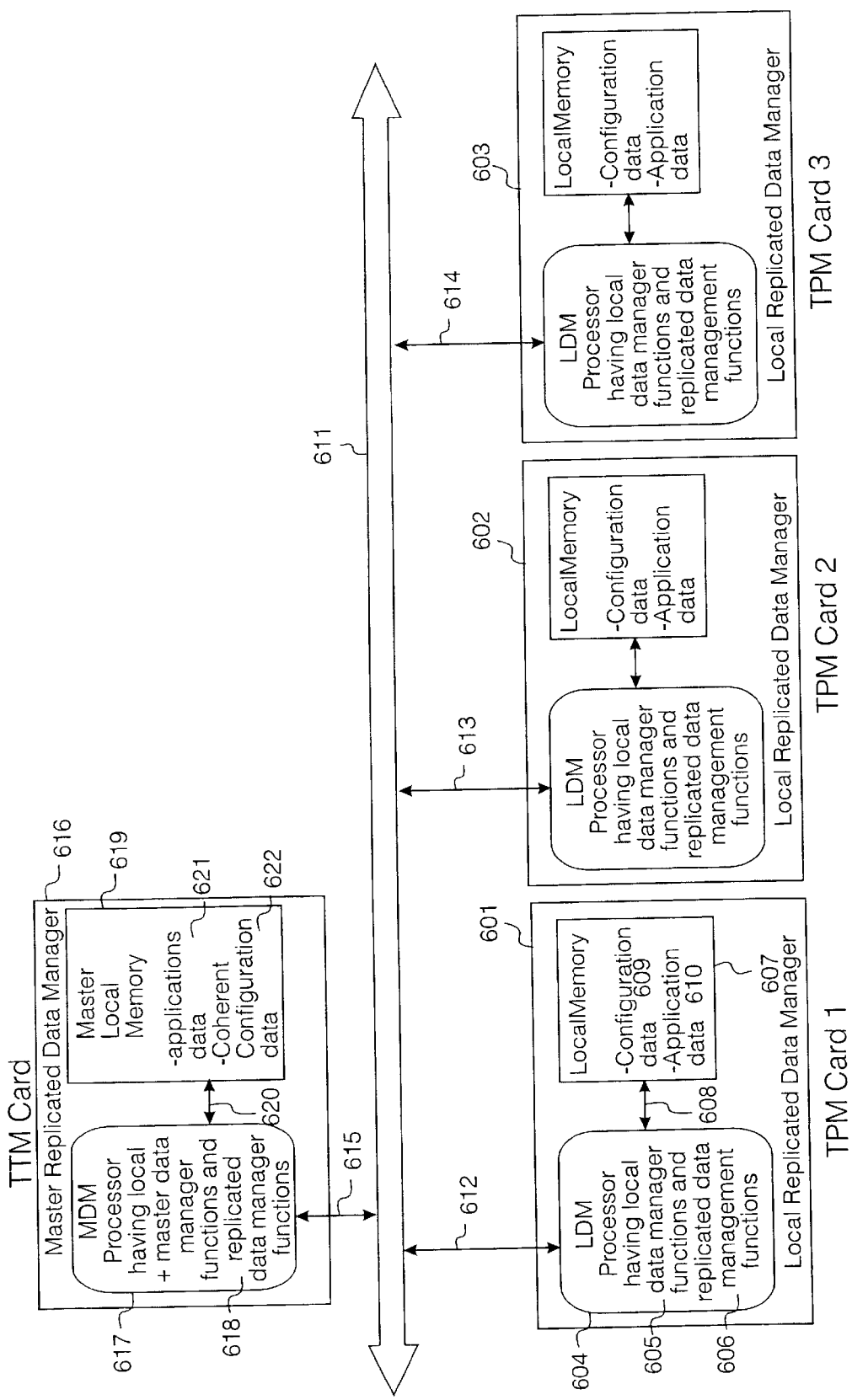
FIG. 6 illustrates schematically an improved system for providing communication between a plurality of control cards of the type identified in FIG. 3 being a preferred implementation according to the present invention.

FIG. 6 details the preferred embodiment of the present invention which overcomes the latency problem identified in FIG. 4. The system configuration in terms of physical units employed in the ITS system (TPM card and TTM card) is maintained, but the operation of the units is modified. TPM cards 1, 2 and 3 are configured such that each TPM card holds the required configuration data which was previously held only in the master memory 408 of the TTM card. Each TPM card contains a replicated local data manager, 601, 602 and 603 respectively. Each replicated local data manager contains a local data manager processor. The local data manager processor comprises the local data manager processor of the type identified in FIG. 4 but which has additional functionality related to data manager replication.

Thus, TPM card 601 contains modified local data manager processor 604 which comprises local data manager functions 605, together with replicated data manager functions 606. Modified local data manager processor 604 communicates with local memory 607 via bidirectional control lines 608. Local memory 607 holds configuration data 609 and applications data 610. Configuration data 609 may represent the totality of the configuration data 408 shown in FIG. 4. Alternatively configuration data 609 may represent only a portion of configuration data 408 identified in FIG. 4. The configuration of TPM cards 2 and 3 similarly comprises local replicated data managers substantially similar to that described for TPM card 1. For each TPM card, local memory will comprise configuration data and applications data as described for TPM card 1. Configuration data such as configuration data 609 held in TPM card 1, is required to be coherent across all processor cards, that is TPM cards, master TTM card and the standby TTM card. By this it is meant that the configuration data instances on each processor card are required to be maintained to the effect that the data in each remains identical in response to operations performed on said configuration data by each processor card. As identified above, it may be sufficient to only require a portion of said configuration data to be coherent across said processor cards. Each TPM card is respectively connected to common bus 611 via control line 612, 613 and 614 respectively. Similarly, bus 611 is connected to the master TTM card via control line 615. The TTM card comprises a master replicated data manager 616. Manager 616 comprises a master data manager processor 617. Master data manager processor 617 comprises additional functionality to processor 407. This additional functionality is concerned with replicated data management functions 618 and is similar to that described for TPM cards, but with some extra functions related to error recovery. Master data manager processor 617 communicates with local memory 619 via internal bus 620. Local memory 619 comprises applications data 621 and configuration data 622. Configuration data 622 is required to be coherently maintained, such that it remains up to date in terms of operations performed by all processor cards upon their local configuration data. The master TTM card, is required to perform a broadcast function with respect to write (or set) data operations performed by each of the TPM cards 601–603 respectively and the standby TTM card. The system operates by a given TPM card performing an operation upon its configuration data in its local memory and then transmitting a unicast message related to the operation performed to the master TTM card. The unicast message is transmitted over control line 612, 613 or 614 respectively to bus 611 which then transmits the signal via control line 615 to master data manager processor 617. In response to a received SET operation, master data manager processor 617, via internal bus 620 updates the required configuration data item specified in its local memory 619. Following a data update of this kind, the master replicated data manager is required to broadcast the write operation performed to TPM cards 601, 602 and 603. In addition, a standby TTM card may be provided which similarly requires said operation to be broadcast so as to maintain the required data coherence. In this way, a given TPM card or standby TTM card can access its own local memory to perform an operation, thereby removing inherent latency, and the remaining cards, via the master card broadcast, receive information allowing them to update their local memories (or caches) accordingly. Local Get or fetch operations upon coherent data are not required to be transmitted to the other processor cards as the data is not modified by a GET operation. In the system identified in FIG. 6, TPM located data manager accesses representing GET or SET operations, are not blocked in the way which was identified in the system illustrated in FIG. 4. The only requirement is that a local SET operation must be indicated to the TTM card so that said TTM card can broadcast said operation to the other non-originating processor cards. Removal of memory blocking removes the inherent latency introduced into call set up, maintenance and clear down steps when a customer requires to initiate a telephone call as identified in FIG. 1. Similarly, call set up, maintenance and clear down steps associated with calls received from the PSTN and transmitted to a given customer are relieved of the inherent latency associated with the prior art system.

To effect reliable operation of call set up, maintenance and clear down steps, a reliable protocol is required. By reliable it is meant that data modifications made to said coherent data must be reliably implemented, such that any errors or lost messages are detected and re-issued.

Figure 7:
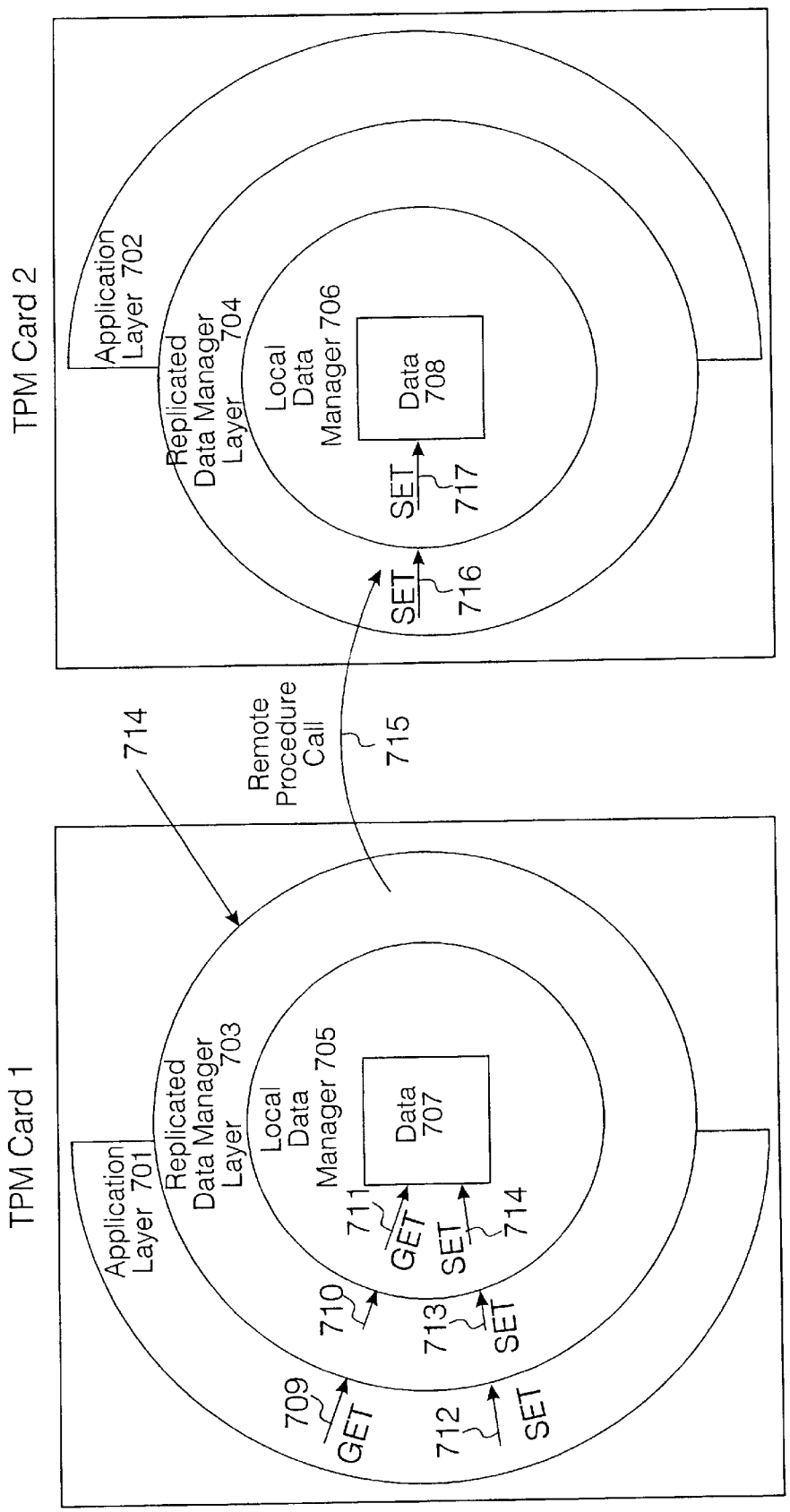
FIG. 7 illustrates schematically network layers associated with a given control card in accordance with the apparatus and method identified in FIG. 6.

FIG. 7 illustrates protocol layering associated with the preferred embodiment of the present invention identified in FIG. 6. For illustrative purposes only two TPM cards are shown, TPM card 1 and TPM card 2. The application layer is now split between the TPM cards, in the illustration, forming application layer 701 for TPM card 1 and application layer 702 for TPM card 2. The application layer encapsulates a replicated data manager layer 703 and 704 for each respective card. Similarly, the replicated data manager layer encapsulates a local data manager 705 and 706 respectively which in turn encapsulates physical data 707 and 708 in each respective card. GET and SET operations may be performed by a given card, said operations being received from the associated application layer. Thus, for TPM card 1, a GET operation 709 invoked by application layer 701 may be effected upon replicated data manager layer 703. Replicated data manager layer 703 represents an intermediate layer between application layer 701 and local data manager layer 705. In effect, replicated data manager layer 703 forms an interface between layers 701 and 705 such that the application layer may perform operations upon what it considers to be the data manager identified in FIG. 4 and now comprising layer 703 in FIG. 7. The replicated data manager layer 703 then passes the GET operation 709 on to local data manager 705 as indicated by GET operation arrow 710. Local data manager 705 then implements the required GET operation upon physical data 707 as indicated by GET operation arrow 711. In the case of a SET operation, such as SET operation 712 specified or invoked in application layer 701, replicated data manager 703 passes SET operation 712 to local data manager layer 705, as indicated by SET operation arrow 713. Upon receipt of SET operation 713 said operation is implemented by local data manager 705 in the form of a SET operation 714 upon physical data 707 and thus data 707 is modified accordingly. During this process replicated data manager 703, invokes a remote procedure call 715 to its peer cards comprising the other TPM cards, and the master and standby TTM cards. Remote procedure call 715 is invoked so as to instruct all processor cards to invoke a corresponding SET operation specified by said remote call. However, the exact nature of operation of said remote procedure call 715 is determined by a complex protocol specific to the present invention and is described below. Thus, upon receipt of a remote procedure call message 715, a peer TPM card for example performs operations instructed by its associated replicated data manager, upon its associated local data manager, which in turn, in accordance with the present invention, may or may not invoke the operation indicated upon its associated physical data. Thus in the schematic example shown in FIG. 7 TPM card 2 receives instructions concerning SET operation 713 from replicated data manager 703 via remote procedure call 715. Remote procedure call 715 is handled (received and processed) by replicated data manager 704. Upon receipt of call message 715, replicated data manager 704 effectively may invoke the SET operation specified in message 715 through effectively passing specified SET operation 716 to local data manager 706. Following receipt of SET operation 716, local data manager 706 if instructed to do so by replicated data manager 704, then invokes the received SET operation upon its instance of replicated data as indicated by SET operation arrow 717.

The primary requirement of ensuring that the TPM located data manager accesses do not block, requires that the data manager contents are cached locally on all processor cards. By providing instances of the data manager on both the TTM and every TPM and supporting caching by coherently broadcasting all/selected data operations to all data manager instances on each of said TPM and TTM cards prevention of TPM located data manager access blocks is achieved, thus effecting improved call processing. This is a preferred embodiment which requires sufficient TPM memory to be available to hold the entire data manager contents. The replication and localization of the data manager data can be specified according to the requirements of a given ITS application.

Figure 8A:
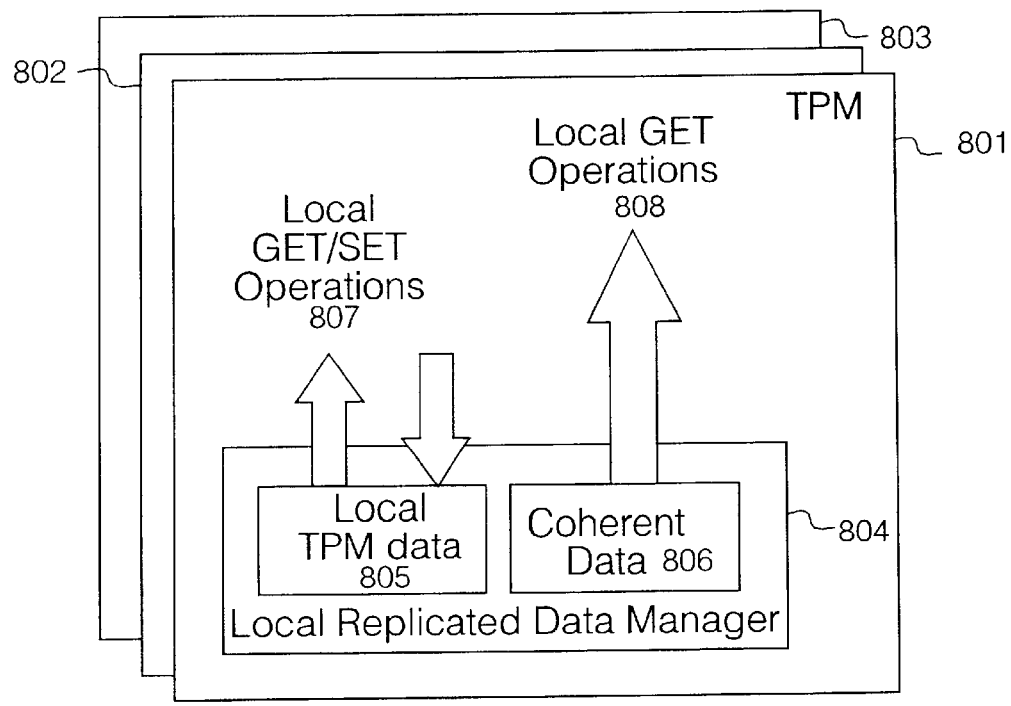
FIG. 8(A) illustrates schematically localization of data and operations on a transceiver processing module (TPM) card, said card including replicated coherent data.
Figure 8B:
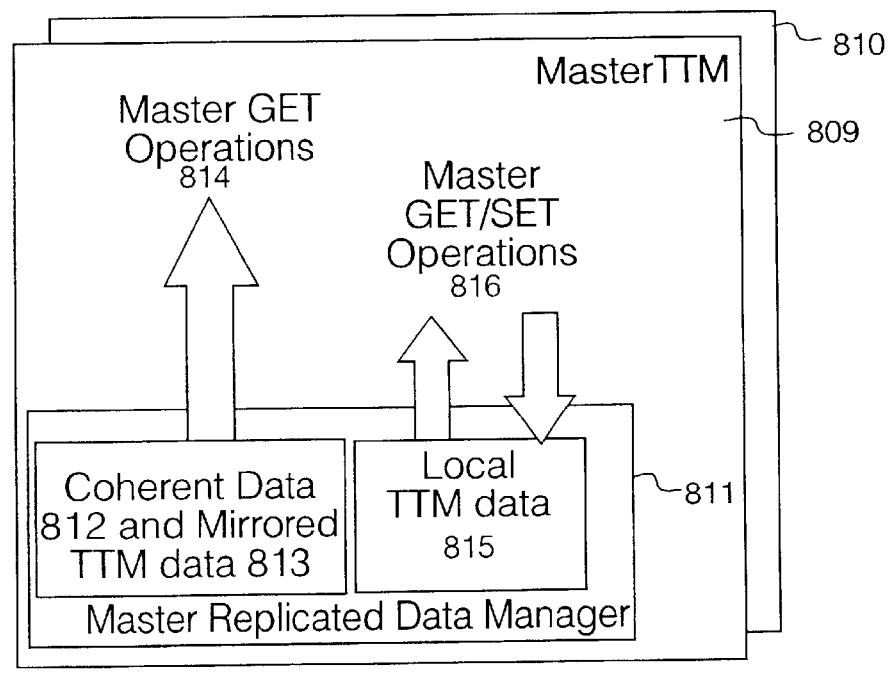
FIG. 8(B) illustrates schematically localization of data and operations on a master control card (transceiver timing module (TTM card)) configured in accordance with the present invention.

A large proportion of the data manager data is only accessed by the master TTM card. The majority of this data is also mirrored on the standby master TTM 315 whilst a few objects, that is data processing functions, exist for which only a single local instance of a given data item is accessed by either the master or the standby TTM card. In addition, a few objects exist for which only a single local instance is accessed by each TPM card. This leaves only a subset of the data manager data which requires to be made coherent across all transceiver processor cards. Thus, in accordance with the preferred implementation of the present invention, data is divided into four categories as shown in FIG. 8. FIG. 8(A) illustrates the data categories and operations on a TPM card and FIG. 8B illustrates the data categories and operations performed on the master TTM card. To emphasize incorporation of a replicated data manager, three TPM cards are shown, 801, 802 and 803 respectively. Each TPM card comprises a local replicated data manager such as local replicated data manager 804 associated with TPM card 801 and which comprises local TPM card data 805 and coherent data 806. As indicated in FIG. 8(A), local GET/SET operations 807 may be performed on local TPM data 805 and local GET operations 808 may be performed on coherent data 806. Similarly, for master TTM card 809 and standby TTM card 810, a master replicated data manager is provided and thus for example master replicated data manager 811 is associated with master TTM card 809. The standby master TTM card in fact has two modes of operation, a first mode as master should a changeover of roles be required and a second mode as a passive processor functioning in a manner substantially similar to a TPM card in terms of functionality with respect to maintaining required data coherence. Master replicated data manager 811 comprises coherent data 812 and mirrored TTM data 813. Master GET operations 814 may be performed upon coherent data 812 and mirrored TTM data 813. Mirrored data refers to data which is only required for use by the master and standby processor cards. Additionally master replicated data manager 811 comprises local TTM data 815 upon which master GET/SET operations 816 may be performed. As indicated in FIG. 8, categorization of data by locality also results in localization of replicated data manager operations. Thus TPM located GET/SET operations 807 upon local TPM data 805 and TTM located GET/SET operations 816 upon local TTM data 815 are only processed locally by the replicated data manager instance resident on the card. In addition, TTM located GET operations 814 upon mirrored TTM data 813 and TPM or TTM GET operations 808 and 814 respectively upon coherent data are also only processed by the locally resident replicated data manager instance. In other words these operations are not required to be performed on the other processors, said operations either not effecting coherency of said coherent data or not being concerned with said coherent data.

A particular implementation of a replicated data manager may be configured to operate one or a plurality of types of SET operation which are replicated and hence supported by the broadcast SET operation message. In the preferred embodiment of the present invention, two types of SET operations are involved. These are internal SET operations and external SET operations respectively. The type of SET operation has no influence on how the SET operation is replicated or transmitted by the replicated data manager. This is because both internal and external SET operations have the same message structure. However, it does influence the action of the data manager upon which the SET operations are directed by the replicated data manager. Specifically additional run time checks are carried out on a given data item (attribute) value falling within allowed ranges, instance existence, etc. Internal SET operations have already been defined and external SET operations in terms of the present invention are used during initialization only, originate from a higher level and simply require replicated data managers to carry a description to differentiate them from internal SET operations. Other types of SET operations may be involved for certain specific applications such as for example groups of SET operations wherein if a data item is found not to exist it may be created by for example a SET creation operation (that is a SET operation used to create a data item). For group SET operations an additional layer is required which may essentially be configured to determine if one of the SET operations in the group is lost.

However, TPM processor or TTM processor located SET operations upon coherent data require additional mechanisms to ensure that all copies of coherent data items within every replicated data manager instance remain identical whenever the value of any data item is modified by a given processor. A TPM or TTM processor located SET operation upon an item of coherent data is performed in three phases:

(i) The locally resident instance of the coherent data item is modified immediately.

(ii) The master TTM processor resident instance of the coherent data item is modified.

(iii) The TPM and standby TTM resident instances of the coherent data item are modified.

Figure 9:
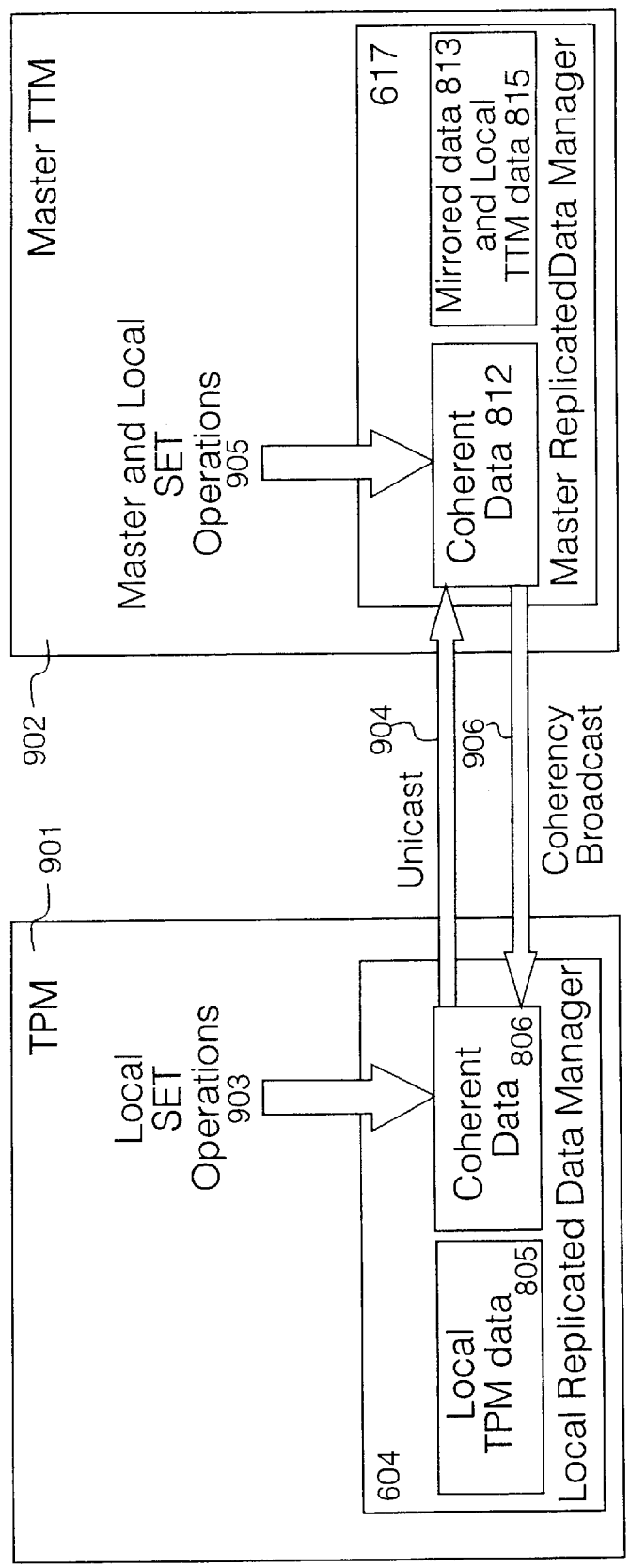
FIG. 9 illustrates schematically support for coherent data operations between a modified master data manager and a modified local data manager as identified in FIGS. 8(A) and 8(B)

For the case of a TTM processor located SET operation upon an item of coherent data, phase (i) is redundant. FIG. 9 illustrates a TPM card 901 and a master TTM card 902. The three phase requirement above requires that a TPM processor located SET operation message, 903 is unicast (904) to master TTM 902 between phases (i) and (ii). By unicast it is meant that a one to one message us transmitted, in the immediate context from the TPM card to the master TTM card. Similarly, TTM processor SET operation 905 or a TPM processor SET operation 903 having been unicast 904, is broadcast (906) by master TTM processor 902 to all processor cards between phases (ii) and (iii). In the case where a local TPM card (or standby TTM card) updates a coherent data item by performing an operation upon said data item the unicast message transmitted to the master processor may be regarded as a stimulus for stimulating the master processor 902 to broadcast a message to all the remaining processors. The local processor initially performing said operation may be referred to as an originating processor in this context since the operation originates on said processor and is only effected upon other (replicated) data instances following said broadcast message being received by each processor card. In this way the unicast message may be considered to be a means of providing a stimulus for effecting transmission of broadcast messages. As shown in FIG. 9 unicast messages 904 originate from local replicated data manager 604 and coherency broadcast messages 906 originate from master replicated data manager 617.

Collectively local replicated data managers associated with each respective TPM card and standby TTM card together with the master replicated data manager associated with the TTM card may be referred to as the replicated data manager (RDM) architecture.

Design of the RDM architecture reflects the impact arising from the simultaneous modification of coherent data items. Two types of GET modify SET operations are pertinent: coincidental GET modify SET operations which result in RDM coherence latency, and close proximity GET modify SET operations both of which are handled in accordance with the present invention.

Figure 10A:
FIG. 10 illustrates schematically a first possible interaction of two coincidental GET modify SET operations on the same TPM card.
Figure 10B:
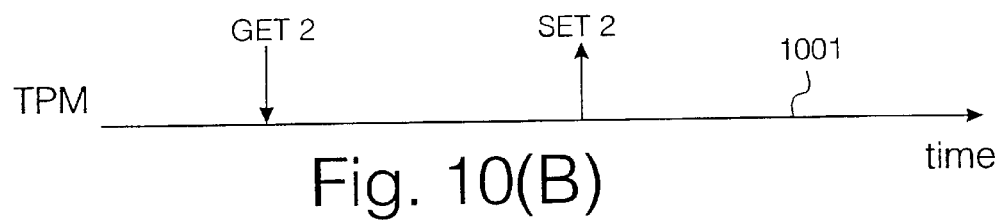

The effect on a single data item of multiple coincidental GET modify SET operations is illustrated in FIGS. 10 to 12. A first possible interaction of two coincidental GET modify SET operations is shown in FIG. 10(A) which results in the equivalent operations shown in FIG. 10(B). In both cases GET and SET operations are shown occurring on a time line 1001 for a given TPM. In FIG. 10(A) a first GET operation, GET1 is effected followed by a second GET operation GET2. Following the second GET operation a SET operation, SET1 related to the first GET operation is effected. Following SET1 a SET operation, SET2 is effected related to the GET2 operation. FIG. 1 O(B) shows the equivalent operations remaining from the two pairs of GET and SET operations. In this case, the first GET and SET operation is effectively lost and thus only the second GET and second SET operations (GET2 and SET2) remain as shown in FIG. 10(B).

Figure 11A:
FIG. 11 illustrates the second possible interaction of two coincidental GET modify SET operations performed on the same TPM card.
Figure 11B:
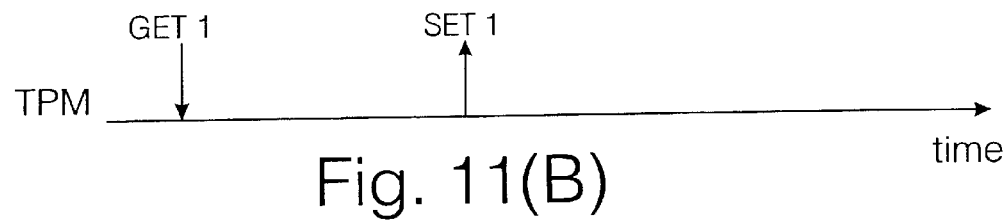

A second possible interaction of two coincidental GET modify SET operations is illustrated in FIG. 11(A) with the equivalent effective operations being shown in FIG. 11(B). In this case, a first GET operation, GET1 is effected followed by a second GET operation GET2. Following operation GET2, a SET operation SET2 related to the second GET operation is performed and finally a SET operation, SET1 related to the first GET operation is performed. In this case the effective GET modify SET operation remaining is the GET1 modify SET1 operation, as shown in FIG. 11(B).

Figure 12A:
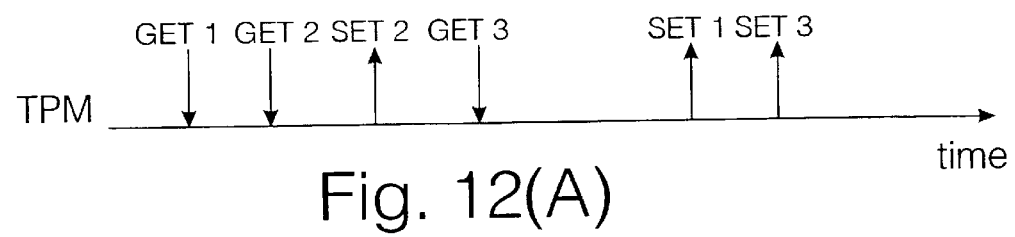
FIG. 12 illustrates schematically loss of one or more GET modify SET operations for a group of overlapping operations.
Figure 12B:
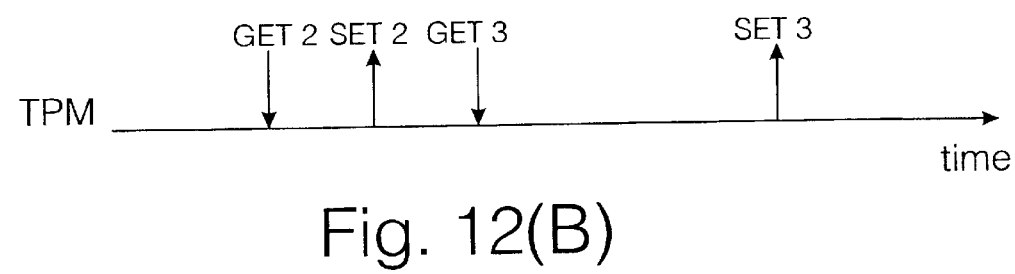

From the above examples it is readily seen that calculation of the equivalent operations of coincidental GET modify SET operations is facilitated by considering related GET and SET operations as boundaries of a window. By determining the GET modify SET window defined by the last SET operation to occur, all of the GET modify SET operations whose SET operations fall within the window in question may be removed. Furthermore if any other operations remain then these are determined to be not coincident with the GET modify SET window in question and can be processed for coincidence independently. Thus applying this calculation or rule to the example shown in FIG. 12 reveals how one or more GET modify SET operations are lost for a group of overlapping GET modify SET operations. FIG. 12(A) shows a group of three GET modify SET operations. Applying the above rule results in the equivalent operations shown in FIG. 12(B). In this example, all three of the GET modify SET operations overlap, but only two of the operations, GET modify SET operations 1 and 3, are coincident. From FIGS. 12(A) and 12(B) it is readily seen that only one of a group of coincident operations prevails, specifically the last coincident operation to occur.

Figure 13A:
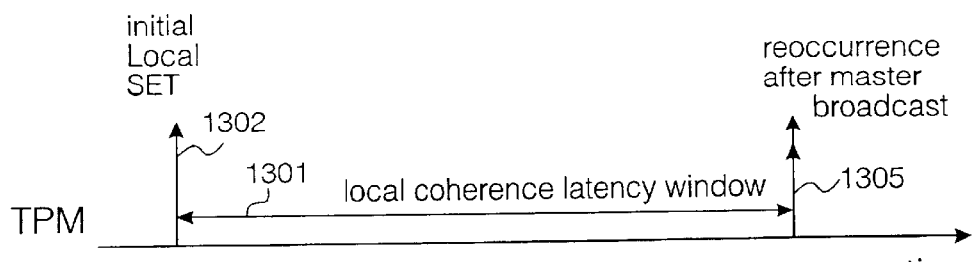
FIG. 13 illustrates a coherence latency window for a local initiated SET operation.
Figure 13B:
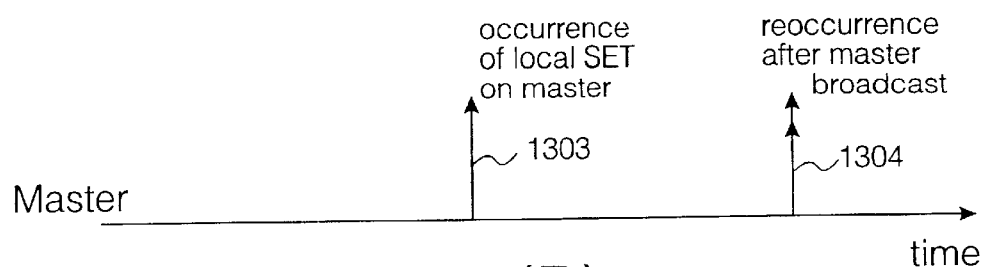

The second type of GET modify SET operations pertinent to the design of the RDM architecture are known as close proximity GET modify SET operations. Close proximity GET modify SET operations upon a single item of coherent data, are those comprising a second GET modify SET operation occurring within the coherence latency window of a first GET modify SET operation. The coherence latency window is the time between the occurrence of an initial SET operation and the occurrence of the resulting coherency broadcast SET operation broadcasts master TTM card 616. The coherence latency window 1301 for a local initiated SET operation is illustrated in FIG. 13. FIG. 13(A) illustrates an initial local SET operation 1302 effected by a local TPM card (or standby TTM card) and a re-occurrence 1305 on the local TPM card of said SET operation after a corresponding master TTM coherency broadcast. The time between operation 1302 and re-occurrence 1305 may be referred to as a local coherency latency window 1301. FIG. 13(B) illustrates the resulting effect on the master TTM card. Thus, the locally initiated SET operation 1302 shown in FIG. 13(A) occurs a short time after on the master TTM as indicated at 1303. Corresponding to local reoccurrence 1305 a re-occurrence after master broadcast 1304 is shown for the master processor. In the preferred embodiment operation 1304 is not received on the master processor as self receipt of broadcast messages is suitably disabled for the master processor.

Figure 14A:
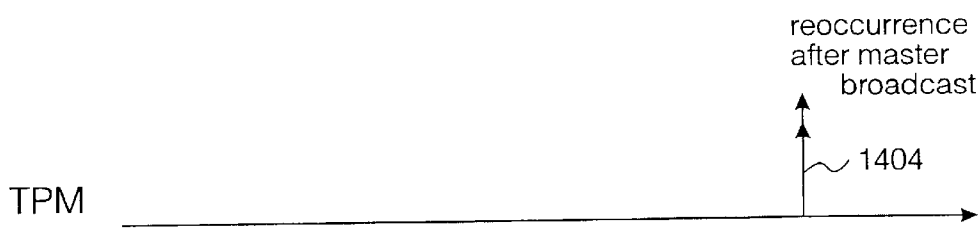
FIG. 14 illustrates a coherence latency window for a SET operation initiated by the master processing card.
Figure 14B:
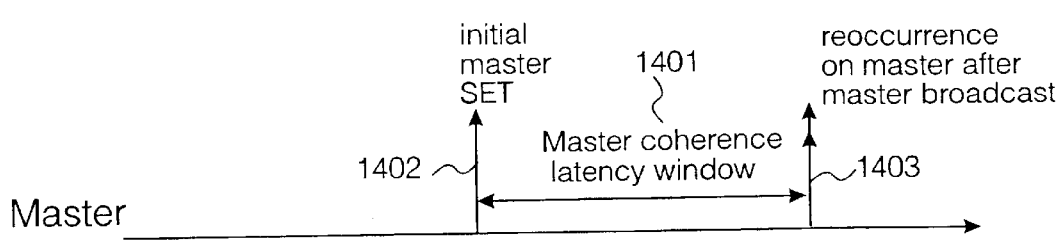

A coherence latency window also exists for master initiated SET operations and is shorter due to the lack of an initial local to master message transmission latency. The coherence latency window 1401 for a master initiated SET operation is illustrated in FIG. 14. FIG. 14(B) shows an initial master SET operation 1402 with a re-occurrence 1403 of said SET operation on said TTM master occurring a short time later. In the preferred embodiment operation 1403 is not received on the master processor as self-receipt of broadcast messages is suitably disabled for the master processor. FIG. 14(A) illustrates the occurrence 1404, of the initial master SET operation 1402 performed on the master TTM, on the TPM processor.

Figure 15:
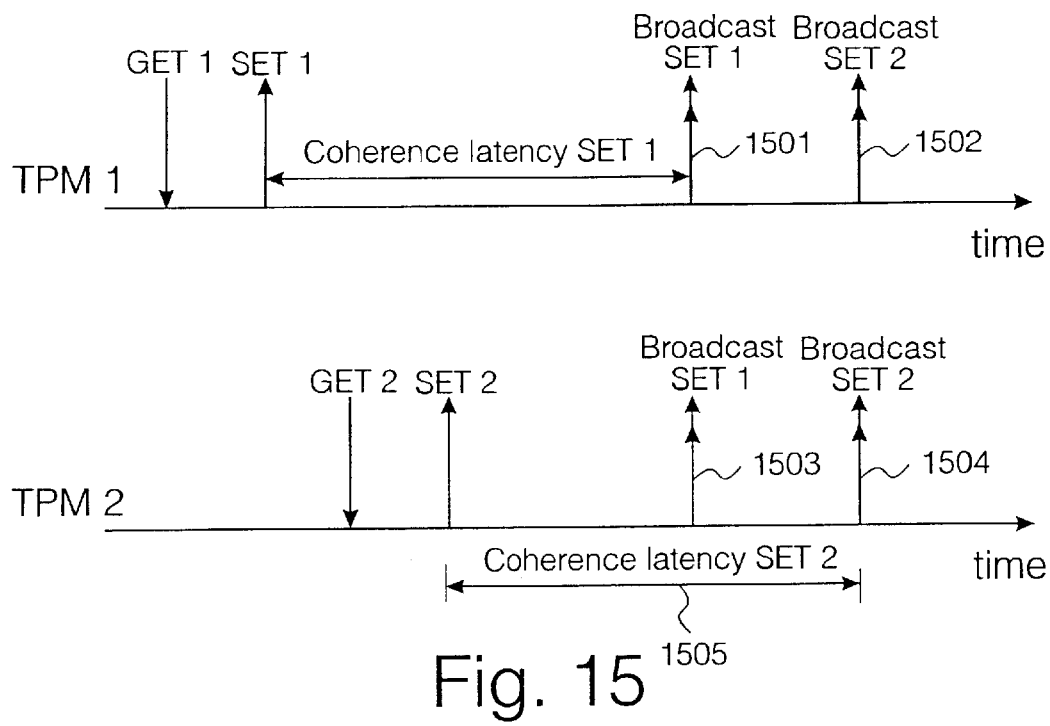
FIG. 15 illustrates schematically the effect on a single coherent data item of a second local GET modify SET operation occurring with the coherence latency window of a first local GET modify SET operation, for the case of two local GET modify SET operations upon a single coherent data item on different TPM cards.

FIG. 15 illustrates the case of two local GET modify SET operations upon a single data item which originate on different TPM cards. FIG. 15(A) related to a first card, TPM1 comprises a first GET operation, GET1 shortly followed by a first SET operation, SET1 related to the first GET operation. FIG. 15(B) relates to a second card, TPM2, wherein a second GET operation is effected after SET1 of FIG. 15(A) has been completed. The second GET operation, GET2 is similarly associated with a corresponding SET operation, SET2, again occurring relatively soon after the GET operation is performed. Each TPM card unicasts its effected SET operation to the master TTM card whereafter a master TTM card, having performed the specified operation upon is instance of replicated coherent data, broadcasts said effected SET operation. Thus TPM1 receives a first broadcast 1501 relating to its SET operation, SET1 and then receives a second broadcast SET operation 1502, relating to a SET operation (SET2) performed by TPM2. Similarly, TPM2 receives a broadcast SET1 operation 1503 and a broadcast SET2 operation 1504 both being received at the same time as for TPM1. From the perspective of TPM2, the coherence latency window 1505 extends the duration of the GET1 modify SET1 operation occurring on TPM1, resulting in the coincidence of the two GET modify SET operations. This results in only the GET2 modify SET2 operation on TPM2 being implemented, since this has the latest SET operations. As desired, both TPM cards end up with the same final value of the single item of coherent data being operated upon. In this case, the final value is a function only of the GET2 modify SET2 operation performed on TPM2. Thus the GET1 modify SET1 operation on TPM1 is lost. The disadvantage with this relates to the broadcast SET1 operation having caused an unnecessary SET operation 1501, on TPM1 and a temporary intermediate value 1503 on TPM2.

Figure 16:
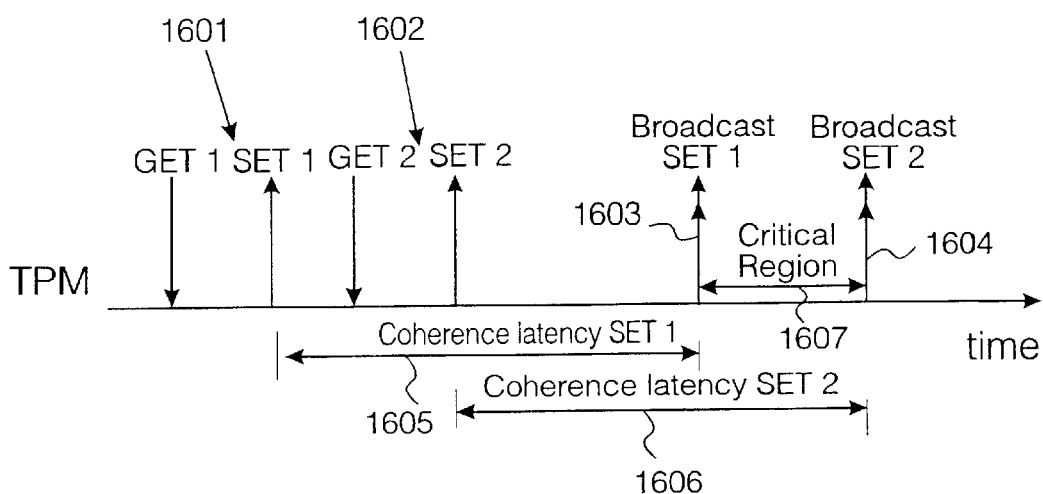
FIG. 16 illustrates schematically a case of two local GET modify SET operations upon a single data item on the same TPM card.

GET modify SET operations upon a single coherent data item originating on the same TPM are shown in FIG. 16. A first GET1 modify SET1 operation 1601 is performed followed shortly after by a second GET2 modify SET2 operation. 1602 The first and second GET modify SET operations are not coincident (for example compare with FIGS. 10 and 11). Following the SET2 operation, a broadcast SET1 operation 1603 is received followed by a broadcast SET2 operation 1604. Coherence latency 1605 associated with the SET1 operation together with coherence latency 1606 associated with the SET2 operation extends the duration of the GET modify SET operations causing the data item value to pass through the intermediate value of SET1, 1603, before returning to the value of SET2, 1604. The TPM card ends up with the correct final value for the data item which is a function of the two GET modify SET operations applied sequentially. However, broadcast SET1 operation, 1603 and the broadcast SET2 operation, 1604, create a critical region 1607 between the temporary intermediate value 1603 and the final value 1604 resultant from the broadcast SET2 operation. The occurrence of a further GET modify SET operation on the same TPM within this critical region would cause the loss of the GET2 modify SET2 operation. This is not desirable since the close proximity non-coincident GET modify SET operations, upon a single coherent data item, on the same TPM are required for correct operation of the integrated transceiver system application. The correct application of close proximity GET modify SET operations, upon a single coherent data item, across different TPM cards is not required since the ITS application is configured to prevent occurrences of this kind.

The correct application of close proximity GET modify SET operations on the same processor card is provided by identification and filtering of broadcast set operations autonomously by each processor card. The objective is thus to prevent any disruptive intermediate values from occurring, whilst at the same time ensuring that all processor cards are coherent with respect to the final values of data items which have been operated on.

From the above analysis of intermediate values which disrupt close proximity GET modify SET operations, on the same processor card, it is apparent that each processor card should individually filter out all broadcast SET operations within the interval between the latest locally initiated SET operation (SET2 in FIG. 16) and the corresponding broadcast SET operation (1604 in FIG. 16). Thus broadcast operation SET1, 1603, should be filtered out. Similarly, broadcast SET2 operation 1604 should also be filtered out for the processor card. From FIG. 16 it is seen that the interval referred to here is simply the coherence latency window 1606 of the last SET operation to have occurred on the processor card under consideration.

Figure 17A:
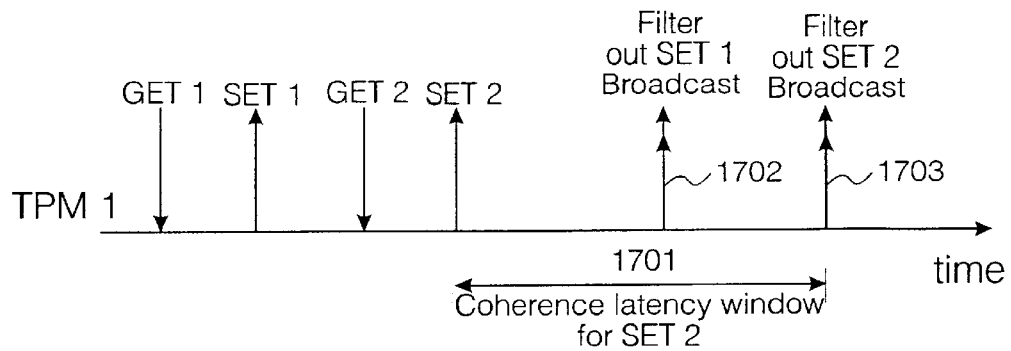
FIG. 17 illustrates schematically the requirements for providing the correct operation of close proximity GET modify SET operations on the same TPM (or master TTM) card, relying upon the identification and filtering of broadcast SET operations by each card individually.
Figure 17B:
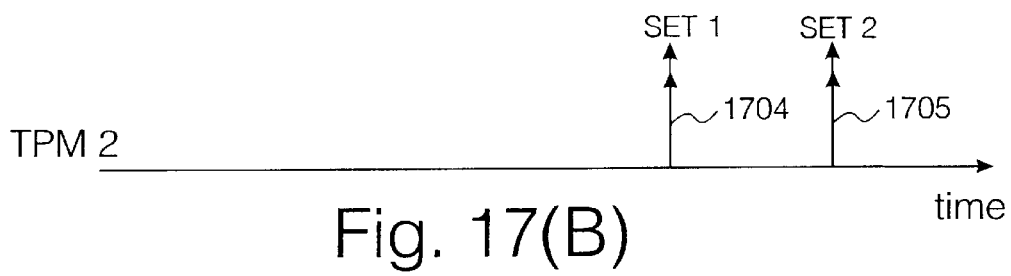

Thereafter, a second GET operation, GET2 is followed by its associated SET operation, SET2. Following the local SET2 operation, a coherency broadcast SET1 operation 1603 is received from the master processor card and similarly thereafter a second coherency broadcast operation 1604 is received relating to a SET2 operation. The coherence latency window for the SET2 operation is indicated at 1701 in FIG. 17(A). In accordance with the above discussion, both the broadcast SET1 operation 1702 and the broadcast SET2 operation 1703 are filtered out by TPM1 in accordance with the present invention as shown in FIG. 17(A). Thus, if broadcast SET operation filtering on processor card TPM1 removes both the critical region caused by the intermediate SET1 value and also the now redundant SET2 operation. FIG. 17(B) represents a timeline for a second TPM processor card, TPM2. The broadcast operations 1702 and 1703 identified in FIG. 17(A) are present for card TPM2 at 1704 and 1705 respectively since TPM2 is not required to filter out the broadcast SET operations since no locally initiated SET operation is outstanding.

Figure 18A:
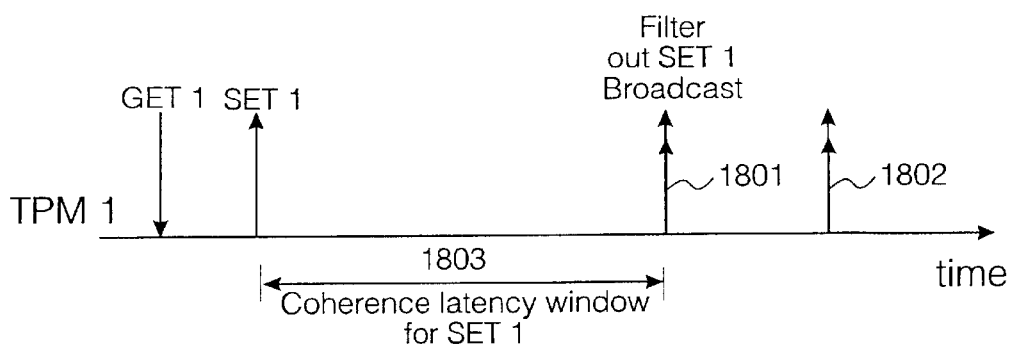
FIG. 18 illustrates schematically the requirements for correct operation of close proximity GET modify SET operations on different TPM cards wherein redundant broadcast SET operations are filtered out.
Figure 18B:
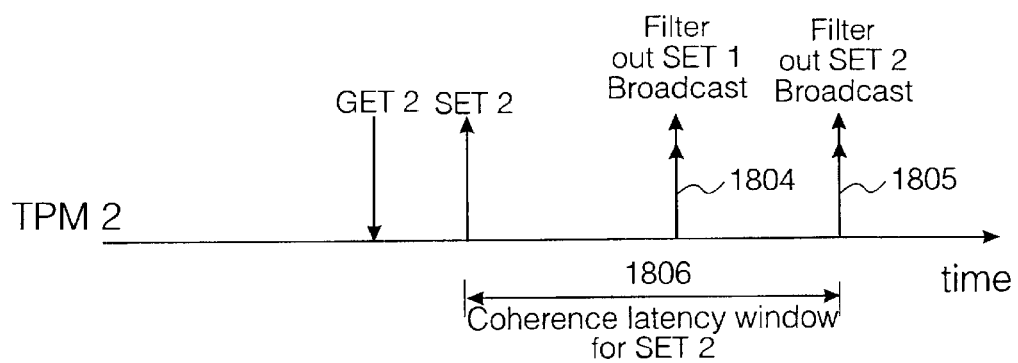

The rules illustrated in FIG. 17 may also be applied to the case of close proximity GET modify SET operations on different processor cards as illustrated in FIG. 18. FIG. 18(A) identifies a GET1 modify SET1 operation for a first TPM, TPM1. Similarly, FIG. 18(B) identifies a second GET modify SET operation, GET2 modify SET2, occurring on a different processor, TPM2. Broadcast SET1 and SET2 operations are received from the master processor card by both TPM1 and TPM2. Thus, TPM1 receives a SET1 broadcast operation 1801 followed by a SET2 broadcast operation 1802. The coherence latency window for the SET1 operation is identified at 1803. Similarly, TPM2 receives a SET1 broadcast operation, 1804 and a SET2 broadcast operation 1805 at the same instance in time as for processor card TPM1. The coherence latency window for the SET2 operation initiated by TPM2 is identified at 1806. The broadcast SET operation filtering on TPM1 and TPM2 removes all of the redundant broadcast SET operations. Thus, on card TPM1 broadcast operation SET1, 1801 is filtered out. Broadcast SET operation 1802 remains as this operation is not redundant for TPM1. TPM2 is required to filter out both received broadcast SET operations, broadcast SET operation 1804 being redundant by virtue of card TPM2 issuing a later SET2 operation on the coherent data item under consideration and the SET2 broadcast 1805 being redundant by virtue of the associated SET2 operation having been performed upon this TPM.

Collectively local replicated data managers associated with each TPM and standby TTM card, such as local replicated data manager 604, and master replicated data manager 617 comprise a replicated data manager (RDM) architecture in accordance with the present invention. The RDM architecture provides correct operation of close proximity GET modify SET operations on the same processor card and the overall architecture detailed in FIG. 19, comprises a local replicated data manager 604 associated with a TPM card (or standby TTM card in terms of its second mode or operation) and a master replicated data manager 617. Local replicated data manager 604 essentially comprises three components: local data manager 1901, local RDM handler 1902 and close proximity GET modify SET filter

1903. Strictly a local replicated data manager comprises only the latter two components and merely encapsulates local data manager 1901. Thus, the replicated data manager may be considered as bounded by box 1904. Similarly local RDM handler 1902 may encapsulate filter 1903, but for illustrative purposes, the two are shown as physically distinct. Local data manager 1901 directly receives, from the application layer, operational instructions 1905 which do not require replication for coherency purposes. These include local GET/SET operations upon local data 1906 and local GET operations upon coherent data 1907 as identified in FIG. 8(A) and high-level operational instructions such as data look-ups. As indicated these operational instructions may be considered to originate from a general function labeled "dmgr*( )". A second function labeled "dmgrSetint( )" provides local SET operation instructions from the application layer as indicated at 1908. Operational instructions 1908 are directed to local RDM handler 1902 forming part of local replicated data manager 1904. Upon receiving a local SET operation instruction 1908 local RDM handler 1902 is required to invoke processes related to data replication before instructing local data manager 1901, via function call 1909, to perform the specified operation. Thus, in these circumstances an operation 1908 represents a coherency GET modify SET operation which is ultimately to be effected upon coherent data 1907 via invoking the function labeled "RawdmgrSetint". This function simply effects the required SET operation. Coherency GET modify SET operations specified by a local operational instruction 1908 effect local RDM handler 1902 to enable filter 1903 via an enable filter process 1910. This process effectively locks (or protects) a data item from further update by externally originated SET operations as soon as it is updated locally. Following filter enablement local RDM handler 1902 instructs local data manager 1901 via function call 1909 to perform the specified operation. Local RDM handler 1902 is then required to send a unicast local SET operation message 1911 to the master replicated data manager 617. For the data item specified in operational instruction 1908 filter 1903, locked by process 1910, remains locked for the specified data item until a corresponding coherency broadcast SET operation 1912 is received from replicated master data manager 617. Upon receiving a broadcast SET operation 1912, stimulated by unicast message 1911, transmitted by the master card in response to the unicast message 1911, filter 1903 is effectively disabled by handler 1902 in accordance with the "disable filter" process identified at 1913.

Coherency broadcast SET operations 1912 may arise from local SET operations performed by another local replicated data manager (or the master replicated data manager) associated with another processor card. Thus, an operation 1912 may relate to either a coherent data item currently locked for a local replicated data manager under consideration (locked by virtue of the processor being that from which an operation originated is an originating processor) or may relate to a coherent data item which is not currently locked by said local replicated data manager. Operational instructions received via a broadcast message which originate from another processor card (a card other than the card under consideration i.e. a card other than the originating processor) and which do not relate to a locked data item as described above require handler 1902 to simply call function 1909 which effects said operation upon the specified data item in coherent data 1907. Therefore upon receiving a coherency broadcast SET operation 1912, handler 1902 is required to determine the nature of the specified operation via process 1914 ("Get Filter Status") which effectively determines the status of the filter with respect to the data item specified by operational instruction 1912 and any operations related to locked data items are ignored.

In addition to the above processes, a further process 1915 ("Retry Request") may be invoked which relates to local RDM handler 1902 being instructed, via processing of information in filter 1903, to resend a unicast local SET operation message 1911. This condition results from an initial unicast local SET operation message 1911 not being complimented or acknowledged by a corresponding coherency broadcast set operation message 1912, in a predetermined time-out. Thus, if a corresponding broadcast SET operation message 1912 is not received in a predetermined time, filter disablement 1913 is not effected. Upon detection of non-disablement of filter 1903 in the specified time, filter 1903 effectively invokes process 1915 effecting local handler 1902 to re-issue the required unicast local SET operation 1911. This additionally invokes handler 1902 to re-enable filter 1903 (for the data item specified in the SET operation) via process 1910 in the manner described above for a first transmitted unicast message related to an operational instruction 1908.

Local RDM handler 1902 in conjunction with filter 1903 is also configured to detect failure conditions in operations of the integrated transceiver system. Thus, any local TPM card or standby TTM card, may detect missing coherency broadcast SET operations, that is broadcast operations which have either not been transmitted by master processor 617 or which have not been received by said local card. Upon detection of one or more missing coherency broadcast SET operations, local RDM handler 1902 is configured to issue a local recovery request 1916. Further details relating to operation of a replicated local data manager, either as unicast message originator or as a recipient of a broadcast SET operation originated from another processor card, are provided in greater detail herein below.

Master replicated data manager 617 essentially comprises three components, master data manager 1917, master RDM handler 1918 and coherency recovery manager 1919. Master replicated data manager 617 may merely encapsulate master data manager 1917 and thus strictly may only comprise handler 1918 and master data manager 1917 as indicated by broken box 1920.

Master data manager 1917 directly receives, from the application layer, operational instructions 1921 which do not require replication for coherency purposes. As identified in FIG. 8(B) these include local GET/SET operations upon local master data 1923 and local GET operations upon mirrored data 1922 and coherent data 1924 in addition to high-level operational instructions such as data look-ups. As indicated at 1921 these operations may be considered to originate from a general function labeled "dmgr*( )".

A second function labeled "dmgrSetint( )" provides local master SET operation instructions 1925 from the application layer. Operational instructions 1925 are directed to master RDM handler 1918 forming part of master replicated data manager 1920. Upon receiving a local master (local to the master) SET operation instruction 1925 master RDM handler 1918 is required to invoke processes related to data replication before instructing master data manager 1917, via function call 1926, to perform the specified operation upon an identified data item. Thus, in these circumstances an operation 1925 may represent a coherency GET modify SET operation which is ultimately to be effected upon coherent data 1924 via invoking function 1926 labeled "RawdmgrSetint". This function simply effects the required SET operation. However the process of effecting an update of a coherent data item of coherent data 1924 is required to be atomic in the sense that a further SET operation on the data item should be prevented until the former action is completed. This is required because unlike in the case of a local replicated data manager described above a close proximity filter (which provides the required protection in the local replicated data manager case) is not required other than for atomicity in this respect. Thus an alternative implementation of a master replicated data manager may include a filter of the type identified for a local replicated data manager, but unnecessarily complicates both the functionality in terms of processing required and the system architecture. Atomicity as described is required to protect against attempted simultaneous SET operations on the same data item either arising from a further operational instruction 1925 or from a unicast message 1911 specifying the identified data item in question.

Following update of the specified coherent data item master RDM handler 1918 is then required to transmit a broadcast SET operation message 1912 to all processor cards so as to effect coherency of said updated data item with both the TPM processor cards and the standby TTM card. Since every broadcast message issued is given a sequential identifier (broadcast tag), then as described above, a local RDM handler 1902 is configured to detect coherency broadcast SET operations 1912 which are missing. Upon detection of one or more missing coherency broadcast SET operations, a local RDM handler 1902 is configured to issue a local recovery request. A request of this type constitutes a unicast message 1916, transmitted from card 604, under control of handler 1902, to card 617.

Master RDM handler 1917 is required, via invocation of process 1927, to record every coherency broadcast 1912 through updating a history list maintained by coherency recovery manager 1919. Since coherency broadcast SET operation messages 1912 are issued sequentially the history list is also updated sequentially with a record of the broadcast tag assigned and a data item reference. Upon receipt of a local recovery request 1916 specifying missed broadcast messages, master RDM handler 1918 is configured to invoke a request recovery process 1928 so as to invoke coherency recovery manager 1919 into effecting a suitable response to the requesting local replicated data manager.

Figure 19:
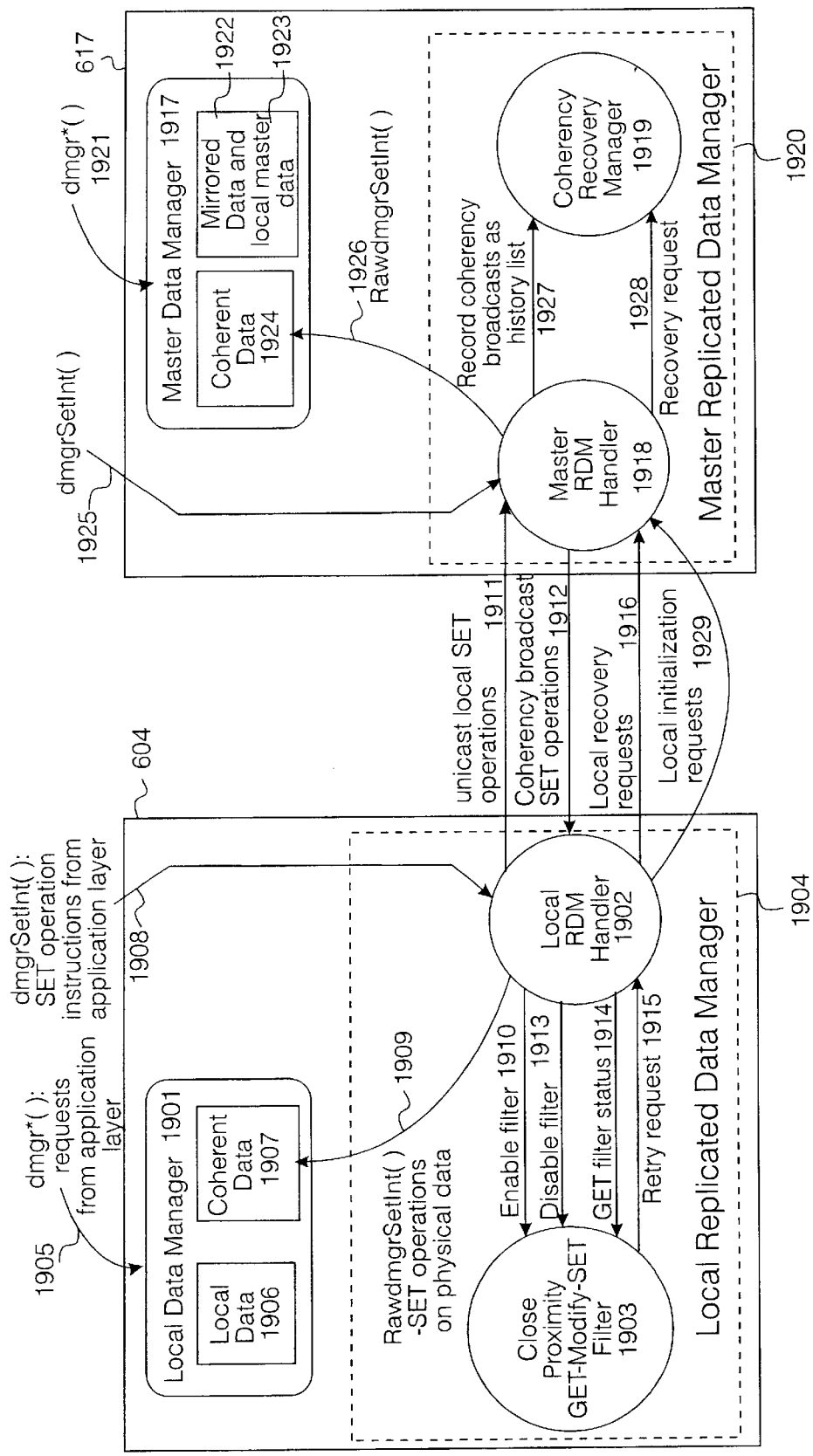
FIG. 19 illustrates schematically components of a replicated data manager, in accordance with the present invention, comprising a modified local data manager and a modified master data manager configured to correctly implement operation of the close proximity GET modify SET operations identified in FIGS. 17 and 18.

The components of the replicated data manager architecture identified in FIG. 19, may be implemented in hardware as applications specific integrated circuits (ASIC's). ASIC's are designed to carry out one or more specific functions and are implemented on a single semi-conductor chip, as is known in the art, in order to reduce the size of the system, reduce the number of interconnections required at printed circuit board level, and to reduce the number of components that, at a lower level of integration, might otherwise be used to implement the function. Such devices typically run at speeds comparable with the common bus 611 identified in FIG. 6. Alternatively, the replicated data manager architecture may be implemented in software, object oriented technology being preferred in terms of engineering reliable software required in maintaining data coherence across said TPM and TTM cards.

As indicated earlier, filtering refers to providing correct operation of close proximity GET modify SET operations on the same TPM card. Filtering of this kind is provided by an autonomous local tagging scheme meaning that each TPM (and standby TTM) card has its own private tagging scheme. As well as providing correct operation of close proximity GET modify SET operations, this scheme also addresses the issue of protecting local to master (ie TPM to TTM) SET operations thereby ensuring retries are always issued for any lost local to master SET operations, essential to the correct termination of the filtering window. The filtering window may be defined as the time in which an item of coherent data is prevented from being further updated by an external SET operation. The term local tag is used to differentiate the locally generated tags generated on each TPM card and standby TTM card, from the master generated tags used to implement protection of transmitted coherency broadcasts. Thus, the term broadcast tag refers to a tag associated with a broadcast message arising from either a local to master SET operation which has been received by the master processor (TTM) or a SET operation initiated on the master processor. Correct operation of close proximity GET modify SET operations requires each local processor card to be aware of two things in order to process each incoming broadcast SET operation correctly. Firstly, a local card is required to monitor whether or not it has an outstanding broadcast SET operation on a given data item. In accordance with the present invention, to recognize that an outstanding broadcast SET operation exists, a local card uniquely identifies each local to master SET operation it transmits so that corresponding broadcast SET operations performed by the master are recognizable by the originating local processor card. Furthermore, the local card is required to store the unique identifier as a function of the data item, but only for the latest local to master SET operation it has transmitted. Finally, an originating local card is required to perform processing to dispose of the unique identifier once a corresponding broadcast SET operation has been received. In the preferred embodiment, recognition of outstanding broadcast SET operations is performed by a local card through its placing a unique local tag into each unicast local to master SET operation message wherein the local tag is additionally stored as a function of data item in a local table. By unique it is meant that such tags are specific to a particular TPM card or the standby TTM card. If a local tag specifying a particular coherent data item is already stored for the data item specified in the table, then it is overwritten with the new local tag, since this will ensure that only the latest outstanding broadcast SET operation is recognized for the data item.

The master processor card (TTM) is required to ensure that the local tag received in a unicast message 1911 is returned within the corresponding broadcast SET operation message 1912. Furthermore, the TTM card is required to ensure that the transmission order of the local to master SET operation messages is maintained for the broadcast SET operation messages.

Upon receiving each broadcast SET operation message, a given local card refers to its local table to check if an entry exists for the item. If no such entry exists for the item under consideration, then no broadcast SET operation, initiated by that particular local card, is outstanding and therefore the SET operation is performed since this SET operation is determined to result from an action performed by another local processor.

If an entry exists for the data item within the local table, a broadcast SET operation initiated by the TPM card, is outstanding and the local tag carried in the broadcast message is compared with the stored local tag. If the local tag stored in the table and the tag associated with the broadcast message do not match, then the broadcast SET operation is determined not to result from the latest local to master SET operation sent by the TPM card. In such circumstances the received broadcast local to master SET operation is ignored. However, if the locally stored tag is determined to match the broadcast tag within the received broadcast local to master SET operation, then the broadcast message is determined to result from the latest local to master SET operation (concerning the data item in question) sent by that local card. In these circumstances the received broadcast SET operation is ignored and the entry for the data item is removed from the table. The above procedures may be summarized in the form of state transition tables, said tables relating to state transition of a given local processor card. Table 1 summarizes the actions performed by a TPM card or the standby TTM card relating to transmission of a local to master SET operation. Depending upon whether an entry is determined to exist in the local tag table, for a particular data item under consideration, an entry in the local tag table is either created or overwritten.

TABLE 1

Post-condition for Local SET Operation

| Condition | Action |
| --- | --- |
| No entry for data item | Create entry to store next unique local tag value and local time stamp. Transmit local tag value in local-master SET operation message. |
| Entry exists for data item | Overwrite entry with next unique local tag value and local time stamp. Transmit local tag value in loca-master SET operation message. |

Table 2 details actions performed by a local processor card upon receiving a broadcast SET operation message. If no entry is determined for a data item under consideration, the received broadcast SET operation specified is performed otherwise if an entry exists the broadcast SET operation is ignored. Furthermore, if it is determined that the value of the local tag in the local table matches the value of the received broadcast tag, then the local tag entry in the local table is removed.

TABLE 2

Pre-condition for Broadcast SET Operation

| Condition | Action |
| --- | --- |
| No entry for data item | Perform broadcast SET operation. |
| Entry exists for data item and local tag values do not match | Ignore broadcast SET operation. |
| Entry exists for data item and local tag values match | Ignore broadcast SET operation. Remove entry. |

Figure 20:
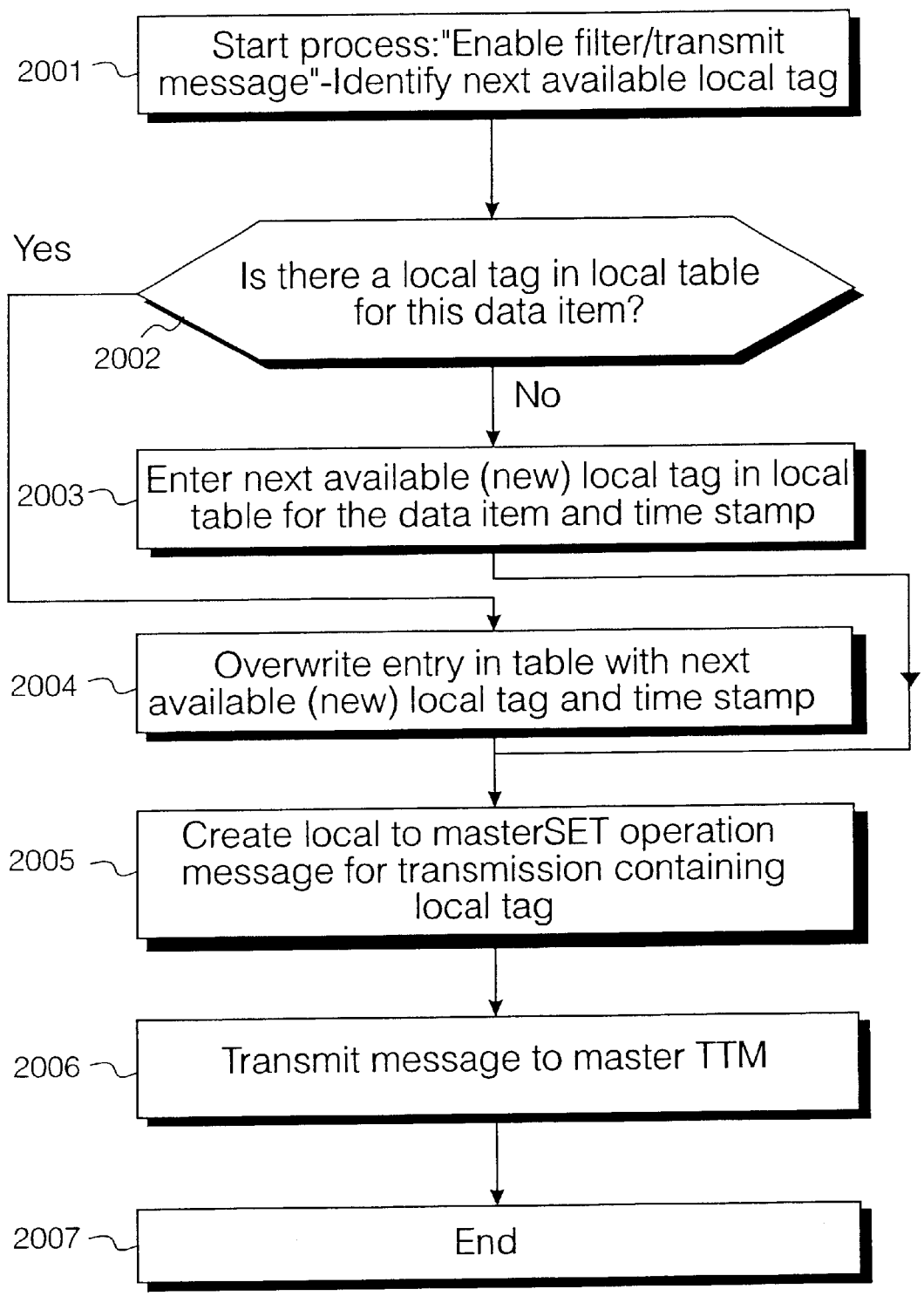
FIG. 20 details a filter enablement process identified in FIG. 19 which includes steps for manipulating a local table of local operations performed upon coherent data.
Figure 21:
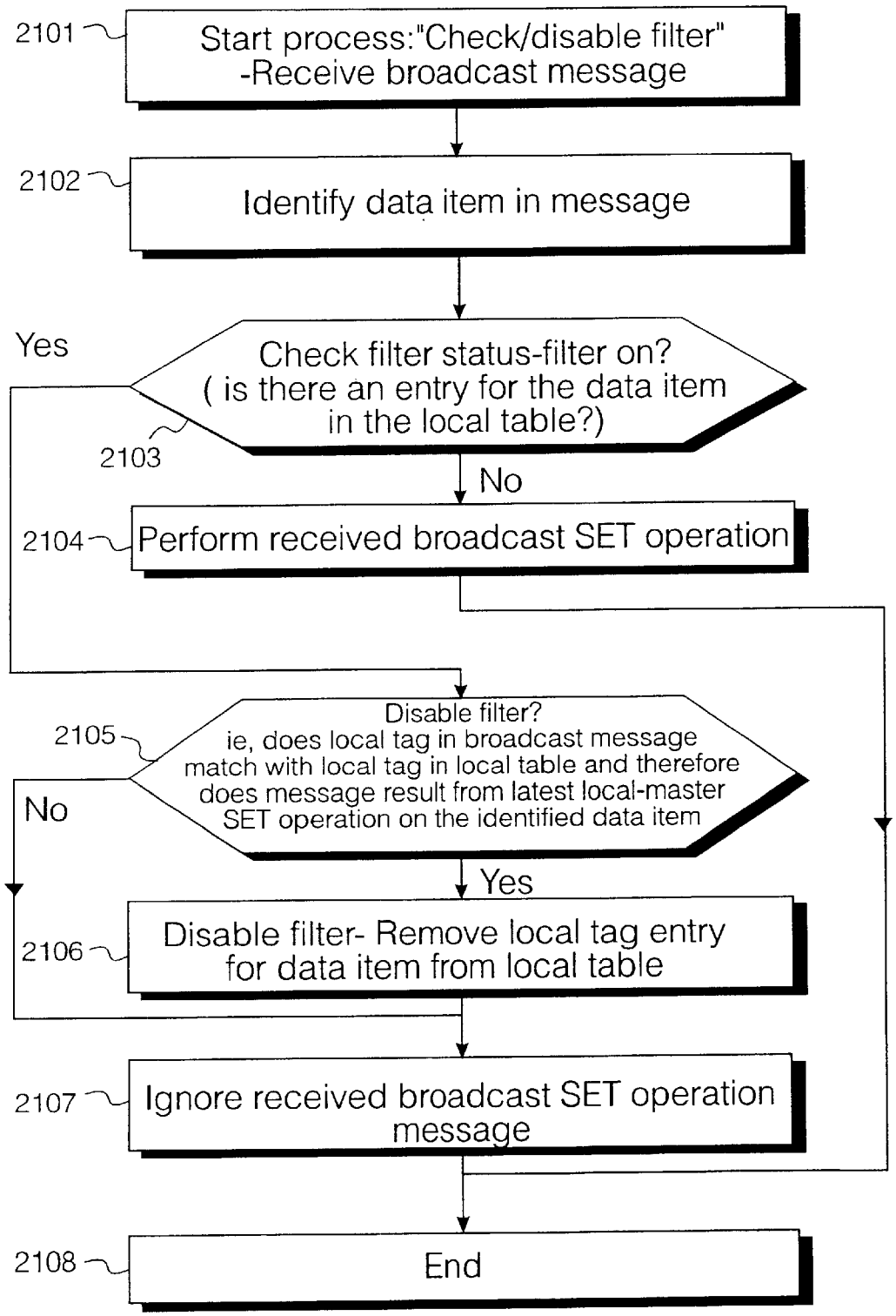
FIG. 21 details receipt of a broadcast message transmitted by the master replicated data manager identified in FIG. 19 and includes a step effectively disabling the filter enabled by the process detailed in FIG. 20.

In accordance with the present invention, FIGS. 20 and 21 collectively detail processes performed by a TPM card (or standby TTM card) to provide correct operation of close proximity GET modify SET operations on the same local card.

FIG. 20 details the process invoked by local RDM handler 1902 relating to enabling of the close proximity GET modify SET filter 1903 in response to performing a local SET operation specified by a local SET operation instruction 1908. This process runs on all local processing cards. At step 2001 local RDM handler 1902 identifies the next available local tag or identifier for the data operation specified. Following step 2001 a question is asked at step 2002 as to whether there is already a local tag in the local tag table for the specified data item. This question relates to whether this new SET operation has been performed before a broadcast SET operation has been received for a previous SET operation on this coherent data item. If the question asked at step 2002 is answered in the negative, then the tag identified at step 2001 is entered into the local table for the data item specified as indicated at step 2003. Furthermore, step 2003 includes a local time stamp being entered into the table corresponding to the tag allocated. However, if the question asked at step 2002 is answered in the affirmative, then at step 2004 the existing entry for the data item is overwritten with the next available (new) local tag (identifier) value and a local time stamp is assigned. Following steps 2003 or 2004, a local to master SET operation message is created containing the new local tag assigned in the preceding step. Following step 2005, a tagged local to master SET operation message 1911 is transmitted at step 2106 to the master TTM card over the IPC bus 611 identified in FIG. 6. Following message transmission the process is effectively terminated as indicated at step 2007.

The process invoked by a local TPM card (or standby TTM card) upon receiving a coherency broadcast SET operation message 1912 is detailed in FIG. 21. Upon receipt of a broadcast message transmitted by master RDM handler 1918, local RDM handler 1902 effectively invokes this process at step 2101 and at step 2102 identifies the coherent data item to which the broadcast relates. At step 2103, a question is asked as to whether an entry exists for the identified data item in the local table. In other words, this question relates to whether the filter is effectively switched on for the data item identified at step 2102. If this question is answered in the negative, to the effect that no broadcast SET operation initiated by the TPM card under consideration is outstanding for the identified data item, then at step 2104, the received broadcast SET operation is effected via RDM handler 1902 instructing local data manager 1901 to implement the specified operation upon coherent data 1906. In this case, the received broadcast SET operation will result from a SET operation initiated by a processor card other than the TPM card under consideration. Following step 2104 control is passed to step 2108 where the process is terminated. However, if the question asked at step 2103 is answered in the affirmative to the effect that an entry does exist in the local table (indicating that a broadcast SET operation resulting from a SET operation performed by this local card is outstanding) then control is passed to step 2105 wherein the local tag contained in the received broadcast message is compared with the local tag stored for the data item in the local table and a question is asked as to whether the broadcast message tag matches the local tag stored in the local table. This question relates to whether or not the broadcast message results from the chronologically latest local to master SET operation sent by this local processor card and thus as to whether the filter is to be disabled for the coherent data item identified at step 2102. By chronologically latest operation it is meant the property arising from when the identifier within the received identified copy matches with the stored identifier. If the question asked at step 2105 is answered in the affirmative, to the effect that the broadcast SET operation message received does result from the chronologically latest local to master SET operation sent by this card (ie the identifier within the received identified copy matches the stored identification) then control is passed to step 2106. At step 2106, the local tag entry for the identified data item is removed from the local table, thus disabling the filter for the identified coherent data item. Step 2106 effectively signals an end to end acknowledgment that a local to master SET operation sent by this card has been broadcast by the master TTM card and received by the originating card and effectively disables filter 1903 for the message originally transmitted at step 2006 in FIG. 20. Following step 2106, the processor card is configured to simply ignore the received broadcast SET operation message as indicated at step 2107. Similarly if the question asked at step 2105 is answered, or determined to be, in the negative, to the effect that the broadcast SET operation message received does not result from the latest local to master SET operation sent by this card then control is passed to step 2107 wherein the broadcast SET operation received is ignored. Thus as identified a determination detailed is responsive in that an operation on a specified data item is only affected if a stored local tag is determined not to exist. Following step 2107 control is passed to step 2108 wherein the process is terminated.

Thus in accordance with the present invention there is provided, in a data processing system having a plurality of communicating processors, each processor having a local memory storing an instance of replicated data, a method of managing operations performed on the replicated data instances to maintain coherence between the data instances. The method essentially comprises an originating processor performing an operation on an item of its replicated data instance and storing an identifier relating data item operated upon to the performed operation. Following this, the originating processor is configured to stimulate a broadcast of at least one message, the broadcast message including a copy of the identifier, information specifying the operation performed and information identifying the data items. Thereafter at each processor, a broadcast messages is received and a procedure is invoked to determine if a stored identifier exists for the data item identified in the broadcast message. In response to the determination a given processor is configured to perform the operation on the identified data item if a stored identifier does not exist for the data item. However, if the stored identifier is determined to exist for the identified data item, then a receiving processor is configured to determine if the received identifier copy results from a chronologically latest operation performed on the data item by the receiving processor. If the copy does result from a chronologically latest operation then a determination of this kind effects removal of the stored identifier and the received broadcast message is effectively ignored.

The invention may also be construed as method of processing data to maintain coherence between local instances of stored data, the data being replicated across a plurality of communicating processors. Essentially the method comprises effecting data operations on a local instance of data; broadcasting messages to the plurality of processors wherein the messages specify the data operations; and receiving broadcast messages at the processors. By information specifying the operation to be performed it is meant information comprising the value used by the operation on the data item but "operation" may also be construed as meaning value of a data item, in terms of the present specification. In the preferred embodiment, a broadcast message is broadcast by a processor designated to broadcast messages (this processor alternatively being known as a master processor) and the designated processor receives messages carried on a bus from said originating processors in a sequentiating order governed by a message input queue from the bus to the designated processor.

One way in which the invention may be construed relates to a local processor effecting a data operation upon a local replicated data instance whereafter a message is transmitted which specifies the effect of data operation to a master processor, the master processor broadcasting data operations received to all processors of the plurality. Upon receipt of such broadcast messages, each processor is configured to filter the operation specified in the broadcast messages so as to selectively effect the data operations contained therein.

The protection of local to master SET operation messages is closely coupled to the local tagging scheme for broadcast SET operation filtering described above. Local to master SET operation messages must be protected to ensure that retries are always issued for any lost local to master SET operations. This is provided by invoking a retry process 1915 as identified in FIG. 19. Protection in this way is essential to allow correct termination of the close proximity GET modify SET filtering mechanism identified in FIGS. 20 and 21. Additionally the filter mechanism prevents unnecessary changes (known as "churning" of the value of a given item on the same processor. Implementation relating to protection of local SET operation messages in this way removes the requirement for the master processing card (TTM) to detect and request a retry of any lost local to master SET operation messages from the originating local card, and thus provides a more highly distributed solution. Referring to FIG. 21, step 2106 as described above involves removal of a local tag entry from the local tag table and this effectively signals an end to end acknowledgment for the original local to master SET operation message issued at step 2006 in FIG. 20. The time stamping (specifically local time) of each local tag entry implemented in either step 2003 or step 2004 of FIG. 20 is entered into the local table. Such local time stamping allows a regularly scheduled demon (device monitor) to detect whether an end to end acknowledge has exceeded a desired predetermined time out. If a further SET operation is performed upon the same coherent data item, before the broadcast SET operation corresponding to the original SET operation is received, then both the local tag value entry and the time stamp are updated (step 2004) through the process detailed in FIG. 20 being reinvoked. The effect of this is to restart the time out for the new SET operation performed upon the data item, since no end to end acknowledge for the earlier SET operation is required as the earlier broadcast SET operation is ignored upon receipt in accordance with step 2105 in FIG. 21 being answered in the negative resulting in control being passed to step 2107. Upon detection of an end to end acknowledge time out, the original local to master SET operation message is retransmitted by local RDM handler 1902. Again, as above, both the local tag value and the local time stamp are updated in accordance with step 2004 of FIG. 20. If for some reason the original broadcast SET operation is received it is simply ignored in accordance with the procedural steps identified in the process detailed in FIG. 21.

Figure 22:
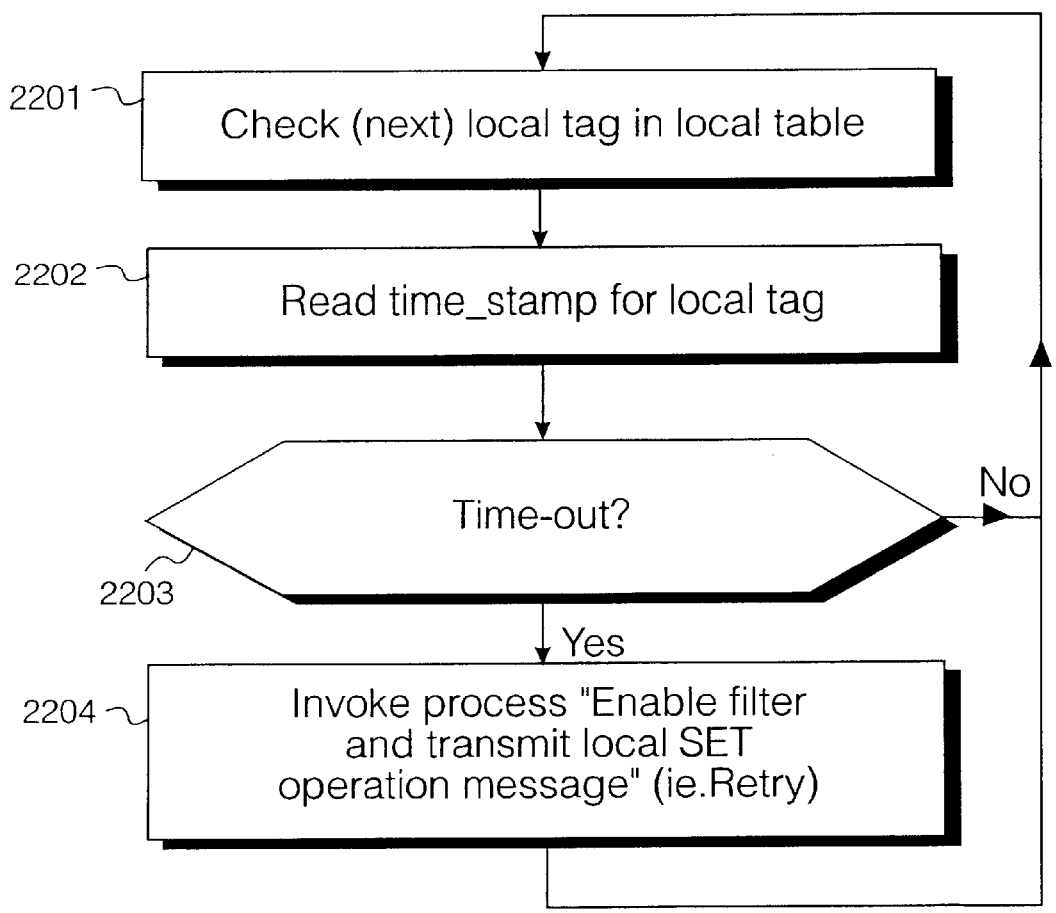
FIG. 22 details a process operating in the local replicated data manager which effectively checks if a message transmitted in accordance with FIG. 20 has been acknowledged by a received message as indicated in FIG. 21, and includes a step for re-invoking the process identified in FIG. 20.

FIG. 22 details the basic mechanism implemented by a demon process for checking whether a particular entry in a local tag table has timed out. The demon periodically checks the local tag table for local tags that have not been removed in accordance with step 2106 identified in FIG. 21. At step 2201 the next local tag in the local tag table requiring checking is identified and its associated time stamp is read at step 2202. At step 2203 a question is asked as to whether the time stamp associated with the local tag indicates a time out. By time out it is meant that a predetermined period of time since the time stamp was allocated has elapsed. Thus the demon is capable of determining the time that it checks the time stamp and is able to calculate the lapsed time and compare this with a predetermined period designated for effecting a time out. If the question asked at step 2203 is answered in the negative then the demon checks the next local tag in the local table to be checked. However, if the question asked at step 2203 is answered in the affirmative to the effect that a time out has occurred for the local tag under consideration, then at step 2204 the demon invokes the process detailed in FIG. 20 such that the close proximity GET modify SET filter is enabled for the operation specified by the local tag whose time stamp has elapsed. Step 2204 representing the demon sending a signal to invoke filter 1903 effectively results in a request for a message to be retransmitted to the master RDM handler as identified at step 2006 in FIG. 20. Following step 2204 the demon moves on in terms of its schedule to check the next local tag at step 2201 in the local table thus repeating the process in a cyclic manner.

Figure 23:
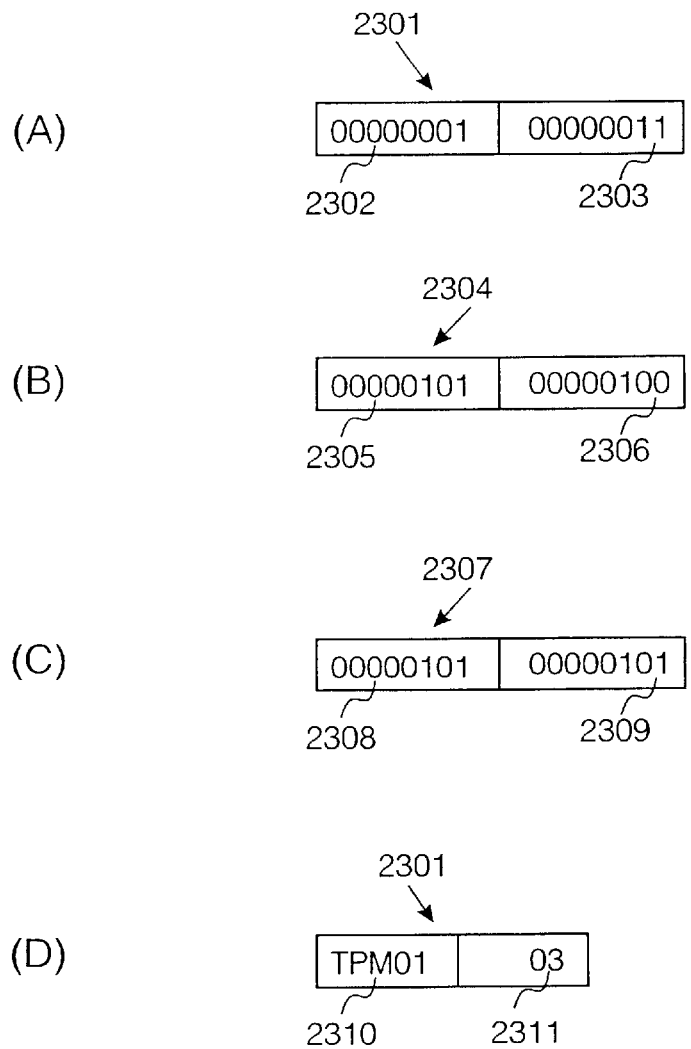
FIGS. 23(A–D) illustrate local tags contained in messages transmitted and received in FIGS. 20 and 21 respectively.

As indicated above, local tags generated by each TPM card and standby TTM card are required to be unique from a system wide perspective. Local tags of the type used in the preferred embodiment are shown in FIG. 23. FIG. 23(A) shows a first local tag 2301 comprising a first 8 bit field 2302 which contains the information identifying the TPM card (or standby TTM card) and a second 8 bit field 2303 containing a modulo n cyclic value which is different for each local tag generated at that processor, and which serves to designate where in an order of messages, generated at that processor, the message identified by the local tag lies. The exact size of fields 2302 and 2303 is dependent upon the required functionality of a particular ITS implementation, but in the preferred embodiment the cyclic value field 2303 is sixteen bits giving a total of 2 to the power 16 possible local tag values. Field 2302 identifies the control card associated with tag 2301 as TPM card number 1. In the example shown, field 2303 identifies the value of n to be 3 in binary digits (the third tag generated in the cyclical sequence). FIG. 23(B) shows a second local tag 2304 comprising a first field 2305 and a second field 2306. Field 2305 contains the binary number 00000101 identifying the TPM card which generated this local tag as TPM card number 5. The n value given in field 2306 translated from binary digits is identified as the fourth local tag to be generated by TPM card number 5. FIG. 24(C) shows a third local tag 2307 comprising a first field 2308 representing TPM card number 5 and a second field 2309 indicating that this local tag is the next one to be generated (the fifth) after tag 2304 shown in FIG. 23(B). FIG. 23(D) provides a description of tag 2301 shown in FIG. 23(A) suitable for the following description. Thus field 2302 is replaced by representation 2310 and field 2303 is replaced by the decimal equivalent as indicated at field 2311.

Figure 24:
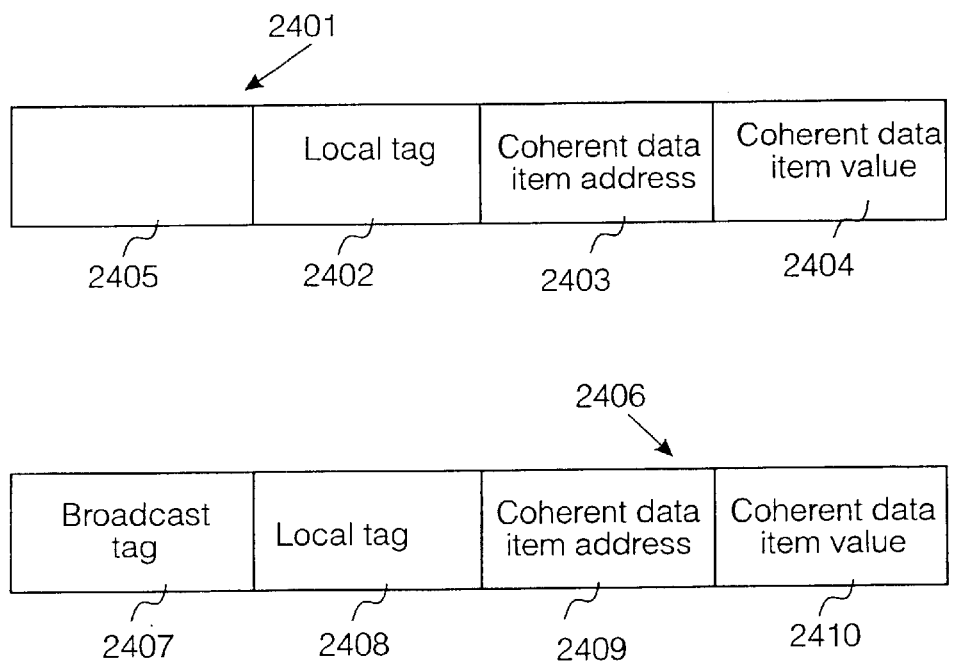
FIG. 24 illustrates a local SET operation message of the type transmitted in accordance with FIG. 20, and a broadcast SET operation message of the type received in FIG. 21.

FIG. 24 illustrates a local SET operation message 2401 as transmitted at step 2006 in FIG. 20 and a broadcast SET operation message 2406 of the type received at step 2101 in FIG. 21. Local SET operation message 2401 comprises four fields as follows. Field 2402 holds a local tag of the type identified in FIG. 23, but comprising 16 bits in the preferred embodiment; field 2403 holds the address of the coherent data item operated on by local data manager 1901; field 2404 contains the value of the coherent data item located at the address given in field 2403 and field 2405 (the furthest field to the left in the diagram) is redundant. Thus, the value held in field 2404 effectively represents the resultant effect of the operation performed upon coherent data 1906.

Broadcast SET operation message 2406 comprises four fields. A first field, 2407, contains a broadcast tag which is essentially a sequential numerical value identifying the particular message broadcast. The first broadcast message will be a numerical value of 1 and a second broadcast message value 2 and so on. The range of broadcast tags is limited to a value n so that eventually the tags generated will be repeated in terms of numerical values allocated. Thus, the value of n is required to be chosen such that repetition of use of a given broadcast tag is prevented for the lifetime of said tags. Field 2408 contains a local tag of the type identified in FIG. 23 and which corresponds to a local tag received in message 2401. Field 2409 contains the address of the coherent data item transmitted in message 2401. Similarly field 2410 contains the value of the coherent data item transmitted in message 2401. Thus, field 2403 and 2408 contain the same information and fields 2404 and 2409 contain the same information messages passed in the system are preferably all of the same physical length with unused fields simply carrying information. Message size in general may be prescribed as required, this generally being dependent upon particular requirements of a given ITS implementation. Fields 2402, 2403 and 2404 may be referred to as the header of unicast message and fields 2407–2409 comprise the header of a broadcast message. For specific implementations incorporating use of various types of SET operations a broadcast message may also be required to include an operation type descriptor.

An example of a local table referred to at step 2003 in FIG. 20 for storing local tags generated by each TPM card and standby TTM card, is illustrated in FIG. 25. FIG. 25(A) details a local table for TPM card TPM01. The table comprises four columns as follows: Column 2501 containing the addresses of coherent data which have been operated upon by a local GET modify SET operation originated by TPM01; a second column 2502 representing the value stored at the corresponding coherent data address given in column 2501; column 2503 identifying the local tag associated with a given local GET modify SET operation which gave rise to the values contained in column 2502; and column 2504 containing time stamp information associated with each item of coherent data operated upon. For ease of description coherent data addresses are given as lower case letters, values associated with said addresses are given decimal numerical values, local tag values are illustrated as identified in FIG. 23(D) and time stamps are illustrated as capital letters. This illustrative time stamp information depicted should be considered sequential in terms of the English alphabet sequence. Thus a letter occurring later in the alphabet represents a later time than a letter occurring earlier in the alphabet. All the local tags in column 2503 are identified as tags associated with TPM card TPM01. The cyclic value associated with each tag is sequential with respect to the row said tag is located on. The last tag shown is in column 2503 at row 2505 and represents the seventh local tag generated by TPM01. This is associated with time stamp E in column 2504 and represents the last locally generated tag shown in this table. In other words this table may be considered to be a snapshot taken at a time immediately after row 2505 was used to contain information relating to coherent data address c as shown. Each row of a local table represents a single record of information relating to an item of data in local memory operated upon and therefore modified by the associated local processor.

FIG. 25(B) illustrates a second table for TPM card TPM01 after a timed interval has elapsed. The first row, 2506 still relates to coherent data address m, but the value has changed to 2 from 4. Similarly, the local tag has been modified and now represents the eighth local tag generated by TPM card TPM01. The time stamp information has been altered to F, and thus in this case represents the next locally generated GET modify SET operation following the operation identified in row 2505 in FIG. 25(A). Following the operation identified in row 2506 row 2507 identifies an operation which has occurred after that identified in row 2506. Thus the ninth locally generated tag is present in row 2507 and the next time stamp following time stamp F in row 2506 has been inserted as G. The information in row 2506 simply represents the local GET modify SET operation having occurred on this item of coherent data before the corresponding coherency broadcast SET operation message had been received. Thus the example relating to coherent data address m corresponds to steps 2002 followed by 2004 identified in FIG. 20. Information in FIG. 25(A) relating to coherent data addresses b and g is not present in FIG. 25(B) and this signifies that corresponding coherency broadcast messages have been received for these data items and therefore said rows have been deleted in accordance with step 2105 and 2106 in FIG. 21, effectively representing disablement of GET modify SET operation filter 1903. Row 2508 relating to coherent data address d, contains the same value, local tag and time stamp as for the row relating to address d in FIG. 25(A) and the situation concerning coherent data address c is of a similar type to that described for coherent data address d. FIG. 25(C) shows a third table for card TPM05. Two rows contain information relating to local GET modify SET operations performed by TPM05, rows 2509 and 2510 respectively. Row 2509 relates to coherent data address b and row 2510 relates to coherent data address k. The local tag contained in row 2509 represents the fourth local tag generated by TPM05 and has an associated local time stamp D. Row 2510 relating to coherent data address K is associated with local tag TPM05/06 representing the sixth local tag generated by TPM card number 5 and this is associated with local time stamp F. Thus three locally generated tags are not shown, TPM05/01, TPM05/02 and TPM05/03. Since these three local tags are not shown the table indicates that these three said tags have been removed in accordance with steps 2105 and 2106 in FIG. 21. Similarly, local tag TPM05/05 is also absent, again in accordance with steps 2105 and 2106 shown in FIG. 21. Alternatively, one or more of said absent tags may have represented an overwriting operation in accordance with steps 2002 and 2004 in FIG. 20.

Tables of the type identified in FIG. 25 are required for each TPM card and standby TTM card, each holding local tag information and local time stamp information which is specific to the card holding the local table. Column 2502 representing the value stored, is shown for illustrative purposes only and is not physically included in the tables for each TPM processor, since this information is already contained in coherent data memory 1907.

For correct operation of the processes illustrated in FIGS. 20 and 21, the master TTM card is required to ensure that the local tag information transmitted at step 2006 in FIG. 20 is included in the corresponding broadcast SET operation message. Thus the broadcast SET operation message, broadcast to all TPM cards and standby TTM cards is required to contain the local tag generated by the originating TPM cards. As discussed earlier, when more than one TPM card performs a GET modify SET operation simultaneously upon the same coherent data item (or item), only one out of a plurality of coincidental modify operations survive and this is determined by the order of the TPM card located SET operations. The order of the TPM card located SET operations is determined by a sequentiating action of the single threaded inter-process communication bus 611 identified in FIG. 6. This order of TPM located SET operations, in accordance with the bus sequentiating action, is reflected in the order of SET operations in the input queue at the master TTM card. The master TTM card is required to observe two requirements to ensure that the TTM card instance of coherent data remains identical to the TPM card instances. The first requirement is that the order of implementation of any TPM or TTM located SET operation and the transmission order of the corresponding coherency broadcasts must be identical. The second requirement is that the transmission order of the incoming TPM located SET operations must be maintained for the corresponding out going coherency broadcast SET operation messages. In this way TTM card located SET operations may be interleaved with incoming TPM located SET operations in any manner by the TTM card so long as the above two requirements are maintained.

Figure 26:
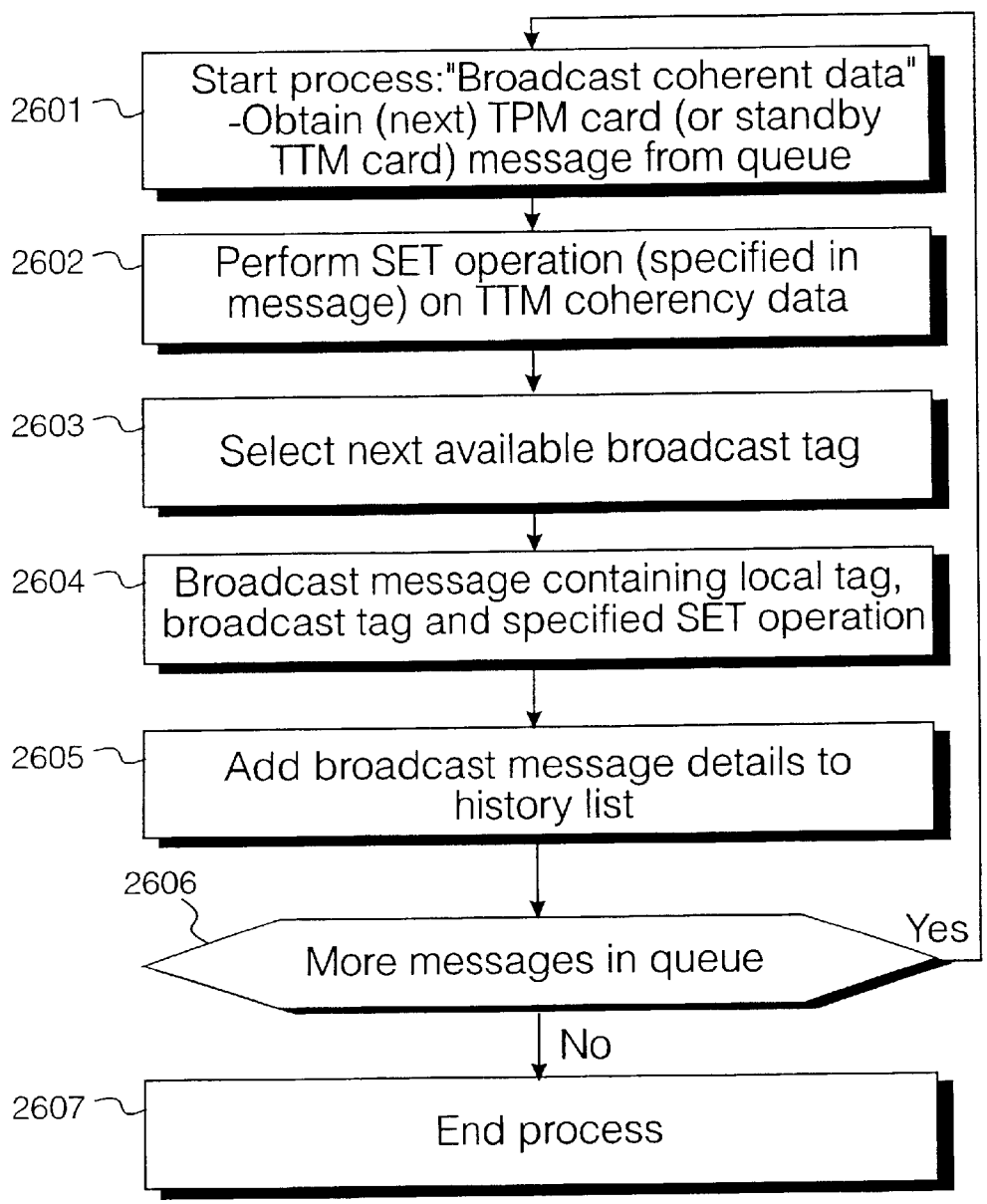
FIG. 26 illustrates the process invoked by the master replicated data manager shown in FIG. 19, in response to receipt of messages transmitted in accordance with the process detailed in FIG. 20 and includes a step of updating a history list.

FIG. 26 details the process invoked in the master TTM card by master RDM handler 1917 in response to one or more local SET operation messages being present in its message input queue. At step 2601 master RDM handler 1918 starts the process "Broadcast Coherent Data" by effectively obtaining the next TPM card message from the input queue. Following step 2601 the operation specified in the message retrieved from said queue is performed on the specified coherent data item at step 2602. Following step 2602, at step 2603 master RDM handler 1917 selects the next available sequential broadcast tag and at step 2604 broadcasts a message of the type identified at 2406 in FIG. 24. At step 2605 details of the broadcast message are added to a history list of the type detailed in FIG. 27. Following step 2605 a question is asked at step 2606 as to whether there are any messages in the master TTM card input queue to be processed. If this question is answered in the affirmative, then control is returned to step 2601 wherein the next TPM card message in the input queue is processed in accordance with steps 2602 to 2606. However if the question asked at step 2606 is answered in the negative then the process is effectively terminated at step 2607.

The history list updated at step 2605 in FIG. 26 is illustrated in FIG. 27(A). This list is updated and maintained by coherency recovery manager 1919. The list contains two columns and a finite number of rows. Column 2701 is essentially a list of broadcast tags associated with broadcast messages that have been issued by master RDM handler 1918. Column 2702 lists coherent data items references or addresses that are associated with each broadcast tag in column 2701. For illustrative purposes addresses in column 2702 are shown as lower case letters. Thus, the first row in FIG. 27(A), row 2703 comprises a broadcast tag value 1001 which is associated with coherent data item having address b. Row 2704 represents the final row in the table in the example shown comprises a broadcast tag of value of 1100 having an associated data item address in column 2702 of h. Because the broadcast tags are issued sequentially then the second row of the table, row 2705 comprises a broadcast tag having value 1002 which is the value in the first row plus 1. A break is shown in the table at 2706, for illustrative purposes, because in the preferred embodiment of the present invention a history list has 100 rows. In the example shown the last broadcast message to have been issued is indicated at row 2704 and identified by tag 1100. FIG. 27(B) illustrates the history table shown in FIG. 27(A) following a further three broadcasts. Following the state of the history list identified in FIG. 27(A) a first message has been transmitted having a broadcast tag 1101 and a data item address of value q, as identified in row 2707. A second broadcast is associated with tag 1102 in row 2708 and similarly a third broadcast associated with tag 1103 in row 2709 has replaced tag 1003 present in the third row of FIG. 27(A). In this way the tag values found in the history list are continually changing in effect the history list representing a small window in what may be termed the tag space. In the preferred embodiment, broadcast tags are implemented using 16 bits and therefore the total number of broadcast tags available is given by $2^{16}$ or 65536.

Thus, the first broadcast tag issued, in a current cycle of broadcast tags, by the ITS system is given the value 1 and the last value given is 65536. At the value 65536 the next tag value to be issued is given the value 1. Thus, a cyclical property exists with respect to issuance of broadcast tags. It is found that for efficient implementation a history list window of 100 rows with a broadcast tag space of $2^{16}$ provides optimal recovery processing of the type identified herein. Typically there is at least one broadcast message per second issued by master RDM handler 1918 and this includes what is known as a health message which is broadcast periodically. The history list may also include an operation type descriptor if a particular implementation uses various types of SET operation.

Processes relating to corrective actions in response to errors or faults occurring in integrated transceiver system 201 during operation, in particular IPC bus errors and delays, in relation to bus 611, are indicated in FIG. 28. Column 2801 lists the various types of transceiver card incorporated in the integrated transceiver system, TPM cards 2802, a standby TTM card 2803 and a master TTM card indicated at 2804. For each of said cards, processes which may be invoked for certain error conditions are listed in column 2805. Requests for coherency initialization and coherency recovery refer to a given TPM card or the standby TTM card requesting the master TTM card to broadcast coherent data held in its local memory. In the case of a coherency initialization request, all of the coherent data in the master processors' local memory of must be broadcast whereas in the case of a coherency recovery request only a range of coherent data is required to be re-broadcast. In response to a coherency initialization or recovery request the master TTM card is required to perform the requested initialization or recovery, as indicated in column 2. Additionally, the standby TTM card may also invoke a process requesting an initialization of mirrored TTM data to which the TTM master card performs a mirrored data initialization. Similarly, the master TTM card may request its own role as master to be interchanged with that of the standby processor either under failure conditions or for other reasons such as processor card servicing which may be required from time to time. If a card changeover request is issued the standby TTM card is required to respond to the change over request as indicated in row 2803.

The protection of coherency broadcast SET operation messages which are transmitted by the master TTM to the local processor cards, is provided by the coherency recovery manager 1919 identified in FIG. 19, executing on the master TTM processor card. In accordance with the present invention, missed broadcast messages are autonomously detected and then re-requested by any TPM card or standby TTM card. As indicated above, the coherency broadcast message is issued by the master TTM card and includes a unique global modulo n cyclic tag called a broadcast tag. The value of n should be chosen to ensure that adequate range is available to prevent repetition of the cyclic value within the expected lifetime of the broadcast tag. The broadcast tag value is incremented sequentially for each consecutive coherency broadcast message issued by the master TTM card. In this way, it is ensured that under error free operation, a series of broadcast tag values received by each local processor card follows a contiguous sequence and wraps around to zero at the value of n. Clearly, the loss of one or more coherency broadcast messages is indicated by a discontinuity in the broadcast tag sequence and this is detectable autonomously by each TPM or standby TTM card. Although this mechanism is sufficient for cases of temporary coherency loss, it fails to detect a permanent coherency loss, that is a coherency loss where no further broadcast tags are issued through a system failure. Thus in this case, since the broadcast tag discontinuity can only be determined upon receipt of the next coherency broadcast message, the coherency detection system described fails. In the preferred embodiment, this problem is overcome by the master TTM card issuing a special message called a "health message" containing a broadcast tag at a regular interval. This special message can be a standard coherency broadcast SET operation message, but which contains no data and a null value for the local tag. Using this mechanism a temporary coherency loss can be detected within a single interval of issuance of said special message. Similarly, the recovery from a temporary loss can also be detected within a single interval. Thus, this mechanism is an improvement upon a non-deterministic interval which is reliant upon the receipt of the next coherency broadcast message.

Coherency initialization actions and coherency recovery actions both employ similar coherency request message paths. Unicast messages are issued by a local RDM handler on a TPM card or TTM standby card, such as local RDM handler 1902 shown in FIG. 19. Here a local recovery or initialization request 1916 is transmitted to master RDM handler 1918. In the preferred embodiment a recovery request and an initialization request are issued on a different messaging path to the master processing but for illustrative purposes only one path (1916) is shown. Upon receipt of said messages, master RDM hander 1918 transmits a coherency broadcast acknowledge signal in the form of either a coherency recovery acknowledge message acknowledging said recovery request or a coherency initialization acknowledge message acknowledging said initialization request. This acknowledge broadcast message is transmitted to local RDM handler 1902 followed by a repeated coherency broadcast message 1912. Any local TPM card or standby TTM data manager may request the modified master data manager 617 to respond to either a coherency initialization request or a coherency recovery request. Response to a coherency initialization request involves transmitting all of the coherent data 1924 as a sequence of coherency broadcast SET operations, 1912, transmitting the latest value held in coherent data memory 1924 for each coherent data item in a coherency broadcast SET operation and transmitting a final end of initialization message. In contrast a coherency recovery request only involves re-transmitting a specified contiguous range of previously transmitted coherency broadcast SET operations, transmitting the latest value for each coherent data item in the range. The acknowledgment signal issued by master RDM handler 1918 for a local recovery request in the form of a coherency recovery acknowledge message involves returning the local tag from within the request. Effectively the local TPM or standby TTM cards reuse the existing close proximity GET modify SET filter mechanism, normally used to protect local SET operations as described earlier, by using two reserved data item indices for initialization and recovery requests respectively. This provides the same retry properties as supported for local SET operations described earlier. The master TTM card responds to either type of request with a series of retransmitted standard coherency broadcast set operations which differ only in that they contain a null local tag value since they do not correspond to any outstanding local SET operation messages. In accordance with the present invention there is a natural association between coherency initialization and coherency recovery. When coherency broadcast SET operations arising from a single coherency recovery request are too large in number or too old, master RDM handler 1918 responds with the transmission of all coherent data held in memory 1924. In this way, coherency recovery requests degenerate into a coherency initialization request.

In the preferred embodiment, each type of request is implemented as a distinct process. In this way coherency loss during a coherency initialization request can be recovered using a coherency recovery request without resorting to reissuing the coherency initialization request. Similarly, a coherency recovery request can degenerate into a coherency initialization request.

In accordance with the present invention, the response of modified master data manager 617 to a coherency recovery request is governed by the following rules:

Re-broadcast coherent data items that fall within the specified recovery range;

Re-broadcast the latest value of a coherent data item;

Re-broadcast all coherent data items if the specified recovery range is too large or too old.

A coherency recovery request message 1916 specifies the contiguous range of lost coherency broadcast SET operations that the requesting TPM card or standby TTM card requires to be retransmitted. A recovery range is defined by the start and end broadcast tag values received by the TPM card at the boundaries of the region of lost coherency broadcast SET operations. The modified master data manager is required to convert said boundary broadcast tag values into the corresponding set of coherent data items which require retransmission as coherency broadcast SET operations. Thus on receipt of a recovery request 1916, master RDM handler 1918 issues a request 1928 to coherency recovery manager 1919. In order to convert the required recovery range into a set of coherent data items for retransmission, a finite length history list of coherency broadcast SET operations must be maintained during normal operation. Thus for each coherency broadcast SET operation 1912 issued by master RDM handler 1918 an instruction signal 1927 is sent to coherency recovery manager 1917. Instruction signal 1927 relates to the recording of a given coherency broadcast. Upon receipt of instruction signal 1927 coherency recovery manager 1919 updates the history list. Each entry into the history list contains a reference to the data item altered by the coherency broadcast SET operation and the corresponding broadcast tag value transmitted in the broadcast message. Because broadcast tag values are issued sequentially by master RDM handler 1917, the set of coherent data items within the recovery range can be determined from the data item references in the entries which lie between the two entries in the history list containing the start and end broadcast tag values identified above. In practice, the length of the history list can be limited to the number of entries required for the largest valid recovery range. In the preferred embodiment, a finite length history list is implemented as a circular list, with each new entry replacing the oldest entry in the list. Thus in the preferred embodiment the history list is arranged to store a number of the most recent broadcast messages. Suitably the history list is arranged to store a broadcast message identifier and a coherent data item reference address for each broadcast message. In response to a recovery request 1928, coherency recovery manager 1919 may determine one of three conditions as follows:

1. Both start and end broadcast tag values are found in the history list. In this case coherency recovery manager 1919 processes request 1928 as a coherency recovery request. This involves the current recovery range being extended to include the new recovery request. This action occurs because the recovery range requested is valid.

2. The end broadcast tag value is not found in the history list. This condition represents a recovery range which is too large. In this case coherency recovery request is converted into a coherency initialization request.

3. Neither the start nor the end broadcast tag values are found in the history list. This condition represents a requested recovery range which is too old. In this case processing performed is of the same type as identified for condition 2.

Upon detection of missing coherency broadcast SET operations local RDM handler 1902 of either a TPM card or a standby TTM card is configured to invoke a request coherency recovery process identified in FIG. 28. This process is detailed in FIG. 29, wherein following detection of said coherency loss, said process is initiated at step 2901. Following step 2901, the range of lost broadcast SET operations, is determined at step 2902. Following step 2902, a recovery request message is issued at step 2903 to master RDM handler 1918. A recovery request is required to specify the range of coherency loss, corresponding to a determined range of lost broadcast SET operations determined at step 2902 and a reserved index specifies that a recovery is required. Following step 2903, a question is asked at step 2904 as to whether an acknowledgment broadcast message has been received from master RDM handler 1918 in a predetermined period of time or time out. If the question asked at step 2904 is answered in the negative to the effect that said acknowledgment broadcast has not been received in the required time, then control is returned to step 2903 and another recovery request is issued. Upon receiving an acknowledgment broadcast, step 2904 is answered in the affirmative and control is directed to step 2905. At step 2905 the coherency broadcast message issued by master RDM handler 1917 is received for a particular coherent data item in the identified specified range. Following step 2905 control is directed to step 2906 where the process is terminated.

Figure 30A:
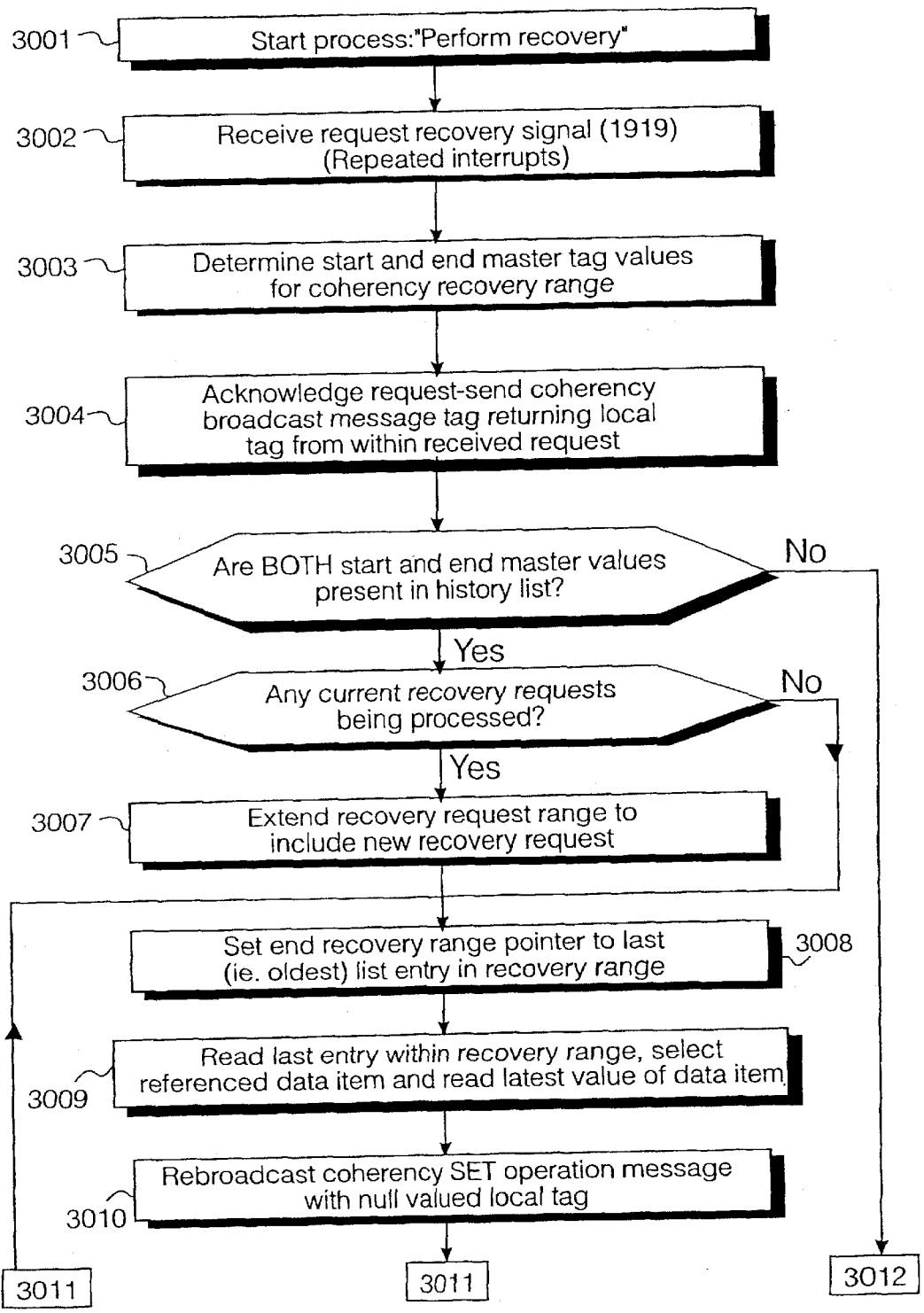
FIGS. 30(A)–(B) detail the process invoked in the master replicated data manager of FIG. 19 which is invoked in response to the request coherency recovery process identified in FIG. 29.
Figure 30B:
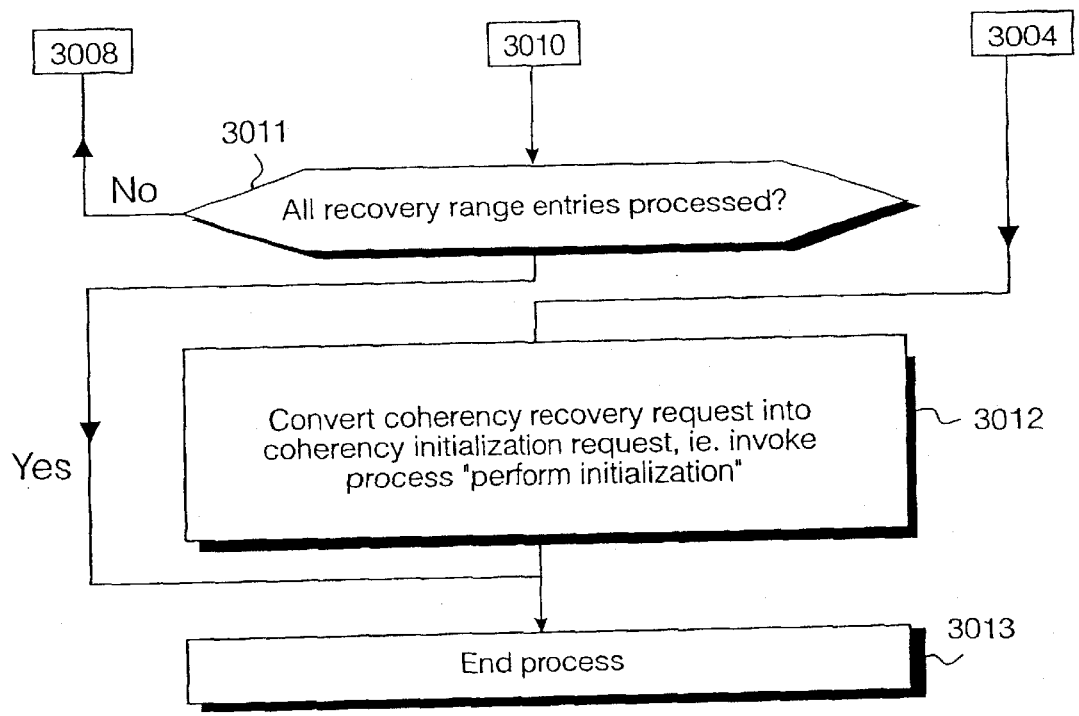

The corresponding process invoked upon the master TTM card 617 in response to a coherency recovery request is detailed in FIG. 30.

The process is invoked at step 3001 and at step 3002 coherency recovery manager 1919 receives an issued recovery request signal 1928 in response to a recovery request 1916. Received recovery requests may constitute repeated interrupts, arising from one or a plurality of processor cards, during operation of the integrated transceiver system and thus whilst processing the first recovery request a second recovery request may be superimposed on said processing. At step 3003, the recovery manager determines the start and end broadcast tag values for the requested coherency recovery range. Following step 3003, control is passed to step 3004 wherein the master processor is required to broadcast a coherency recovery acknowledgment message confirming receipt of recovery request 1916. This acknowledgment message is required to contain the local tag (comprising a reserved index) from the requesting processor so that said requesting processor can identify the broadcast acknowledgment message. Following step 3004, a question is asked at step 3005 as to whether both the start and end broadcast values are present in the history list which contains stored broadcast tag values for the most recent broadcast messages. If this question is answered in the affirmative, representing condition (1) identified above, then control is passed to step 3006 where a question is asked as to whether there are any current recovery requests being processed. If the question asked at step 3006 is answered in the affirmative, then at step 3007 the recovery request range is extended so as to include the new recovery request. However, if the question asked at step 3006 is answered in the negative to the effect that there are no current recovery requests being processed then control is directed to step 3008. Similarly following step 3007, control is directed to step 3008. At step 3008 a pointer which points to the end (i.e. oldest) list entry in the recovery range is set and following this, at step 3009 the last entry within the recovery range, pointed to by said end recovery range pointer is read and the latest value of the referenced coherent data item is looked up (that is located) and selected. Following step 3009, as indicated at step 3010, recovery manager 1919 sends a signal to master RDM handler 1918, said signal instructing handler 1918 to rebroadcast the coherent data item selected at step 3009. Following step 3010 control is directed to step 3011 where a question is asked as to whether all entries specified within the recovery range have been processed. If this question is answered in the negative, then control is returned to step 3008 and steps 3008 to 3011 are repeated. However if the question asked at step 3011 is answered in the affirmative to the effect that all referenced coherent data items in the specified recovery range have been processed, then control is directed to step 3013 wherein the process is terminated, the recovery request received at step 3002 having been completed.

However, if the question asked at step 3005 is answered in the negative to the effect that both start and end master values are not present (that is one of said values is not present) then control is directed to step 3012, in effect signifying the existence of condition 2 to 3 identified above. In this case, at step 3012 the coherency recovery request received at step 3002 is converted into a coherency initialization request via invocation of a process for performing coherency initialization (described later) and a broadcast of a corresponding coherency recovery acknowledgment message confirming receipt of request 1916. Following step 3012 the process is terminated at step 3013. Thus, in this way a received coherency recovery request may either be processed as a coherency recovery request or as a coherency initialization request.

As indicated earlier, any local TPM or standby TTM modified data manager may also request the master modified data manager to respond to a coherency initialization request. If such a request is issued for example by local RDM handler 1902 shown in FIG. 19 then an initialization request signal 1929 is sent to master RDM handler 1918 whereafter all of the coherent data 1924 is retrieved and broadcast by master RDM handler 1918. Master RDM handler 1918 is required to transmit all coherent data 1924 as a sequence of coherency broadcast set operations 1912, transmitting the latest value for each coherent data item in a coherency broadcast SET operation. The modified master data manager 617 is configured to respond to a coherency initialization request according to the following rules:

Re-broadcast all coherent data items in a pre-determined sequence. Use of a pre-determined sequence obviates the use of dynamic initialization lists and therefore simplifies the implementation for handling coherency initialization requests.

Re-broadcast restricted number of coherent data items from a sequence at regular intervals until the sequence is completed. Restriction in this way effectively limits the number of coherent data items which are rebroadcast per unit time and therefore prevents overload of the underlying hardware and kernel resources. By kernel it is meant the lowest layer into which the operating system specified in accordance with the present invention is sub-divided, each layer dealing with some aspects of the system hardware. Thus the kernel is responsible for allocating hardware resources to the processors that make up the operating system and to the programs running under the operating system.

The receipt of a coherency initialization request should always set the start of the initialization sequence to the current position in a predetermined sequence of coherence data items. This provides context free handling of coincidental or overlapping coherency initialization requests. By context free handling it is meant that if an error occurs, for example from the master TTM card to a local TPM card, and the local TPM card requests a re-transmission of the operations lost then during the repeated broadcast of said operations if further operations are lost or further SET operations occur on data items carried by said operations, the system maintains its integrity. In other words, any level of nesting of errors or collision is handled by the system without a resulting system failure. Re-setting the start of an initialization sequence to the current position in the predetermined sequence of coherent data items also ensures that redundant replication of coherency broadcast set operation messages is minimized for coincident or overlapping coherency initialization requests.

Figure 29:
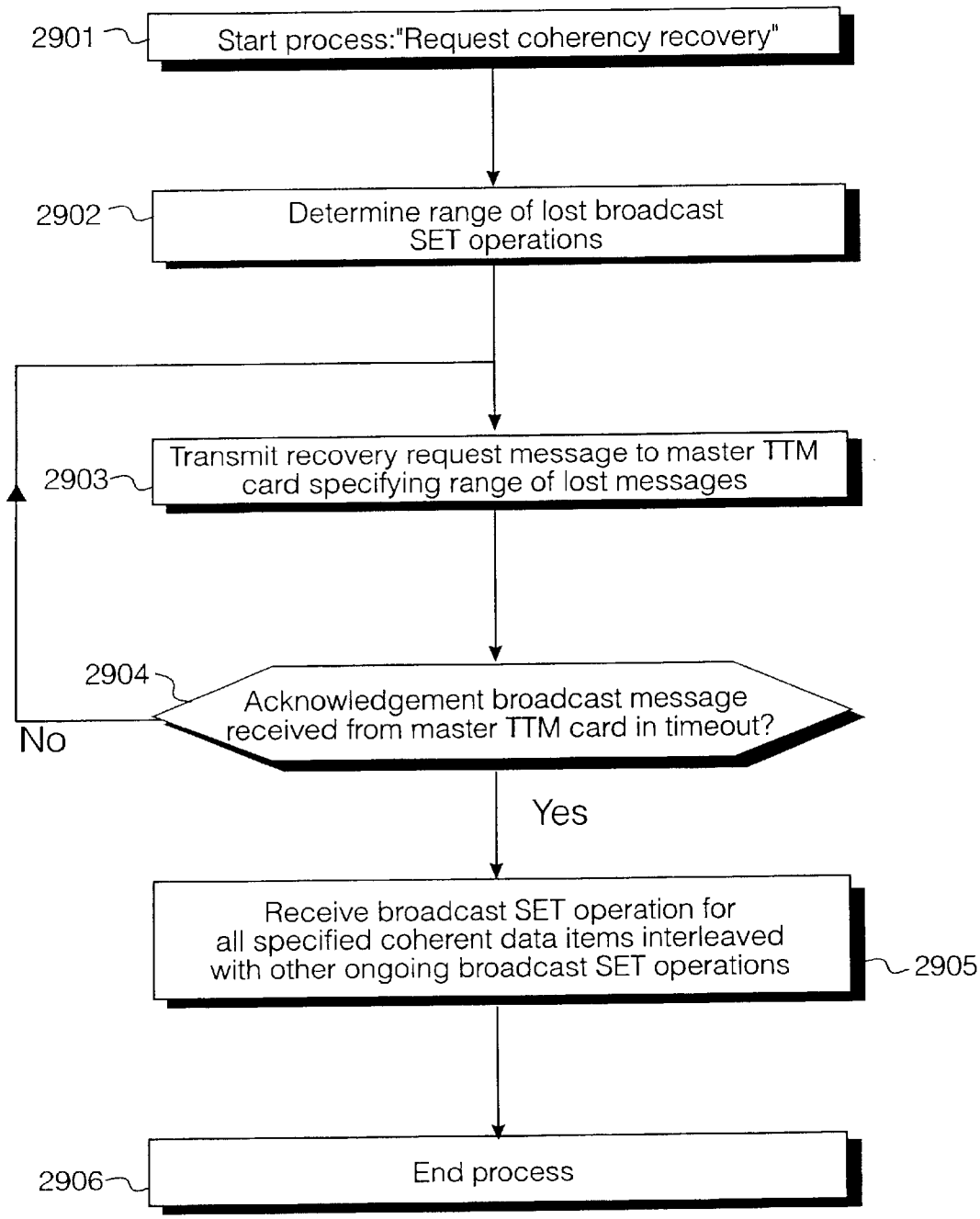
FIG. 29 details a request coherency recovery process invoked by the local replicated data manager shown in FIG. 19.

The messages identified in FIGS. 29 and 30 confirming coherency recovery are detailed in FIG. 31. Thus, a message 3101 transmitted in accordance with step 2903 in FIG. 29 is shown in FIG. 31 (A). This type of message comprises four fields including local tag 3102 in FIG. 23, a start broadcast tag 3103, an end broadcast tag 3104 and field 3105 specifying the type of request. Tags 3103 and 3104 specify the range of coherency recovery that is required. The message shown at 3106 is an example of message 3101 and comprises a local tag 3107 identifying the message as the seventh to be transmitted by TPM card TMP01. Field 3108 indicates that the start of the required recovery range is for broadcast message number five and similarly the end of the required recovery range is indicated in field 3109 to be the eighth broadcast message transmitted by the master processor. Thus, in the example shown TPM card TPM01 is indicated to have not received four broadcast messages from the master TTM card, that is broadcast messages 5, 6, 7 and 8. Field 3110 indicates that the message relates to a coherency recovery request.

Figure 31A:
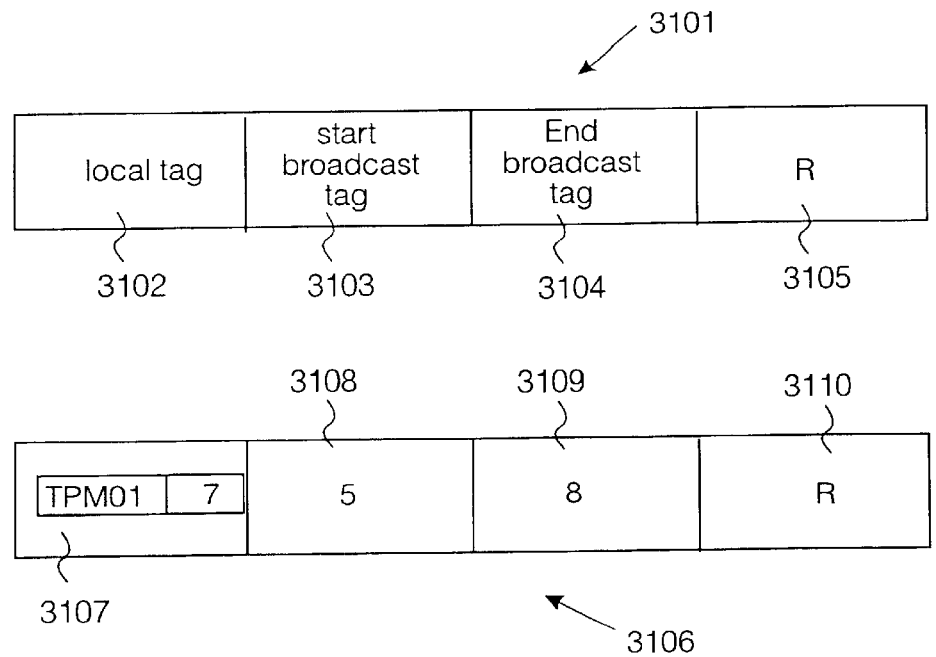
FIGS. 31 (A)–(C) illustrate the structure of coherency recovery messages identified in FIGS. 29 and 30.
Figure 31B:
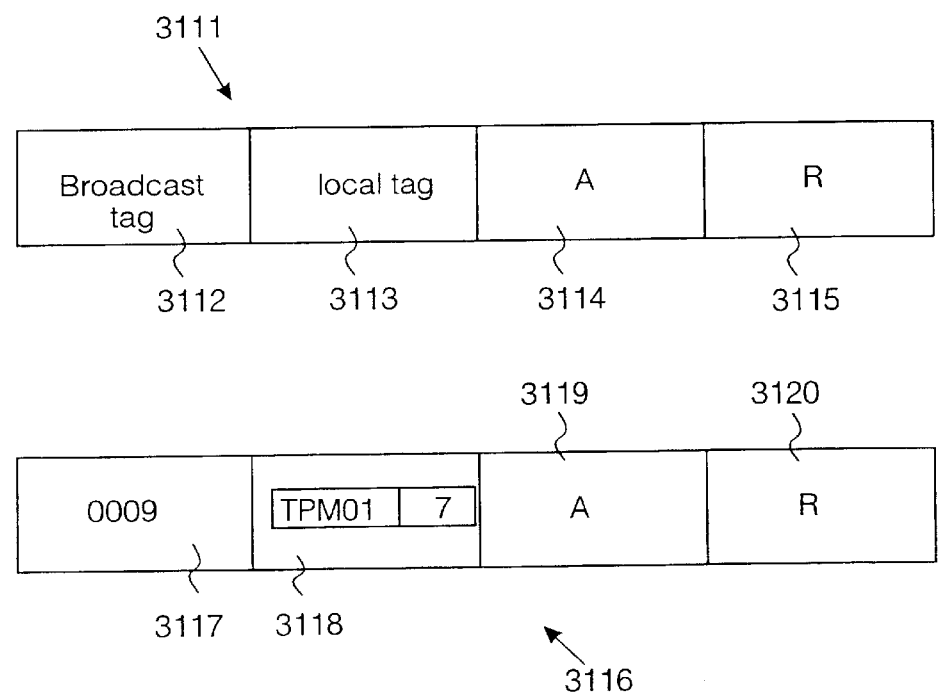

FIG. 31(B) details an acknowledgment broadcast message of the type received in step 2905 in FIG. 29. This type of message may be implemented in a variety of ways, the essential requirement being to return the local tag received in a corresponding recovery request message of the type identified in FIG. 31(A). Thus, as indicated message 3111 comprises a broadcast tag in field 3112 and a local tag (corresponding to the local tag identified in field 3107) in field 3113. Field 3114 effectively contains information, requested schematically by "A", indicating that the message relates to an acknowledgment and field 3115 contains information related to the type of message being acknowledged. An example of message 3111 is message 3116 which comprises a broadcast tag 3117 having value 9 representing the ninth broadcast message of the current cycle of broadcast tag values. The local tag in field 3118 comprises the same information as identified in FIG. 31(A). Field 3119 identifies the message as an acknowledgment message and field 3120 identifies the message as relating to a recovery request. An acknowledgment broadcast message may suitably also comprise information defining the recovery range contained in the recovery request.

Figure 31C:
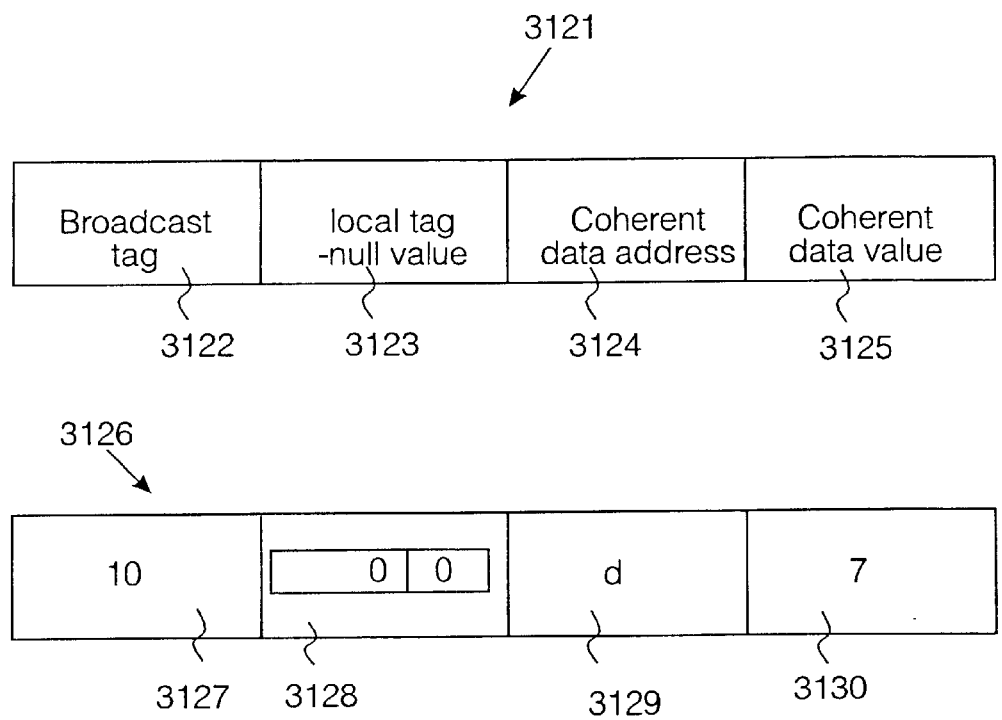

FIG. 31(C) illustrates a re-broadcast message 3121 of the type identified in step 3010 in FIG. 30. This comprises a first field 3122 containing a broadcast tag, a second field 3123 containing a local tag having a null value, a third field 3124 containing the address of the coherent data item to be operated upon and a fourth field 3125 containing the required coherent data value. Message 3121 differs from a standard coherency broadcast SET operation message only in that it contains a null local tag value 3123 since messages of this type do not correspond to any outstanding local set operation messages. This approach offers an advantage in that the coherency initialization and recovery transmissions (that is both the broadcast coherency recovery acknowledgment message as identified in FIG. 31(B) and repeated coherency broadcast as identified in FIG. 31(C)) are themselves protected from any further inter-process communication bus errors or delays by the default coherency loss and recovery mechanisms.

Message 3126 is an example of message 3121 wherein field 3127 contains the value 10 representing the tenth broadcast tag issued by the master TTM card. Field 3128 contains a local tag. Field 3129 contains the address value d and field 3130 contains a coherent data value retrieved from memory 1924 which in the example has a numerical value of 7.

FIG. 32(A) illustrates the history list identified in FIG. 27(B) wherein a recovery request message of the type identified in FIG. 31(A) has specified a recovery range from broadcast tag 1099 to broadcast tag 1093. Upon receiving this message coherency recovery manager 1919 determines the start and end master tag values requested as indicated in step 3003 of FIG. 30. In the history list shown the specified start and end master (broadcast) tag values for the range are present and the ranges are identified by a start recovery pointer 3201 identifying tag 1099 and an end recovery pointer 3202 identifying tag 1093. The start and end recovery pointers identifying the range of broadcast messages required to be re-broadcast are then interpreted by coherency recovery manager 1919 to effect re-broadcast of said messages at step 3010 of FIG. 30. FIG. 32(B) identifies a situation following that shown in FIG. 32(A) wherein a second request has been made be either the same processor card or another processor. The specified range is indicated by start recovery pointer 3203 and end recovery pointer 3204 to span broadcast tag values 1091 to 1102. Thus, broadcast tags 1091 to 1102 have been identified as missing by the requesting processor card. This range spans that shown in FIG. 32(A) which was requested by a different card and the effective range of broadcast messages to re-broadcast has been extended in accordance with step 3007 in FIG. 30. FIG. 32(C) illustrates the situation wherein a requesting processor card has specified a range of broadcast messages to be re-broadcast wherein the specified end broadcast tag value in the identified range has resulted in the end recovery pointer being unable to locate a required broadcast tag value. Only the start recovery pointer 3205 has been successfully positioned as shown, identifying the broadcast tag specified (of value 1099) as the start of the range. For situations wherein neither start nor end broadcast tag values are found in the history list then in the history list shown in FIG. 32(C) this implies that the recovery range is too old. By this it is meant that the range of broadcast tags specified in the example shown in FIG. 32(C) relate to broadcast tags issued before the oldest tag currently present in the list. In FIG. 32(C) the oldest tag is found at row 3206 having a value of 1004. Thus, the range specified in these circumstances may have been for example tags 997 to 1002. Referring back to FIG. 32(A) it is observed that the recovery range identified by pointers 3201 and 3202 comprises three broadcast tag values which have the same associated coherent data item address of value b. This presents a slight inefficiency in relation to duplication messages which are re-broadcast. In the example shown the re-broadcast messages will constitute three broadcasts for the data items at address b, in each case master RDM handler 1918 being required to retransmit the latest value of the data items from coherent data 1924. Thus, the latest value is always transmitted, but duplication for a given data item may occur. This situation may be improved through relatively minor optimization such as for example performing a search upon the history list to identify which data items have been requested a plurality of times.

Figure 33:
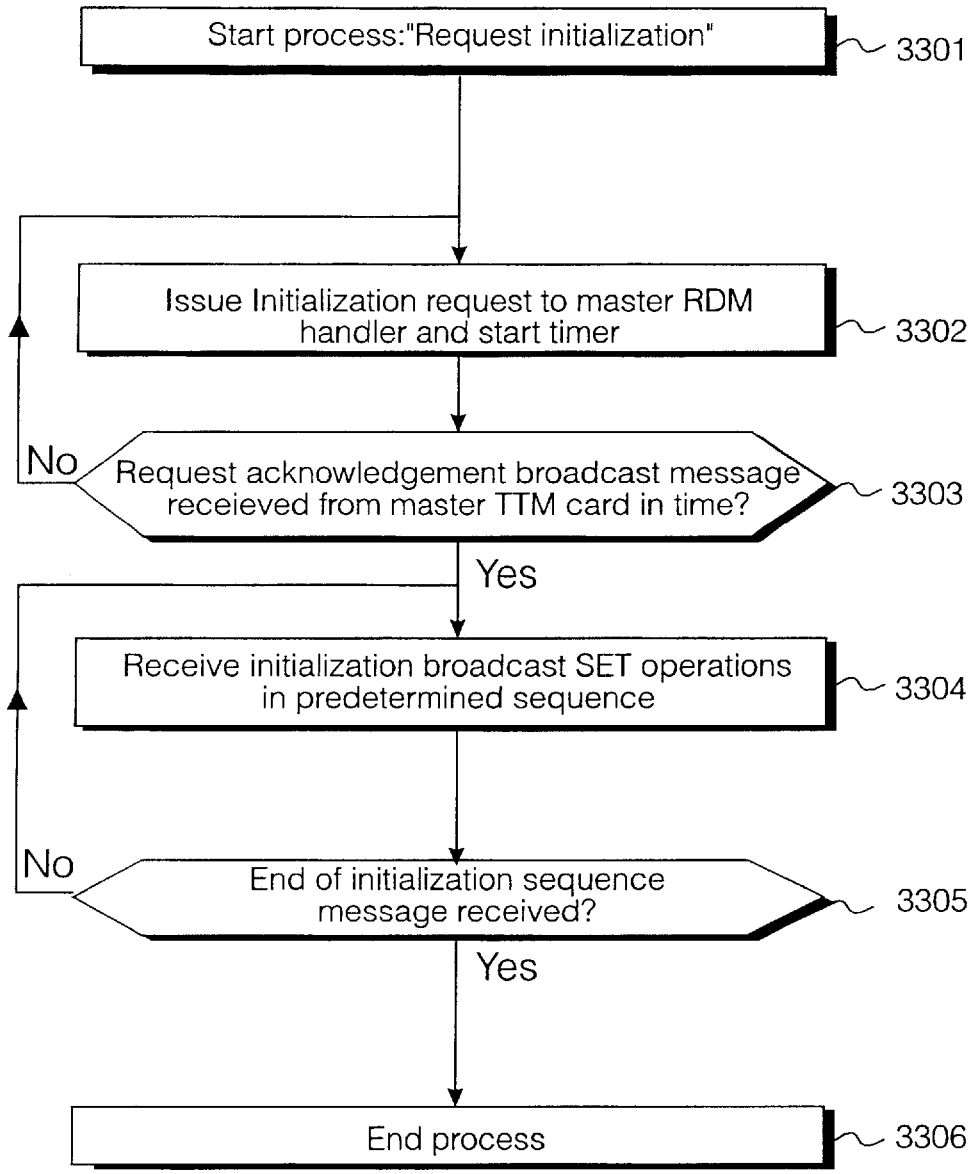
FIG. 33 details the process invoked relating to a request for initialization by the local replicated data manager identified in FIG. 19.

Procedures relating to initialization processing of a TPM card or standby TTM card upon request to master RDM handler 1918 are detailed in FIG. 33. An initialization request of this kind may occur either via a coherency recovery request degenerating into a coherency initialization request as indicated at step 3012 in FIG. 30 or may be issued directly. Similarly, initialization is required at start up of the FWA base station following either installation of the system or a temporary shut down for routine maintenance purposes. In accordance with the present invention, provision of context free coherency initialization handling simplifies the initialization of multiple TPM cards during start up of integrated transceiver system 201. Essentially at start up each TPM card and standby TTM card issues a coherency initialization request to the master TTM card. Since each TPM card and standby TTM card is required to request coherency initialization at system start up, the overall start up time of the integrated transceiver system is a function of the staggering of the initializations required for each processor card. At step 3301 the process for requesting initialization is invoked. At system startup this may be achieved directly in response to the ITS system being "switched on". Following step 3301 the card issues an initialization request message 1929 to master RDM handler 1918 and a timer is started, as indicated at step 3302. Following step 3302 the local RDM handler associated with the requesting card waits for an acknowledgment broadcast from the master RDM handler as indicated at step 3303. Step 3303 relates to a question as to whether said acknowledgment has been received in a predetermined time. If this question is answered in the negative to the effect that a time out has occurred then control is returned to step 3302. In this way, the initialization procedure is only allowed to proceed following receipt (in a predetermined time interval) of an acknowledgment broadcast message from master RDM handler 1918. Following receipt of an acknowledgment broadcast in time to the effect that the question asked at step 3303 is answered in the affirmative, control is passed to step 3304 wherein the local RDM handler waits and receives coherency broadcast messages for the coherent data said data being sent as part of a predetermined sequence. Following step 3304 a question is asked at step 3305 as to whether the end of initialization sequence message has been received and thus as to whether the predetermined sequence is complete. If this question (ie end of initialization sequence message received?) is answered in the negative to the effect that the predetermined sequence of coherent data transmission has not completed then control is returned to step 3304 wherein a further amount of coherent data in the predetermined sequence is received. Eventually the question asked at step 3305 is answered in the affirmative to the effect that all coherent data in memory 1924 has been broadcast by master RDM handler 1918 and control is passed to step 3306. The process is effectively terminated at step 3306 with the result that the processor card is enabled and thus commences (or recommences) its operations with respect to telephone call processing. The mechanisms relating to coherency initialization arising through coherence recovery requests, can be interleaved with any other coherency broadcast set operation messages. Thus, the process outlined in FIG. 33 does not require TPM cards (or the standby TTM cards) that have not requested an initialization to postpone their activities in relation to telephone call processing whilst a given card is being initialized. This is desirable since a complete shut-down of an integrated transceiver system is required to be avoided other than, for example, for routine maintenance purposes. This capability is facilitated, as noted earlier, by restricting the amount of coherent data which is re-broadcast per unit time so as to prevent overload of underlying hardware and kernel resources.

The broadcast SET operation messages used during the initialization sequence are identical to the broadcast SET operation messages used at any other time. In fact it is possible and expected of broadcast SET operation messages arising from TPM processor (or standby TTM processor) SET operations to be intermingled with broadcast SET operation messages transmitted for an initialization or coherency recovery sequence. This can and does happen when a single TPM processor (or standby TTM processor) is reset whilst the other processors carry on functioning as normal.

Figure 34A:
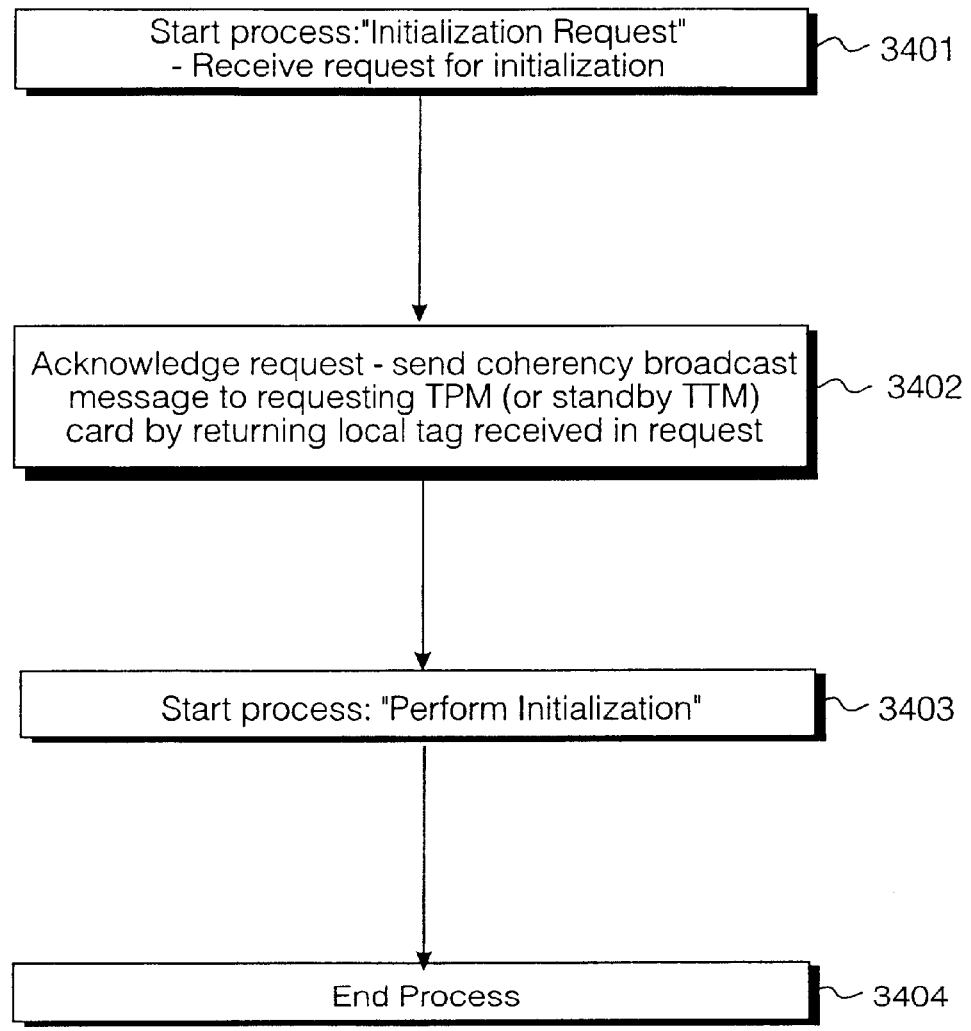
FIG. 34(A) details the process invoked by the master replicated data manager identified in FIG. 19, in response to an initialization request of the type identified in FIG. 33 and includes a step relating to performing an initialization.
Figure 34B:
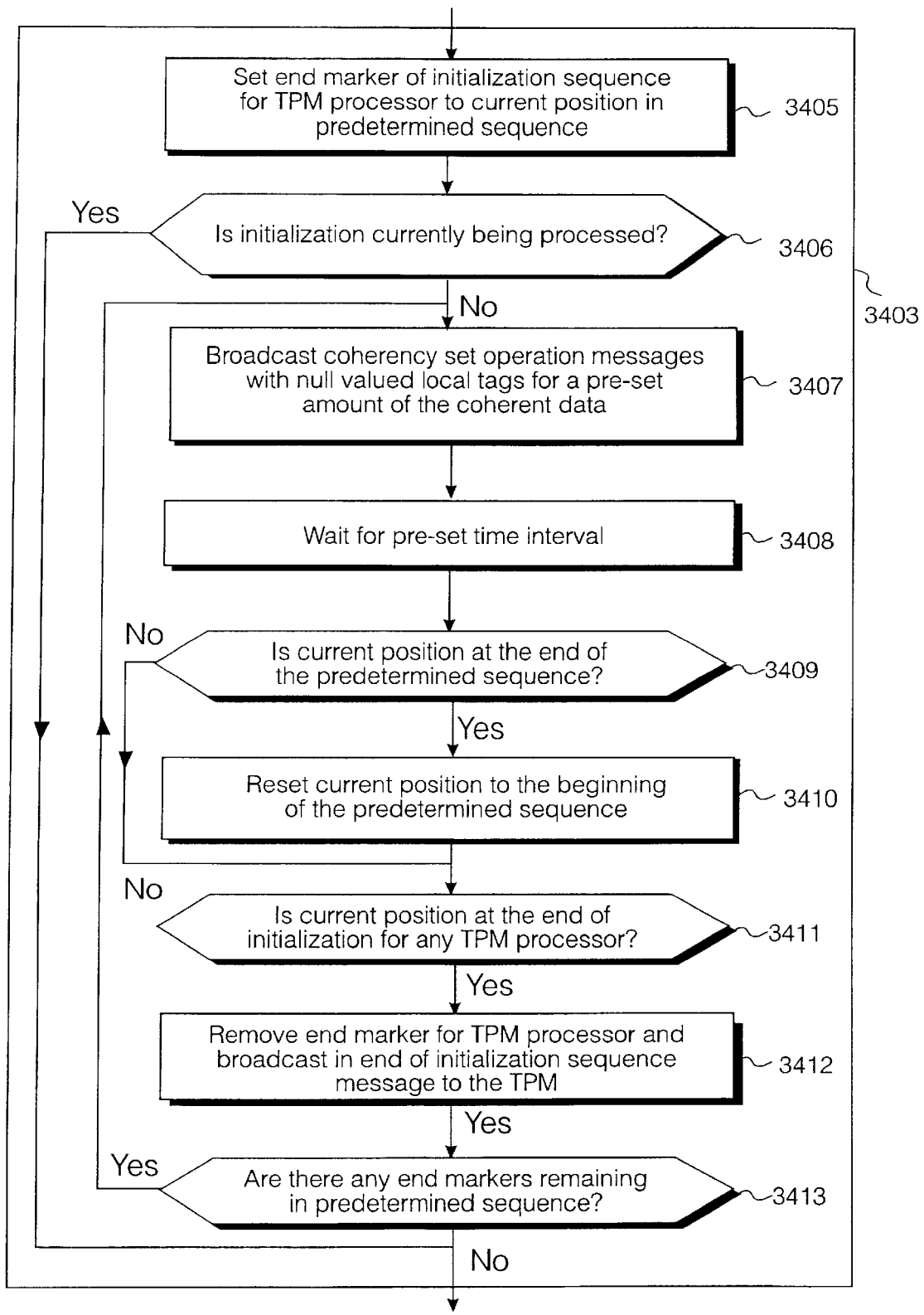
FIG. 34(B) details the step identified in FIG. 34(A) relating to performing an initialization.

Processing invoked upon the master TTM card upon receipt of an initialization request from either the standby TTM card or a TPM card (as issued at step 3302 in FIG. 33), is detailed in FIGS. 34(A) and 34(B) RDM handler 1918 waits for an initialization request from TPM or standby TTM processor cards. At step 3401 the process "initialization request" is initiated in response to a request for initialization being received by master RDM handler 1918. Following step 3401 master RDM handler 1918 is required in step 3402 to acknowledge the received request by transmitting a coherency broadcast message containing the local tag received in the request. At step 3403 the process "perform initialization" is started and upon completion of process 3403 the process started at step 3401 is effectively terminated at step 3404. Process 3403 "perform initialization, is detailed in FIG. 34(B). Thus process 3403 is initiated by control being passed to step 3405 wherein a marker denoting the end of the initialization sequence for the requesting TPM processor or standby TTM processor, is set to the current position of the predetermined sequence. At step 3406 a question is asked as to whether an initialization is currently being processed. If this question is answered in the affirmative, then an initialization sequence is already in progress and control is passed to step 3404 wherein the process started at step 3401 is effectively terminated. However, if the question asked at step 3406 is answered in the negative to the effect that an initialization is not currently being processed for any processor card then control is passed to step 3407 wherein master RDM handler 1918 broadcasts a preset amount of coherency data. This requires master RDM handler 1918 to retrieve coherent data from master data manager 1917. Following step 3407 master RDM handler 1918 effectively waits for a preset time interval as indicated at step 3408. Following step 3408 a question is asked at step 3409 as to whether predetermined initialization sequence started at step 3407 has been completed. If this question is answered in the affirmative, then control is passed to step 3410 wherein a pointer to the current position at the end of the predetermined sequence is reset to the beginning of the predetermined sequence in order to effect retrieval of the next predetermined set of coherent data. Control is then passed to step 3411. However, if the question asked at step 3409 is answered in the negative to the effect that the predetermined initialization sequence has not been completed then control is passed to step 3411 wherein a further question is asked as to whether the current position is at the end of initialization marker for any TPM or standby TTM processor. The question asked at step 3411 effectively determines whether any TPM or standby TTM processor has completed its initialization. If the question asked at step 3411 is answered in the affirmative to the effect that a processor card has completed initialization, then control is passed to step 3412 wherein master RDM handler 1918 broadcasts an end of initialization sequence message to the processor card and removes the end of initialization marker for the card. Following step 3412 or an answer in the negative at step 3411 control is passed to step 3413 where a question is asked as to whether there are any end markers for a TPM or standby TTM processor remaining in the predetermined sequence. If the question asked at step 3413 is answered in the affirmative, then control is passed to step 3407 wherein the initialization process is continued. However, if the question asked at step 3413 is answered in the negative, then control is passed to step 3404 wherein the initialization process is effectively terminated.

The preset initialization sequence identified in step 3407 in FIG. 34(B) supports one current marker and also an end marker for each requested initialization sequence. This determines where the initialization sequence is ended for each coherency initialization request received. By creating a new end marker at the current marker position when an initialization request is received and by removing an end marker when reached again, it is ensured that the initialization sequence will continue until the last end marker is reached. Also when an end marker is reached, a message can be sent to the requesting processor informing the requesting processor that the initialization sequence it requested is complete. This mechanism requires that the current marker will reset to the beginning of the predetermined sequence when the end of preset sequence is reached. It also requires that the start of any individual processor initialization sequence is from the current marker position when the initialization request is received, that is the end marker of any individual sequence is also the start marker. This scheme allows individual initialization sequences to overlap when initialization requests from different processors are received close together in time and therefore allows common broadcast SET operation messages transmitted for initialization to be shared.

FIG. 35 illustrates the various messages relating to an initialization request as identified in FIGS. 33 and 34. FIG. 35(A) illustrates a coherency initialization request message 3501 as issued at step 3302 in FIG. 33. This comprises a first field 3502 containing a local tag and a second field 3503 containing a reserved index value identifying the type of error request as an initialization request, fields 3504 and 3505 are redundant.

Figure 35A:
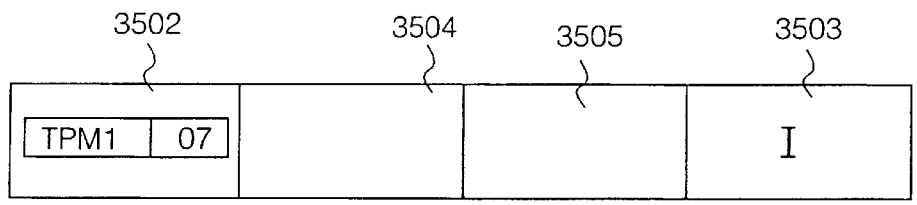
FIGS. 35(A)–(D) illustrate the structure of coherency initialization messages identified in FIGS. 33 and 34.
Figure 35B:
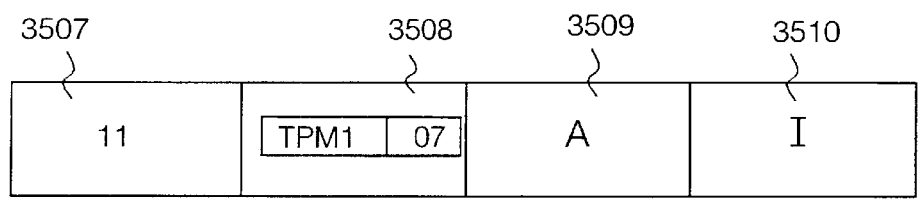

FIG. 35(B) schematically illustrates a broadcast initialization acknowledgment message 3506 as issued at step 3402 in FIG. 34(A). This comprises a first field 3507 containing a broadcast tag of value 11. A second field, 3508 comprises a local tag identical to the local tag identified in field 3502 above. The third field, field 3509 contains information identifying the message as an acknowledgment message and the field 3510 identifies the acknowledgment as being in response to an initialization request. Thus, a broadcast initialization acknowledgment message has the purpose of essentially returning the local tag received in a coherency initialization request message of the type identified in FIG. 35(A).

Figure 35C:
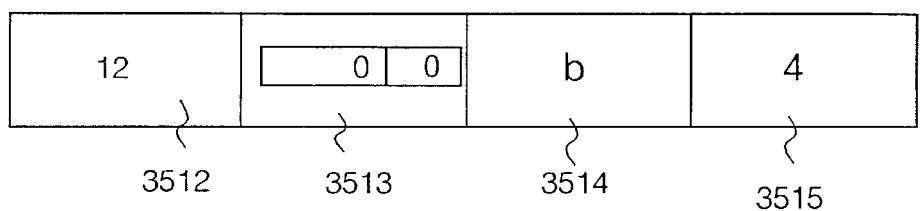

FIG. 35(C) schematically illustrates a broadcast coherency initialization set operation message 3511 of the type identified in step 3407 in FIG. 34(B). This has the same general structure as the retransmitted coherency broadcast set operation message identified in FIG. 31(C). Field 3512 contains a broadcast tag having the value 12 in the example given. Field 3513 contains a local tag having a null value and fields 3514 and 3515 identify the coherent data item address and value respectively.

Figure 35D:
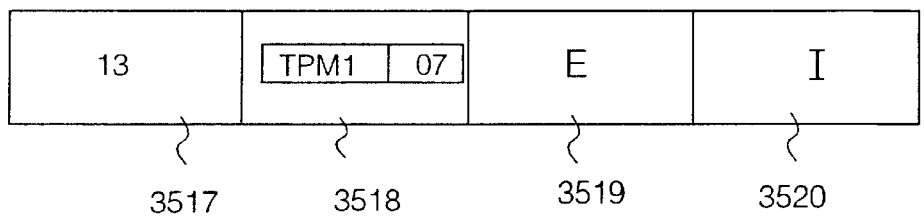

FIG. 35(D) schematically illustrates a broadcast coherency initialization end message 3516 of the type identified in step 3412 in FIG. 34(B). This has the same general structure as the broadcast initialization acknowledgment message 3506 identified in 36(B). Field 3517 contains a broadcast tag having the value 13 in the example given. Field 3518 contains a local tag identical to the local tag identified in field 3502 in FIG. 35(A). The local tag in field 3518 effectively identifies the processor card to which the end of initialization message applies. Field 3519 contains information identifying the message as an end message and this is schematically illustrated by the value "E". Field 3520 identifies the end message as being in response to an initialization message, this being denoted by the value "I".

By using a reserved index for local tags contained in recovery and initialization requests the close proximity GET modify SET filter identified in FIGS. 20 and 21 is effectively used for effecting similar retry properties with respect to said requests. The null tag value (3123 and 3513 respectively) associated with resultant rebroadcast coherent data SET operation messages effectively ensures that the filter mechanism does not disable upon receipt of the rebroadcast messages. This property of the system results in the filter mechanism (invoked for the original local SET operations at step 2003 or 2004 in FIG. 20) timing out in accordance with the process detailed in FIG. 22. Following time out the filter is reinvoked in accordance with step 2204, effecting a retry resulting in a further local SET operation message and corresponding coherency broadcast SET operation message which ultimately disable the filter.

Figure 36:
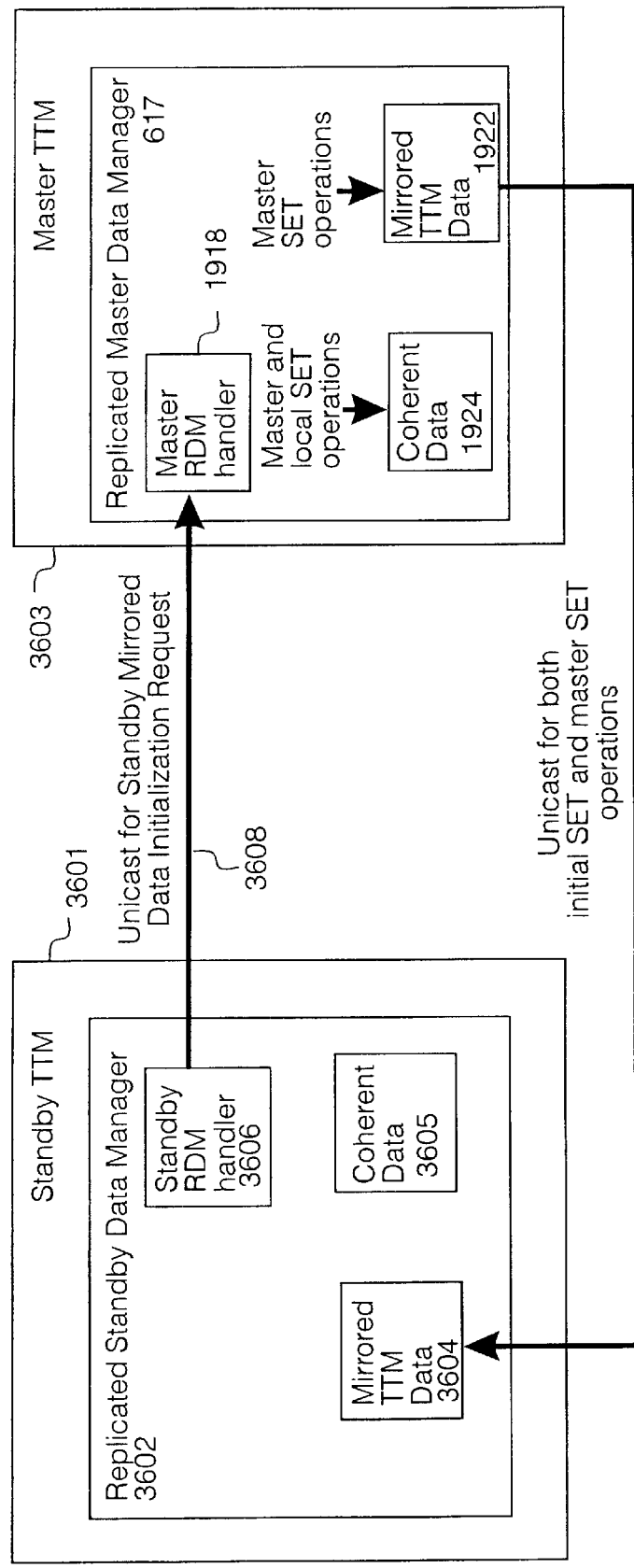
FIG. 36 illustrates schematically support for data mirroring to a standby master TTM card and support for mirrored TTM data initialization.

In accordance with the present invention, support for mirroring of data between the standby TTM card 315 and the master TTM card 314 is illustrated in FIG. 36. By mirroring it is meant that the data on the standby TTM card is maintained so that it exactly corresponds to the data on the master TTM card. The standby data manager is required to hold coherent data that exactly corresponds to coherent data held on the master card and this is achieved using close proximity GET modify SET filter 1903 located on the standby TTM processor card. However, master SET operations operating upon mirrored TTM data on the master data manager are required to be effected on mirrored TTM data located in the standby data manager located on the standby TTM card. As shown in FIG. 36, master SET operations performed on mirrored TTM data are mirrored on the standby data manager by additional explicit unicast messages transmitted by the master data manager. It should be noted that standby data manager SET operations (ie originating on the standby TTM), in accordance with the present invention, are explicitly not allowed on either coherent data or mirrored TTM data encapsulated within the standby data manager.

Figure 37:
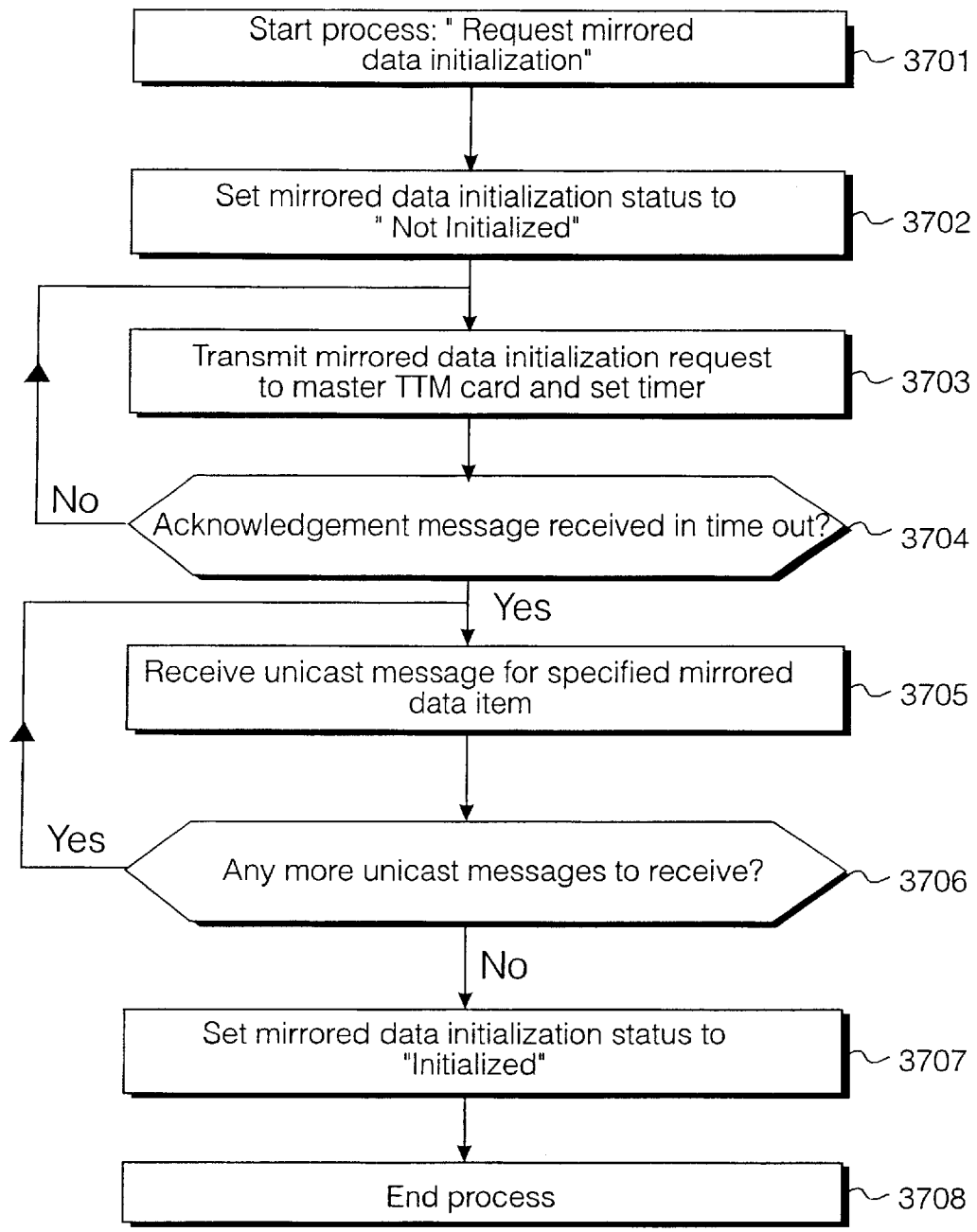
FIG. 37 details the process invoked by the standby master TTM card relating to a mirrored data initialization data request.

Initialization of mirrored TTM data is required to safeguard against system failures concerning maintenance of standby mirrored TTM data in relation to master mirrored TTM data. A request for initialization should therefore be issued after a cold start of the ITS system or at any time that standby master 3601 requires initialization. FIG. 36 shows a standby TTM card 3601 having a replicated standby data manager 3602. Similarly, a master TTM card 3603 contains replicated master data manager 617. Modified standby data manager 3602 includes mirrored TTM data 3604, coherent data 3605 and standby RDM handler 3606. Similarly master replicated data manager 617 comprises mirrored TTM data 1922, coherent data 1924 and master RDM handler 1918. Support for mirrored TTM data initialization involves provision for standby RDM handler 3606 to issue unicast mirrored initialization requests 3608 to master RDM handler 1918. Following a unicast request 3608, modified master data manager 617 is required to transmit message 3609 concerning SET operations on mirrored TTM data 1922 to standby mirrored TTM data 3604. Rules governing mirrored data initialization requests from modified standby data manager 3602 correspond to those presented for coherency initialization requests by TPM cards (or the standby TTM card) given earlier. However, the two types of request are independent and thus processing of a predetermined sequence of mirrored TTM data items is autonomous to the processing of the predetermined sequence of coherent data items. The rules are:

- retransmit all mirrored TTM data items (1922) in a predetermined sequence
- retransmit a restricted number or mirrored TTM data items (1922) from the sequence at regular intervals until the sequence is completed
- receipt of a further mirrored TTM data initialization data request from standby RDM handler 3606 should set the start of the initialization sequence to the current position in the predetermined sequence of mirrored TTM data items FIG. 37 details the process performed by standby TTM card 3601 relating to requesting initialization of mirrored TTM data 3604. At step 3701 the process is invoked and at step 3702 the initialization status of mirrored data 3604 is effectively set to a value representing the fact that the data is not initialized. This is necessary to ensure that should a request for changeover by the master TTM card occur, then such a request is held until initialization at mirrored data 3604 is complete. Following step 3702 control is passed to step 3703 wherein standby TTM card issues a mirrored data initialization request 3608 to master TTM card 3603. Following step 3703 a question is asked at step 3704 as to whether an acknowledgment message transmitted by master TTM card 3603 has been received in a predefined amount of time. If this question is answered in the negative then control is returned to step 3703 wherein a further request 3608 is issued by standby TTM card 3601. However, if the question asked at step 3704 is answered in the affirmative to the effect that master TTM processor card 3603 has acknowledged receipt of the initialization request made at step 3703, then control is passed to step 3705 wherein a preset amount of mirrored TTM data items 1922, unicast (3609) as part of a preset sequence, is received. Following step 3705, at step 3706 a question is asked as to whether there are further preset amounts of mirrored TTM data in the predetermined sequence to be received. If this question is answered in the affirmative, then control is returned to step 3705 wherein the next predetermined amount of mirrored TTM data is received. Steps 3705 and 3706 are repeated until the question asked at step 3706 is answered in the negative to the effect that all mirrored TTM data 1922 in the predetermined sequence has been received. Following step 3706 the initialization status of mirrored TTM data 3604 located on standby TTM card 3701 is set to a value representing the fact that the data is initialized. Following step 3707 the process is effectively terminated as indicated at step 3708.

Figure 38:
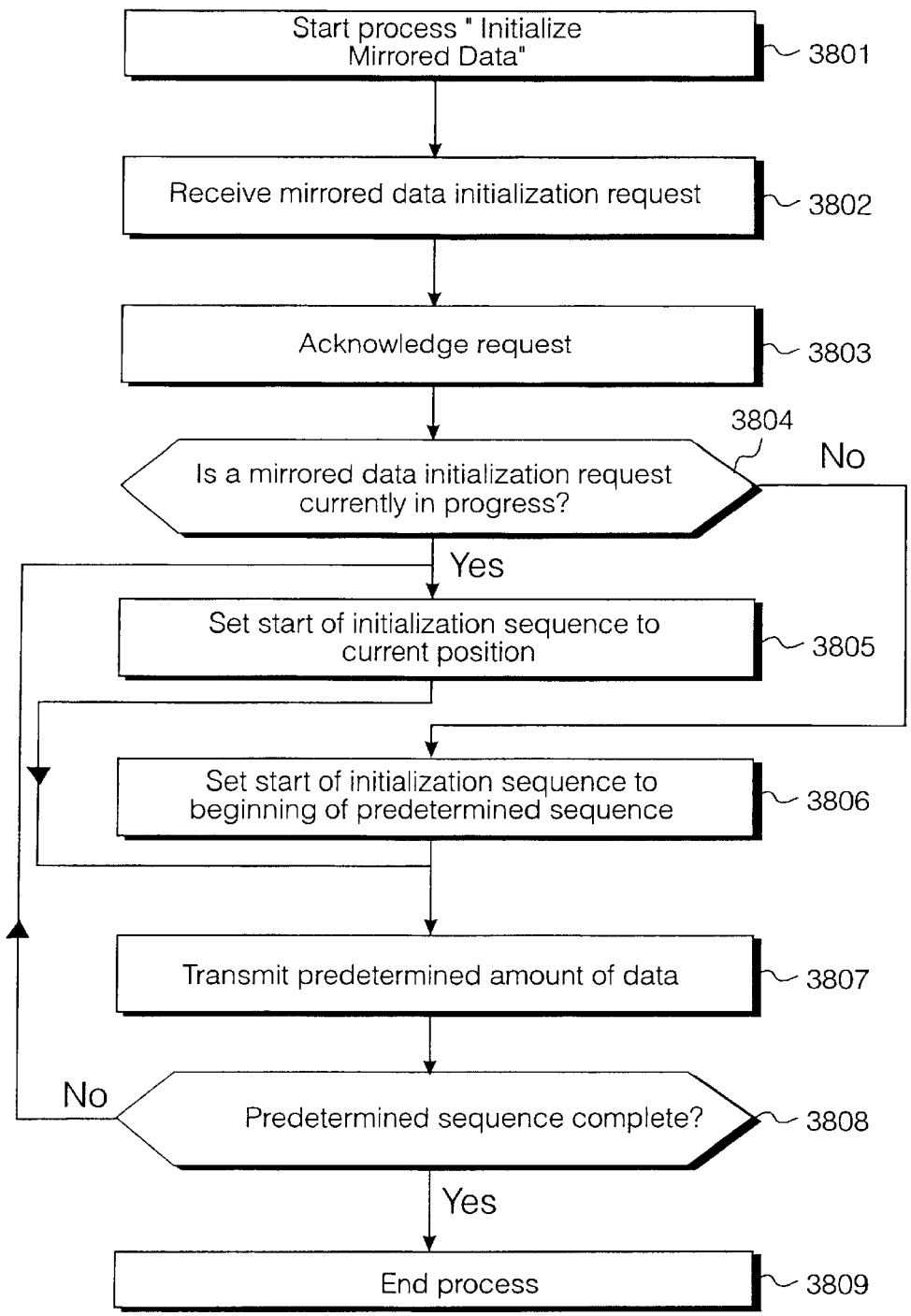
FIG. 38 details the process invoked on the master TTM card in response to receiving a request transmitted in the process identified in FIG. 37.

The corresponding procedural process performed by master TTM card 3603 is illustrated in FIG. 38. At step 3801 the process is effectively invoked and at step 3802 a mirrored data initialization request (3608) is received from standby TTM card 3601. At step 3803 the request received at step 3802 is acknowledged via a message sent from the master TTM card to the standby TTM card. Following step 3803 a question is asked at step 3804 as to whether a mirrored data initialization request is currently in progress. If this question is answered in the affirmative, then control is passed to step 3805 wherein the start of the initialization sequence is effectively set to the current position in the predetermined sequence of mirrored TTM data items. However, if the question asked at step 3804 is answered in the negative then control is passed to step 3806 wherein the start of the initialization sequence is set to the beginning of the predetermined sequence. Following either step 3805 or 3806 master TTM card 3605 transmits (unicasts) a predetermined amount of mirrored TTM data as indicated at step 3807. Following step 3807 a question is asked at step 3808 as to whether transmission of the predetermined sequence of mirrored TTM data is complete. If the question asked at step 3808 is answered in the negative then control is returned to step 3805 wherein steps 3805 to 3808 are repeated. However, if the question asked at step 3808 is answered in the affirmative to the effect that all of the mirrored TTM data has been transmitted to standby TTM card 3601 then control is passed to step 3809 wherein the process is effectively terminated.

The roles of the master and standby TTM cards may be interchanged, either under failure conditions or for card changeover purposes arising from time to time. To effectively implement changeover of master TTM and standby TTM card roles, in the preferred embodiment of the present invention, it is required that local SET operations on coherent data are transmitted as local TPM card to master and standby TTM card multicast messages. Similarly local coherency initialization and recovery requests are required to be implemented as local TPM card to master and standby TTM card multicast messages. This is required because TPM card and standby TTM card changeover in accordance with the present invention, does have an impact on any unicast messaging passed from a TPM card to the master or standby TTM card. Multicast messaging of the type identified places responsibility upon the master TTM card and the standby TTM card to know its own master or standby status so as to filter the incoming multicast messages accordingly. Coherency broadcast operations are unaffected by the master processor to standby master processor changeover, since they are received by both the master and the standby master under normal operation.

Figure 39:
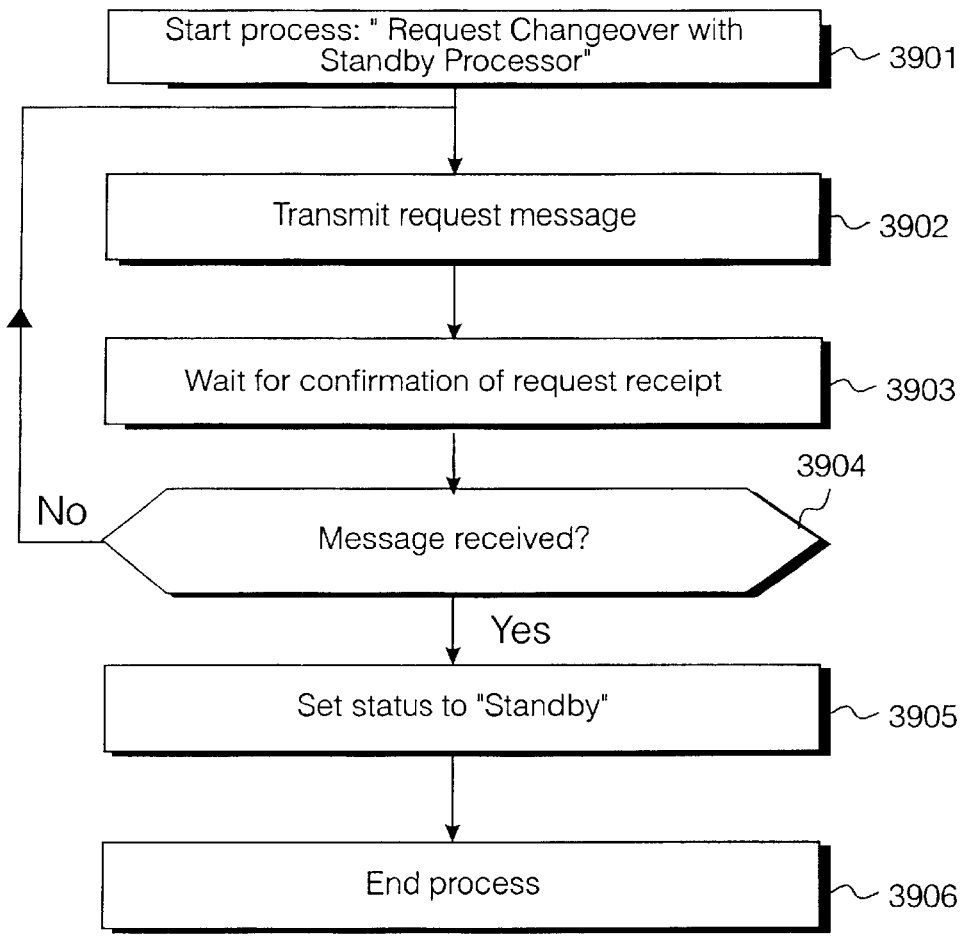
FIG. 39 details steps undertaken by a master TTM card when requesting changeover with the standby TTM card.

FIG. 39 illustrates the essential steps required to be performed when the master TTM card requires to change role with the standby TTM card. At step 3901 a master TTM card initiates the process for changing roles with the standby processor. Following step 3901 a request message is transmitted to the standby processor as indicated at step 3902 and at step 3902 the master processor is required to wait for confirmation that the request transmitted at step 3902 has been received by the standby processor. At step 3904 a question is asked as to whether the message transmitted at step 3902 has been received. If the question asked at step 3904 is answered in the negative control is returned to step 3902 wherein steps 3902 to 3904 are repeated. Upon the question asked at step 3904 being answered in the affirmative to the effect that a standby processor has received a request for change over control is passed to step 3905 wherein the master processor sets its status to a value representing the fact that it is now the standby processor.

Step 3905 is required so that all messages from TPM cards and the standby TTM card are directed to the new master. Following step 3905 the process is terminated at step 3906.

Figure 40:
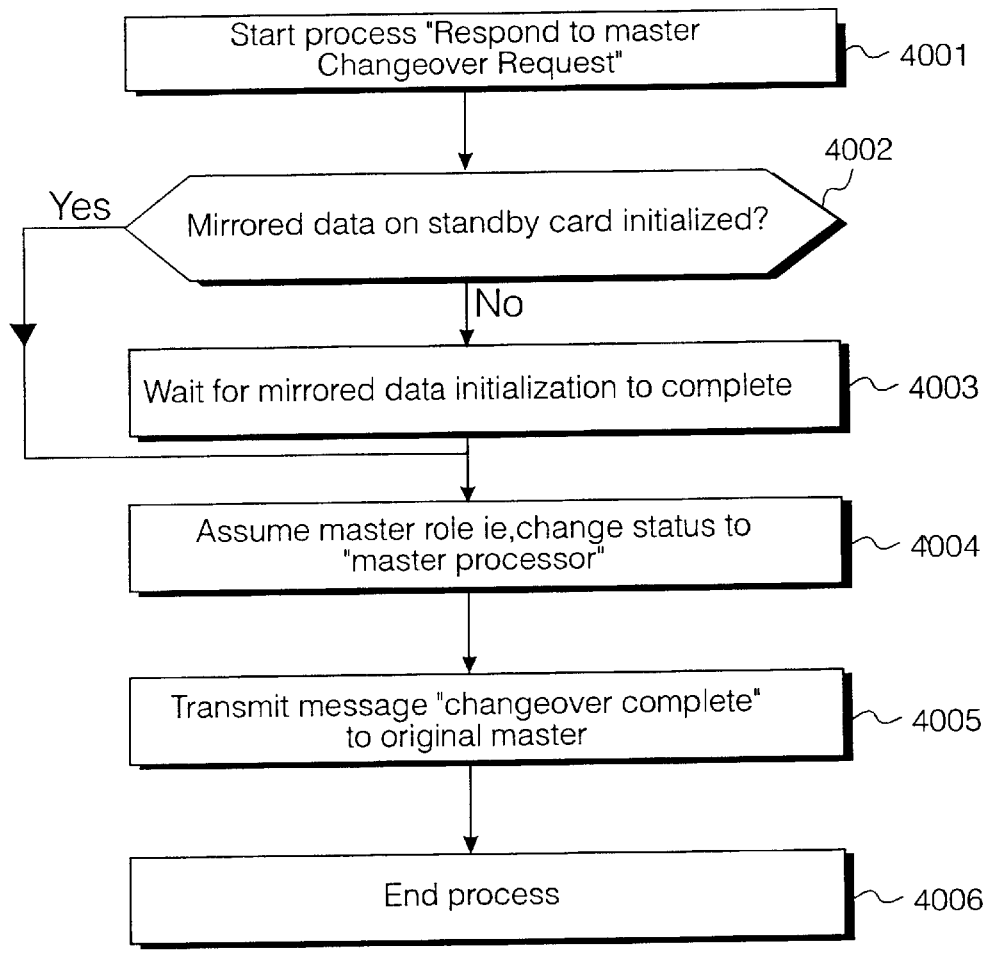
FIG. 40 details steps undertaken by a standby TTM card when responding to a changeover request of the type identified in FIG. 39.

FIG. 40 illustrates the essential steps relating to master and standby change over as performed by the standby processor. At step 4001 the process for responding to a master change over request is initiated. Following step 4001 a question is asked at step 4002 as to whether the mirrored data on a current standby processor has been initialized. If the question asked at step 4002 is answered in the negative then control is passed to step 4003 wherein the standby processor is required to wait for mirrored data initialization to complete. However, if the question asked at step 4002 is answered in the affirmative to the effect that the mirrored data on the standby processor is initialized then control is passed to step 4004. Similarly following step 4003 control is passed to step 4004. At step 4004 the standby processor assumes the role of master by changing its status to "master processor". Following step 4004 control is passed to step 4005 wherein the original standby processor transmits a message to the original master processor confirming that change over has been completed. The message transmitted at step 4005 corresponds in terms of required "handshaking" to the question at step 3904 in FIG. 39. Following step 4005 the process is terminated at step 4006.

Abbreviations

FRA Fixed Radio Access (otherwise known as WLL Wireless Local Loop)

ITS Integrated Transceiver System

Local Card Generally refers to a TPM Processor Card (or the standby TTM processor card) when in a role not functionally equivalent to a TPM card in terms of maintaining data coherency NNM Network Manager Module PSTN Public Switched Telephone Network RDM Replicated Data Manager TMD Transceiver Modulator/Demodulator TPM Transceiver Processing Module (or Local Control Card)

TTM Transceiver Timing Module or (Master Control Card)

What is claimed is:

1. A method of operating a communications system having a master processor having memory storing an incidence of data and a plurality of other processors each having local memory storing another instance of said data; said method comprising:

communicating changes in the instance of said data corresponding to one of said other processors as a result of operations on said data by said processor;

receiving at said master processor said communication, updating the data instance corresponding to said master processor, and broadcasting said data changes to said plurality of other processors;

receiving said broadcast at each said other processor and updating the data instance corresponding to each said other processor in order to maintain coherence between said data instances.

2. The method according to claim 1, wherein said broadcast message incorporates a broadcast message identifier (a broadcast tag).

3. The method according to claim 1, wherein said broadcast message incorporates a broadcast message identifier (a broadcast tag) and said identifier is a number issued sequentially for each said broadcast message.

4. The method according to claim 1, wherein said broadcast message includes a broadcast tag, a local tag, a data item address and a value given to said data item.

5. The method according to claim 1, further comprising the step of said master processor issuing broadcast messages autonomously of said request messages.

6. The method according to claim 1, further comprising the step of said master processor issuing broadcast messages autonomously of said request messages and wherein said autonomously broadcast messages are issued at a regular interval by said master processor.

7. The method according to claim 1, wherein said master processor stores and maintains a history list of said broadcast messages.

8. The method according to claim 1, wherein said master processor stores and maintains a history list of said broadcast messages and said history list of broadcast messages represents a number of the most recent broadcast messages.

9. The method according to claim 1, wherein said master processor stores and maintains a history list of said broadcast messages and said history list includes said broadcast message identifier and a coherent data item reference address for each said broadcast message.

10. The method according to claim 1, wherein said master processor stores and maintains a history list of said broadcast messages and said history list of broadcast messages represents a number of the most recent broadcast messages, said history list including said broadcast message identifier and a coherent data item reference address for each said broadcast message.

11. A method as claimed in claim 1 wherein said communicating step further comprises storing in said local memory and communicating an identifier relating said data operated upon to said operation;

and wherein said receiving broadcast step further comprises for each said other processor determining if a stored identifier for said data identified in said broadcast message exists in the local memory of said processor; and at each said processor, in response to said determination performing said operation on said identified data if said stored identifier does not exist for said data.

12. A communications system having a master processor having memory storing an instance of data and a plurality of other processors each having local memory storing another instance of said data;

wherein each said other processor has means for communicating to said master processor changes in the instance of said data corresponding to said other processor as a result of operations on said data by said processor;

and wherein said master processor has means for receiving said communication, means for updating the data instance corresponding to said processor, and means for broadcasting said data changes to said plurality of other processors;

and wherein each said other processor has means for receiving said broadcast and means for updating said data instance corresponding to said processor in order to maintain coherence between said data instances.

* * * * *